(12) United States Patent
Tuchman et al.

(10) Patent No.: US 9,336,526 B2
(45) Date of Patent: May 10, 2016

(54) METHOD FOR PROVIDING SUPPORT USING ANSWER ENGINE AND DIALOG RULES

(71) Applicants: Kenneth D. Tuchman, Englewood, CO (US); Bruce A. Sharpe, Aurora, CO (US); Henry D. Truong, Chelmsford, MA (US)

(72) Inventors: Kenneth D. Tuchman, Englewood, CO (US); Bruce A. Sharpe, Aurora, CO (US); Henry D. Truong, Chelmsford, MA (US)

(73) Assignee: TELETECH HOLDINGS, INC., Englewood, CO (US)

( * ) Notice: Subject to any disclaimer, the term of this patent is extended or adjusted under 35 U.S.C. 154(b) by 0 days.

(21) Appl. No.: 14/691,488

(22) Filed: Apr. 20, 2015

(65) Prior Publication Data

US 2015/0227941 A1    Aug. 13, 2015

Related U.S. Application Data

(63) Continuation of application No. 14/014,148, filed on Aug. 29, 2013, now Pat. No. 9,042,540.

(60) Provisional application No. 61/720,292, filed on Oct. 30, 2012.

(51) Int. Cl.
*H04M 3/00*     (2006.01)
*G06Q 30/00*    (2012.01)
(Continued)

(52) U.S. Cl.
CPC ...... *G06Q 30/016* (2013.01); *G06Q 10/063112* (2013.01); *H04L 12/1813* (2013.01); *H04M 3/5166* (2013.01); *H04M 3/5183* (2013.01); *H04M 3/523* (2013.01)

(58) Field of Classification Search
CPC ............ H04M 3/5183; H04M 3/5191; H04M 3/5166; H04M 3/523; H04M 7/0027; H04M 3/5175; H04M 1/72522; H04M 2203/357; H04M 3/4936; H04M 2201/42; H04M 2203/404; G06Q 30/016; G06Q 30/01; G06Q 30/0641; G06Q 30/012; G06Q 30/0258
USPC ......... 379/265.09, 265.02; 707/706, 710, 731
See application file for complete search history.

(56) References Cited

U.S. PATENT DOCUMENTS 6,138,139 A    10/2000    Beck et al.
6,212,178 B1    4/2001    Beck et al.
(Continued)

FOREIGN PATENT DOCUMENTS

WO    WO 02/09399 A2       1/2001
WO    WO 2004/044708 A2    5/2004
WO    WO 2008/084207 A1    7/2008

OTHER PUBLICATIONS

"Afaria OneTouch" iAnywhere Solutions, Inc., Dublin, California, 2005, 2 pages.
(Continued)

*Primary Examiner* — Ahmad F Matar
*Assistant Examiner* — Kharye Pope
(74) *Attorney, Agent, or Firm* — Blakely, Sokoloff, Taylor & Zafman LLP

(57) ABSTRACT

According to one embodiment, a self-service system is to provide self-support knowledgebase (KB) information to allow users to navigate the self-support KB. A monitor is to track user interaction with the self-support KB while a user navigates through the self-support KB. An answer engine is to receive a query from the user to ask a question and in response to the query, to identify a predefined response to the query in view of a set of dialog rules. The answer engine is to transmit one or more related questions that the user will likely ask based on the dialog rules and the user interaction. The answer engine further transmits an invitation to allow the user to initiate a live support session after a predetermined condition has been satisfied.

23 Claims, 22 Drawing Sheets

(51) Int. Cl.
*H04M 3/51* (2006.01)
*G06Q 10/06* (2012.01)
*H04L 12/18* (2006.01)
*H04M 5/00* (2006.01)
*G06F 17/30* (2006.01)
*G06F 7/00* (2006.01)
*H04M 3/523* (2006.01)

(56) References Cited

U.S. PATENT DOCUMENTS

| | | | |
|---|---|---|---|
| 6,226,623 | B1 | 5/2001 | Schein et al. |
| 6,519,571 | B1 | 2/2003 | Guheen et al. |
| 6,690,788 | B1 | 2/2004 | Bauer et al. |
| 6,819,759 | B1 | 11/2004 | Khuc et al. |
| 6,934,381 | B1 | 8/2005 | Klein et al. |
| 6,988,126 | B2 | 1/2006 | Wilcock et al. |
| 7,103,846 | B1 | 9/2006 | Shafrir et al. |
| 7,162,451 | B2 | 1/2007 | Berger et al. |
| 7,165,213 | B1 | 1/2007 | Busey |
| 7,228,282 | B1 | 6/2007 | Philyaw et al. |
| 7,406,429 | B2 | 7/2008 | Salonen |
| 7,418,092 | B2 | 8/2008 | Brown |
| 7,450,567 | B1 | 11/2008 | Mamnani |
| 7,496,053 | B1 | 2/2009 | Seabaugh et al. |
| 7,506,257 | B1 | 3/2009 | Chavez et al. |
| 7,558,382 | B2 | 7/2009 | Torres et al. |
| 7,658,327 | B2 | 2/2010 | Tuchman et al. |
| 7,746,362 | B2 | 6/2010 | Busey et al. |
| 7,761,321 | B2 | 7/2010 | Kannan et al. |
| 7,787,609 | B1 | 8/2010 | Flockhart et al. |
| 8,036,682 | B1 | 10/2011 | Davis et al. |
| 2001/0053980 | A1 | 12/2001 | Suliman et al. |
| 2002/0091607 | A1 | 7/2002 | Sloan et al. |
| 2003/0009392 | A1 | 1/2003 | Perkowski |
| 2004/0006514 | A1 | 1/2004 | Rogers et al. |
| 2004/0044545 | A1 | 3/2004 | Wiesmann et al. |
| 2004/0064351 | A1 | 4/2004 | Mikurak |
| 2004/0153327 | A1 | 8/2004 | Liu et al. |
| 2004/0245332 | A1 | 12/2004 | Silverbrook et al. |
| 2005/0011957 | A1 | 1/2005 | Attia et al. |
| 2005/0266825 | A1 | 12/2005 | Clayton |
| 2006/0011716 | A1 | 1/2006 | Perkowski |
| 2006/0116926 | A1 | 6/2006 | Chen |
| 2006/0155609 | A1 | 7/2006 | Caiafa |
| 2006/0171402 | A1 | 8/2006 | Moore et al. |
| 2006/0217113 | A1 | 9/2006 | Rao et al. |
| 2006/0218061 | A1 | 9/2006 | Mouline |
| 2007/0015518 | A1 | 1/2007 | Winter et al. |
| 2007/0041523 | A1 | 2/2007 | Paden et al. |
| 2007/0116231 | A1 | 5/2007 | DeGraaff et al. |
| 2007/0160188 | A1 | 7/2007 | Sharpe et al. |
| 2007/0276722 | A1 | 11/2007 | Silvera et al. |
| 2007/0293200 | A1 | 12/2007 | Roundtree et al. |
| 2008/0005240 | A1 | 1/2008 | Knighton et al. |
| 2008/0074264 | A1 | 3/2008 | Sharpe et al. |
| 2008/0112558 | A1 | 5/2008 | Mediola |
| 2008/0120129 | A1 | 5/2008 | Seubert et al. |
| 2008/0140438 | A1 | 6/2008 | Bares |
| 2008/0195659 | A1 | 8/2008 | Rawle |
| 2008/0219429 | A1 | 9/2008 | Mandalia et al. |
| 2008/0280588 | A1 | 11/2008 | Roundtree et al. |
| 2008/0294469 | A1 | 11/2008 | Caballero et al. |
| 2009/0043669 | A1 | 2/2009 | Hibbets et al. |
| 2009/0043882 | A1 | 2/2009 | Hibbets et al. |
| 2009/0063175 | A1 | 3/2009 | Hibbets et al. |
| 2009/0063260 | A1 | 3/2009 | Hibbets |
| 2009/0063386 | A1 | 3/2009 | Hibbets |
| 2009/0063635 | A1 | 3/2009 | Pierce et al. |
| 2009/0209239 | A1 | 8/2009 | Montesdeoca |
| 2010/0030881 | A1 | 2/2010 | Moreira Sa de Souza et al. |
| 2010/0100490 | A1 | 4/2010 | Lewis-Hawkins |
| 2010/0145730 | A1 | 6/2010 | Abreu |
| 2010/0158210 | A1 | 6/2010 | Awad et al. |
| 2010/0205540 | A1 | 8/2010 | Gupta et al. |
| 2010/0235290 | A1 | 9/2010 | Junger et al. |
| 2011/0117894 | A1 | 5/2011 | Roundtree et al. |
| 2011/0119196 | A1 | 5/2011 | Ventura et al. |
| 2011/0166904 | A1 | 7/2011 | Arrowood et al. |
| 2011/0171939 | A1 | 7/2011 | Deliwala et al. |
| 2011/0320277 | A1 | 12/2011 | Isaacs |
| 2012/0002664 | A1 | 1/2012 | Berk |
| 2012/0063574 | A1 | 3/2012 | Or-Bach et al. |
| 2012/0076283 | A1 | 3/2012 | Ajmera et al. |
| 2012/0096523 | A1 | 4/2012 | Ollila et al. |
| 2012/0265696 | A1 | 10/2012 | Tuchman et al. |
| 2012/0266258 | A1 | 10/2012 | Tuchman et al. |
| 2013/0038519 | A1 | 2/2013 | Bi et al. |
| 2013/0095807 | A1 | 4/2013 | Bhaumik et al. |
| 2013/0244632 | A1 | 9/2013 | Spence et al. |

OTHER PUBLICATIONS

"Check Point Provides One-Touch Secure Access to Corporate Data for Mobile Workers" CMP Media LLC, Oct. 28, 2010, downloaded from http://www.darkreading.com/shared/printableArticleSrc.jhtml?artivleID=228000288, Nov. 10, 2010, 2 pages.

PCT/US2013/065420, International Search Report and Written Opinion, Mailed Feb. 4, 2014, 10 pages.

FIG. 10C

| | |
|---|---|
| Status: | Current Customer |
| Name: | Paul Harvey |
| Address: | 123 Meadow Lane |
| | Denver, CO 80120 |
| Phone: | (303) 555-1234 |
| Mobile: | (303) 555-9876 |
| Facebook: | Pharvey1 |
| Twitter: | Pharvey1 |

Session Detail | Time of Day
Broker -> Running Late -> 30 min | 13:01:10
Broker -> Running Late -> Reschedule Please | 13:21:33
Elapsed Time | 20:23

Chat Connection Request: | 13:22:16
Skill: HDTV Setup Chat Skill
Time in Queue | 0:08
Elapsed Time | 5:13

FIG. 10D

| | |
|---|---|
| Status: | Current Customer |
| Name: | Janet Cook |
| Address: | 789 Danube Street |
| | Aurora, CO 80013 |
| Phone: | (303) 555-4321 |
| Mobile: | (303) 555-6789 |
| Facebook: | Jcook22 |
| Twitter: | Jcook22 |

Session Notes
Associate: JimKirk | End Date: Jun 14, 2012
Channel: Chat | End Time: 13:27

Customer needed to move their appointment to June 20th at 3:30p

METHOD FOR PROVIDING SUPPORT USING ANSWER ENGINE AND DIALOG RULES

RELATED APPLICATIONS

The present application is a continuation of U.S. patent application Ser. No. 14/014,148, filed Aug. 29, 2013, which claims the benefit of U.S. Provisional Patent Application No. 61/720,292, filed Oct. 30, 2012. The disclosure of the above applications is incorporated by reference herein in its entirety.

FIELD OF THE INVENTION

Embodiments of the present invention relate generally to a service center for providing support services on products and services on behalf of goods and service providers. More particularly, embodiments of the invention relate to providing support services using an answer engine and a set of dialog rules.

BACKGROUND

Prior to the advent and prolific use of distributed network environments such as the Internet, customer service sessions typically occurred over a teleconference between a customer service agent or service specialist and a customer. These teleconferences, which incidentally are still very popular today, are initiated by a customer placing a phone call to a customer service agent. The customer service agent's phone receives the call through a public-switched telephone network (PSTN). Many support centers handle a large volume of inquiries, usually by phone, for sales, information, customer support and other services. Typical support centers provide the ability to route multiple incoming, customer-initiated calls to agents which provide sales, information, or support on behalf of an entity interested in establishing or maintaining a relationship with the customer.

Modern support center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill area, level of that skill and/or a schedule of the agent. The number of agents within the contact center and available to the system may often be limited by the physical space available for the agents to operate. Contact centers have to deal with a limited number of agents to handle a large number of incoming customer calls. Typically, when an end user initiates a contact with the service center, the end user has to know or maintain the detailed information regarding how to reach people and/or obtain services from the service center.

Traditional contact centers bring all interactions such as; voice, email, chat into a single location in which a large staffing of agents are setup to handle. Over the past several years many companies have looked for lower cost staffing by leveraging large business process outsourcing or BPO's that could leverage their off shore locations with large staffing of agents that work at a much lower cost distributing the traffic across such locations. They have also reached out to associates working from their homes as a way to reduce costs. What was not considered or leveraged was utilizing the associates already supporting users in a face to face setting such as a retail or business establishment where the Associates deal with situations daily and are subject matter experts (SME's) for the products and services of the establishment in which they are employed.

Technology is reaching into these establishments giving them the ability to provide more services for their patrons. Retail and other businesses still have problems with finding the right people to support their customer base especially since they are only able to (where they can) train those individuals who are employed by them. Outsourcing has been a trend for many years leveraging SME's in a contact center, but these individuals are trained by the manufacturer regarding the services they have put in the field for consumers and do not always hear or get involved with the customer regarding problems encountered with these services and products as the retail associates do. The retail establishments get hit with these problems and are on the front lines dealing with each customer that walks through their doors.

BRIEF DESCRIPTION OF THE DRAWINGS

Embodiments of the invention are illustrated by way of example and not limitation in the figures of the accompanying drawings in which like references indicate similar elements.

FIGS. 10A-10D are screenshots illustrating a graphical user interface (GUI) of an agent mobile application according to another embodiment of the invention.

DETAILED DESCRIPTION

Figure 1:
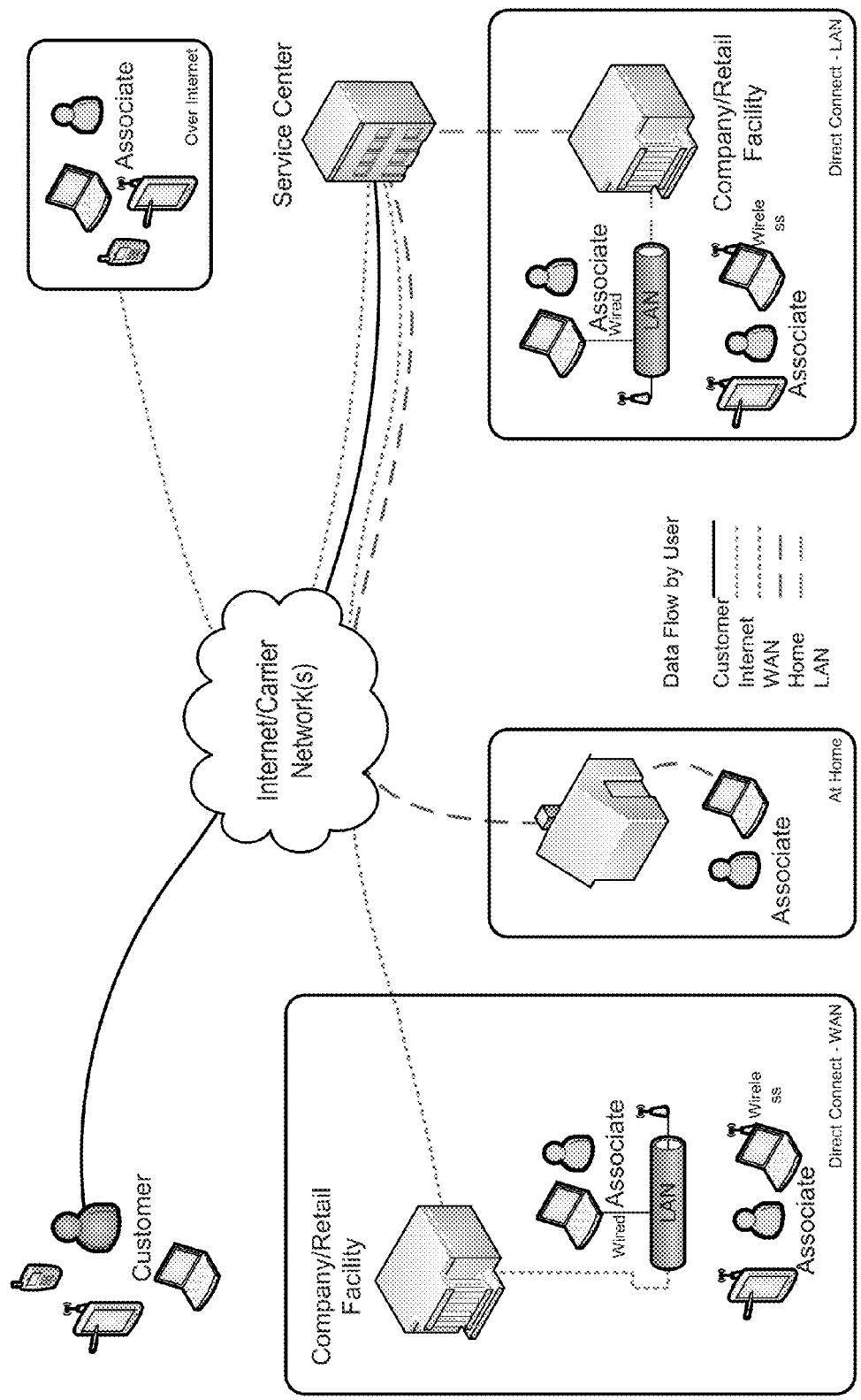
FIG. 1 is a block diagram illustrating a high-level support service configuration according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a support service center, which logically running at a server hardware, is designed to have the ability to place support agents (also referred to as associates, subject matter experts or SMEs) in a place that best utilizes their skill sets for both in person and now remote support of their customers. The service center is a critical and mandatory element of the solution enabling the applications made available to both customers and the associates. These applications communicate with the service center allowing the necessary connectivity no matter where the associate is located geographically.

A customer is empowered with a mobile application for their smart phone or can access services via the service center from their computer Web browser. An associate too can leverage an associate desktop when in a position at their desktop. With the advent of the smart phone, they too can run a mobile associate application providing them with many of the same capabilities they would normally have at their desktop. This mobile associate application allows them the ability to truly be a "remote mobile SME" while they continue to support customers face to face in their respective retail establishments.

According to one embodiment, a set of dialog rules defining a set of actions to be triggered based on user questions asked whether input as free form (natural language) or a link clicked on from a dynamic list of questions of the same category that can be utilized in conjunction with the self-support service system. An answer engine is configured to automatically identify from either a user input (a natural language question) or an automated input (priming question, canned question configured to be asked automatically) based on the navigation selection (tile or link) from the users navigation menu of the mobile application, one or more predefined questions having an answer in the knowledge system. In response to a query submitted from a customer, for example, via a self-support system such as self-support Web site or knowledgebase (KB). The query may be submitted from a mobile application of a mobile device associated with the customer. Based on the user interaction with the self-support KB, a subject matter of the self-support KB is determined based on the user interaction with the self-support system. Based on the submitted query from the user and the subject matter being navigated at the point in time, one or more predefined questions are identified and transmitted to the mobile device of the customer and displayed by the mobile application. The predefined questions are related to the question asked by the user based on an analysis of the question being asked and the user interaction with the self-support KB. The predefined questions may be previously compiled based on the prior support experience with other users on the same or similar products. The predefined questions are the questions a user who navigates the same or similar subject matter of the self-support KB would more likely ask. Each predefined question is presented as executable or accessible link displayed on a display of the user's mobile device.

When the answer engine receives a user activation of one of the links associated with the predefined questions, the answer engine retrieves the corresponding predefined answer or answers from a database and transmits the predefined answer or answers to the mobile device of the customer. In addition, a set of business rules are also defined to allow the answer engine (also referred to as a dialog canvas engine or simply dialog canvas) to determine whether a live support session with a support agent is needed. The set of business rules (also referred to as dialog canvas rules) may be configured on a per client, per product, and/or per project of a product of a client basis. The business rules for different projects and/or products of a client may be identical or different. These business rules can support (as an example but no limited to): identification of the number of questions that can be asked by a user before offering a live support channel, the number of answered or unanswered questions asked by a user before offering a live support channel, If it is determined that a live support session is needed based on the associated business rules, the dialog canvas is to transmit an invitation to the customer's mobile device to invite the customer to initiate a live support session (either chat or voice enabled session). In response to the customer's acceptance of the invitation, a live support session is established between a support agent and the customer.

FIG. 1 is a block diagram illustrating a high-level support service configuration according to one embodiment. As shown in FIG. 1, a support agent is equipped with a mobile device (e.g., Smartphone, laptop, tablet, etc.) having a mobile application running therein, which communicates with a service or support center that provide support services to customers (also referred herein as users) on a variety of products or services on behalf of a variety of product or service providers. In one embodiment, a customer can also install a mobile application (referred to herein as a user mobile application) on its mobile device (e.g., Smartphone, laptop, tablet, etc.). A customer can use its mobile device's browser application to browse self-support knowledgebase (KB) of the service center and initiate a live support with a support agent of the service center, via voice, chat, video, Twitter®/Facebook®, SMS and/or email communications channels, where the support agent can provide a live support to the customer via its mobile device from any business settings or geographical location, such as, for example, a retail store (e.g., electronics, furniture, clothing), an automotive (e.g., dealership, showroom floor), ticketing line (e.g., airline, theatre, concert), travel (e.g., auto rental, airline service, shipping), or financial (e.g., bank or credit union, financial planner). As a result, a support agent can provide live support services via its mobile device to remote customers regardless of geographical location or business settings, while providing in-person customer support to walk-in customers at the retail store.

For example, a support agent may be a product specialist working at a retail store that promotes a particular product, while the support agent is also subcontracted by the service center to provide support services to remote customers for that particular product. Since the retail store typically has the product set up for demonstration purposes, when possible (e.g., no walk-in customers present at the moment) the support agent can provide a live support session to a remote customer for the service center via the mobile application of its mobile device. The support agent can utilize a video chat session to demonstrate to the remote customer the usage of the product from the retail store. Compared to conventional customer support over the phone or email, a picture or video is worth a thousand words, especially with the specialized skill set of the support agent from the retail store. As a result, the special knowledge or skill set of the support agent can be fully utilized regardless of where the support agent is located.

Figure 2:
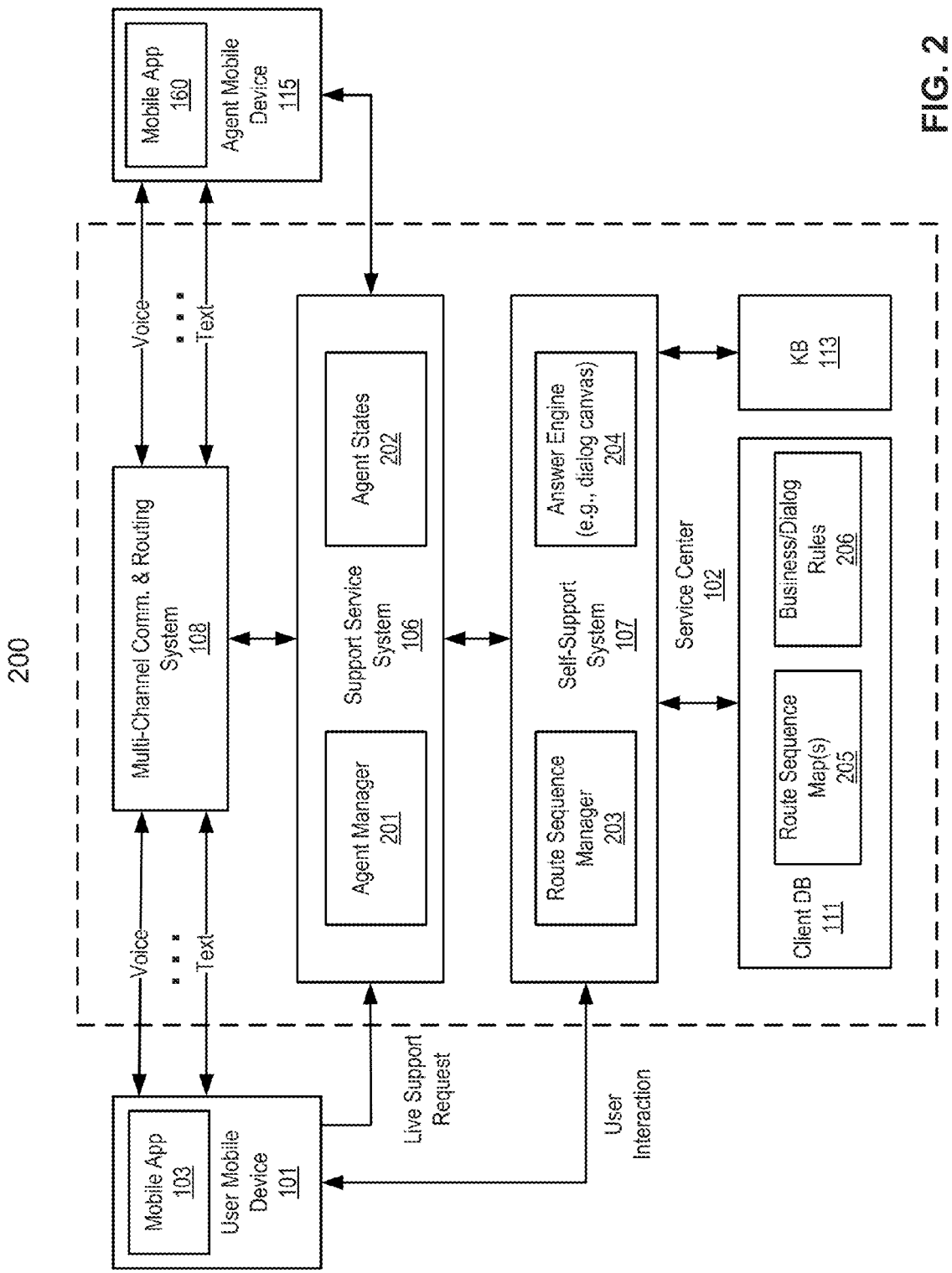
FIG. 2 is a block diagram illustrating a system for providing support services to products according to one embodiment of the invention.

FIG. 2 is a block diagram illustrating a system for providing support services to products according to one embodiment of the invention. Referring to FIG. 2, system 200 includes a mobile device 101 of a user, running a mobile app (native, web or hybrid) of a customer, or individual communicatively coupled to service center 102 over a network. The network may be any kind of network, such as a wide area network (WAN) (e.g., the Internet), a local area network (LAN), or a combination of both. Mobile device 101 may be any kind of mobile devices including, but is not limited to, a laptop, mobile phone, tablet, media player, personal digital assistant or PDA, etc. Service center 102 may be implemented in a centralized facility or server with data processing hardware. Alternatively, service center 102 may be implemented in multiple facilities or servers in a distributed manner (e.g., cloud-based service platforms). Service center 102 provides services to a variety of products or services from a variety of clients or vendors. For example, service center 102 may be a call center handling a variety of support call services on products or services for a variety of goods and service providers. A client may be a manufacturer, a distributor, a retailer, a service provider or broker, a purchasing facility, or a combination thereof.

In one embodiment, service center 102 includes a support service system 106, a self-support system 107, and a multi-channel communications and routing system (MCRS) 108. Self-support system 107 is to provide a self-support knowledgebase (KB) that can be accessed by users, where the self-support KB may be generated based on KB 113 that contains certain materials that have been compiled based on previous support information and/or product information. The self-support KB may be provided by self-support system 108 in a form of Web page via a Web server (not shown), where the Web platform may be hosted by a third party and communicatively coupled to self-support system 107 of service center 102. The self-support KB is to provide a self-support platform to allow users to navigate the self-support KB information in an attempt to find a solution to its problem in question, without having to contact a support agent for live support. If after navigating the self-support KB, the customer still wants to have a live support session with a support agent, the customer can initiate a live support request to service center 102.

According to one embodiment, support service system 106 is to manage support service sessions between users and support agents. Support service system 106 may include a registration system to allow users to register products owned by the users and to allow a support agent to register and log in to provide live support services to the users. In response to a request for live support, support service system 106 generates a support case context based on the user information, client and product information, and other related information (e.g., user interactive history). Support service system 106 then routes the case context to a selected support agent to enable the support agent to have all the related information in front of him/her while conducting a live support session with a user.

According to one embodiment, support service system 106 includes an agent manager 201 and agent states 202, where agent states 202 include information indicating the statuses of support agents, including the current availability of the support agents. In one embodiment, an agent mobile application 160 is provided and installed in an agent mobile device 115, where agent mobile application 160 is to communicate with various components of service center 102. When agent mobile application 160 is launched from agent mobile device, it communicates with support service system 106 and prompts the agent to enter necessary credentials (e.g., username/password, fingerprint recognition, voice recognition, and/or face recognition) to log into service center 102. Upon having successfully authenticated agent 115, support service system 106 updates the status of agent 115 in agent states, which may be stored in an agent database. In addition, agent 115 may further indicate whether the agent is available or willing to accept any live or near-live support request from a user, as well as certain preferred communications channels (e.g., voice, chat, video, email, SMS) to be utilized in a live support session. Agent state information can include information on communications sessions currently active for the agent.

According to one embodiment, agent states 202 may further include information indicating the geographical location at which the agent is currently located, which may be determined via a location service obtained using a global positioning system (GPS) sensor of agent mobile device 115. For example, agent states 202 may include information indicating that the agent is currently located at a retail store that promotes one or more particular products or services. Further, agent states 202 may include information indicating that whether the agent mobile device 115 is capable of conducting certain types of live support sessions, such as a video chat session, as well as whether the corresponding agent is willing or comfortable to conduct such live support sessions.

Similarly, according to one embodiment, a user mobile application 103 is provided and installed in a user mobile device 101, where user mobile application 103 can access self-support KB and communicate with self-support system 107 while the user navigates the self-support KB. Similar to agent mobile application 160, user mobile application 103 may require user 101 provide necessary credentials (e.g., username/password, fingerprint recognition, voice recognition, and/or face recognition). Self-support system 107 may communicate with mobile application 103 and/or the Web interface or server that hosts the self-support KB to monitor user interaction with the self-support KB. Self-support system 107 may further determine a subject matter of the self-support KB currently navigated by the user based on the user interaction. One or more skill set candidates required to handle the subject matter may also be identified based on the subject matter at the point in time. As a result, when a live support request is received from the user, a final skill set can be quickly selected from the skill set candidates and an appropriate support agent can be identified.

According to one embodiment, the self-support KB can be provided in a variety of ways such as Web pages via a Web server (e.g., Wikipedia®, Facebook® discussion forum, etc.). Alternatively, the self-support KB can also be presented via a set of route sequences having a sequence of information elements that can be routed, by route sequence manager 203, to user mobile application 103 dependent upon the specific user interaction with the route sequence at the point in time, based on one or more of route sequence maps 205. A route sequence map represents a collection of route sequences pulled together allowing a variety of operations to be performed via a service center and initiated from a single application. A route sequence map can be utilized as a road map or navigation map allowing a user navigating elements or nodes of the route sequence map to reach certain resources available from the service center without requiring the user to specifically provide detailed information at runtime. Route sequence maps 205 may be defined according to a requirement of a specific project or product of a particular client. Route sequence maps 205 may be stored in a client database associated with that particular client. Different route sequence maps may be defined for different clients. For example, route sequence maps associated with a client in the banking industry may be different than the one in the computer industry.

In addition, according to one embodiment, during the navigation of the self-support KB, a user can also ask a question that can be automatically answered by answer engine 204 (also referred to as a dialog canvas engine) based on a set of dialog rules 206 in response to the question being asked, without involving any live support personnel. For example, a self-support KB presentation may include a button or link that allows a user to submit a question concerning a subject matter being navigated at the point in time. In response to the question, answer engine 204 may analyze the question received from the user. Note that a question may be received via voice recognition in the application. In such a situation, voice recognition (or a speech-to-text process) may also be performed. Based on the analysis, answer engine 204 is to identify one or more predefined answers or responses based on dialog rules 206. In one embodiment, dialog rules 206 define a set of rules that under certain circumstances, a response or answer to a particular question may be utilized. The predefined answers may be categorized under different subject matters of the self-support KB. When a question is received, the subject matter being navigated at the point in time may also be utilized to identify a proper answer. The selected answer is then transmitted to user mobile device 101 and presented by user mobile application 103.

In addition, according to one embodiment, based on the analysis, one or more related questions, which a user under the similar circumstances will likely ask, are identified based on dialog rules 206. The related questions are also transmitted to user mobile device 101 and presented by user mobile application 103, in addition to the primary answer response to the question asked by the user. The related questions may be presented in a form of links that can be activated. When the user clicks (or says) on one of the related question links, a question identifier identifying the selected related question is transmitted to service center 102 and handled by answer engine 204. In response, answer engine 204 retrieves the corresponding answer, which may include further related questions, and transmits it to user mobile device 101.

According to one embodiment, after navigating some materials and asking some questions, if a user is still not satisfied, the user may want to have a live discussion with a support agent. In one embodiment, the user may activate a link or button within the dialog canvas page to initiate a live support session. In another embodiment, business rules 206 may be triggered and may initiate by prompting the user whether the user wishes to have a live discussion with a support agent based on the user interaction and in view of the dialog rules 206, which may be configurable by an administrator of a client. For example, business rules 206 may trigger in the dialog canvas and may invite the user to have a live session after a predetermined number of questions that the user has asked, which may be defined as part of business rules 206. Business rules 206 may trigger in the dialog canvas and may invite the user for a live session when the user has stayed in the same subject matter for a predetermined period of time. Business rules 206 may trigger in the dialog canvas to invite the user for a live session when the user has navigated at a certain detailed level of a particular subject matter. Note that business rules 206 may define a variety of conditions before inviting the user for a live session, such as, for example, number of questions to be asked and/or answered, when to offer chat vs. voice live session, etc. Each client may have different sets of rules. Different product of the same client may also have different sets of rules. Further, different rules may also be applied to different types of users (e.g., loyal customers).

Once user 101 requests or accepts an invitation to a live session, support service system 106 is to compile and generate a support case context based on various data, including contact information of user 101, the product/service in question, a subject matter of the product/service in question, questions asked and answered by answer engine 204, user's interactive history related to the product/service in question, user's preferred communications methods (e.g., voice vs. non-voice communications channels, etc.). In addition, agent manager 201 of support service system 106 is to identify one or more support agents that qualify for the skill set required to handle the subject matter in question, where the skill set may be determined while the user navigates the self-support KB at the point in time.

Agent manager 201 further identifies which of the qualified support agents are available based on agent states 202 and select one of the available support agent. Agent manager 201 may transmit a query to the corresponding agent mobile application of a mobile device associated with the selected agent, in this example, agent mobile application 160 of agent mobile device 115, to prompt whether the agent is willing to accept the live support session. If a positive response is received, MCRS 108 is to establish a live or near live communications session, such as a video chat session, between user 101 and agent 115. In one embodiment, multiple sessions may be simultaneously established between user 101 and agent 115, including a voice channel and a non-voice channel (e.g., chat, SMS, Twitter®, Facebook®, email). As a result, agent 115 can talk to user 101 over a voice or video session while exchanging information over a non-voice channel concurrently, such as chatting, sharing a document, referencing to a universal resource locator or URL link, etc. Since agent 115 uses its mobile device with agent mobile application running therein, agent 115 can technically be anywhere.

In one embodiment, support agent 115 may be a product specialist working at a retail store that promotes or showcases a particular product, while support agent 115 is also subcontracted by the service center 102 to provide support services to remote customers for that particular product. Since the retail store typically has the product set up for demonstration purposes, when possible (e.g., no walk-in customers present) support agent 115 can provide a live support session to a remote customer for the service center 102 via the mobile application of its mobile device. The support agent 115 can utilize a video chat session to demonstrate to the remote customer the usage of the product from the retail store or other remote location. Compared to conventional customer support over the phone or email, a picture or video is worth a thousand words, especially together with the specialized skill set of the support agent 115 from the retail store. As a result, the special knowledge or skill set of the support agent 115 can be fully utilized regardless where the support agent 115 is located.

Figure 3:
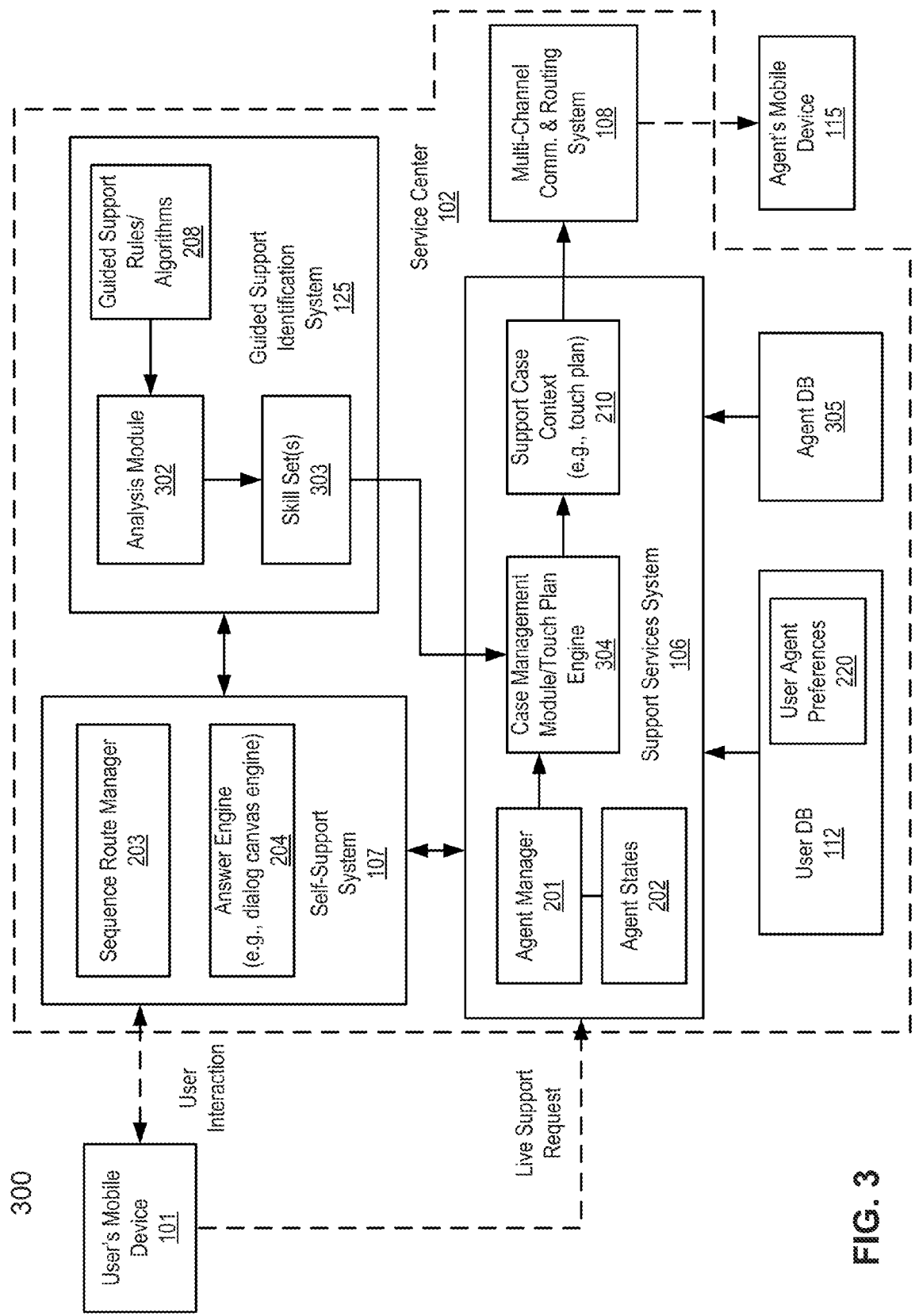
FIG. 3 is a block diagram illustrating an example of a support system according to another embodiment of the invention.

FIG. 3 is a block diagram illustrating an example of a support system according to another embodiment of the invention. System 300 may be implemented as part of system 200 of FIG. 2. Referring to FIG. 3, according to one embodiment, in addition to self-support system 107 and support service system 106 as described above with respect to FIG. 2, system 300 further includes a guided support identification system 125 to identify a skill set based on user interaction with the self-support KB, which may be monitored by self-support system 107. In one embodiment, guided support identification system 125 includes analysis module 302 to analyze user interaction with a presentation which may be captured at user mobile device 101 or a Web site hosting the self-support presentation. The presentation presented by the application or Web page may include information describing a possible solution to a problem related to a product or service. In response to the user interaction, analysis module 302 is configured to analyze and determine a support subject matter (e.g., support type) based on guided support rules or algorithms that the user may be interested in.

Guided support rules or algorithms 208 may be designed and configured specifically tailored to the representation currently navigated by the user at user mobile device 101. For example, guided support rules or algorithms 208 may specify the overall support subject matter for the topic of the presentation. Guided support rules or algorithms 208 may also include specific support subject matters for different parts, links, or paths within the presentation. When a user interacts with a different section of the presentation, it may yield a different support subject matter. In one embodiment, the captured user interaction may further include an amount of time the user has spent on a specific section of the presentation. Such an amount of time may be utilized as a weight factor in deciding which of the support subject matters will prevail.

Once the support subject matter has been determined, analysis module 302 is configured to determine one or more skill set 303 that are required to provide the associated support services based on support subject matter and a skill set mapping database or table (not shown). The skill set 303 may be utilized to identify one or more agents to be recommended to the user of remote device 301 as recommended agents. Subject matter and the skill set mapping table includes information identifying one or more skill sets that are required to provide support services for a particular support subject matter. Subject matter and the skill set mapping table may optionally include information identifying one or more agents or specialists that qualify for each of the skill sets.

In addition, according to one embodiment, user agent preferences 220 are maintained in user database 112 associated with a user. That is, each user has its own agent preferences, respectively, for example, dependent upon previous experience of previous support sessions. Agent preferences 220 include a variety of information concerning the agents known to a particular user, such as, agent identifiers, ratings (e.g., ratings rated by all users in general and/or a specific rating rated by the particular user), and/or other information (e.g., history, products, subject matters, etc.).

When the user initiates a live support from user mobile device 101, for example, by activating a live-support button or control from the presentation after navigating the presentation, a live-support request is received by support service system 106. This could be a situation in which after the user has navigated a certain section of the presentation, the user still does not quite understand or is not satisfied with the description. The user may want to have a live session, such a video chat session, with a specialist to further discuss further details. In one embodiment, the live support button was not available in the presentation initially. Based on the analysis of the user interaction and/or the business rules associated with the product, project, and/or the client, analysis module 302 may determine that the user may wish to have a live support session at a certain point in time. As a result, guided support identification system 125 may cause user mobile device 101 to present a live support control (or button or link) to the user, which may be in a form of a displayed button, a voice activated control, or a combination of both, to allow the user to initiate a live support session.

In response to the live support request, in one embodiment, case management module/touch plan engine 304 is configured to receive a list of one or more recommended skill sets provided by guided support identification system 125 and/or one or more preferred agents of the user retrieved from user agent preferences 220. Based on the skill sets 303 and user agent preferences 220, agent manager 201 is to identify and select an appropriate agent from agent database 305 that qualifies the skill sets 303 and is also available to conduct a live support session based on agent states 202. Agent database 305 further stores information concerning the capability or functionality of agent mobile device 115, such as video chat capability. Agent database 305 may further store information indicating whether the corresponding agent is part of a retail store and/or specialized in handling the subject matter in question and/or a specific type of products or services.

In addition, case management module or touch plan engine 304 is configured to compile and generate support case context 210 based on information from data warehouse 109, including user information, client information, product information, user interaction history, etc. Support case context 210 is then provided to multi-channel communications and routing system 108 to be routed to agent 115, where case context 210 is presented to agent 115 as part of a screen pop at a mobile device of the agent. As a result, when agent 115 communicates with the user of user mobile device 101, agent 115 has all the necessary information concerning the user and the product in question.

Furthermore, according to one embodiment, at a conclusion of the live support session, a survey module (not shown) is configured to transmit a survey to user mobile device 101 to allow the user to provide a feedback, such as a rating, concerning quality of the selected agent. The feedback is utilized to update the ratings of the selected agent in general, as well as a rating of the agent as a preferred agent associated with the user. Such a rating may affect a subsequent selection of recommended agent candidates and preferred agent candidates.

Figure 4:
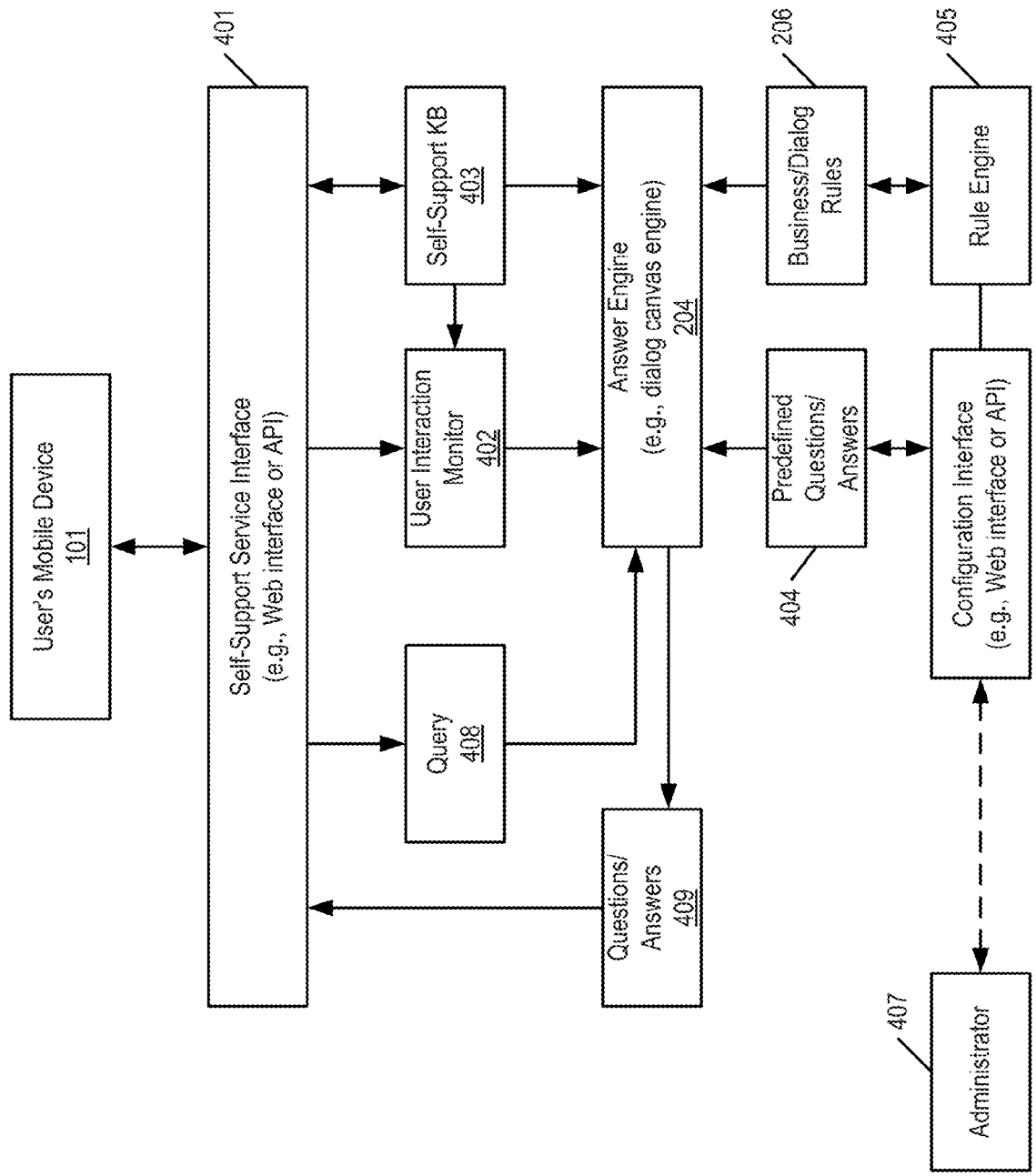
FIG. 4 is a block diagram illustrating a self-support system according to another embodiment of the invention.

FIG. 4 is a block diagram illustrating a self-support system according to another embodiment of the invention. For example, system 400 may be implemented as part of systems 200 and 300 as shown in FIGS. 2-3. Referring to FIG. 4, system 400 includes a self-support interface 401 to allow a user 101 to access self-support KB 403. Self-support interface 401 may be a Web interface, mobile interface or an API coupling device 101 with system 400 over a network. The user can use a mobile application installed in mobile device 101 to navigate to self-support and browse or navigate the self-support KB 403. The user interaction with self-support KB 403 may be monitored by monitor 402. Based on the user interaction monitored by monitor 402, answer engine 204 can determine a subject matter the user is currently interested. Answer engine 204 question context would be used by the dialog canvas rules and may further determine a skill set that is required to handle the live support call of the subject matter. As a result, when the user is ready to request a live support session, a support agent that has the skill set can be quickly identified without having to talk to the user first.

According to one embodiment, the self-support KB 403 may further include a query interface such as a search field to allow user 101 to submit a query 408 concerning a question of the subject matter in question. In response to query 408, answer engine 204 is to analyze query 408 and identify one or more answers 409 from predefined questions and answers 404. The query is analyzed and the answers are identified automatically without any human activity involved. The identified answers 409 are then transmitted to user's mobile device 101. In addition, according to one embodiment, based on the analysis of query 408, one or more related questions or topics may also be identified and transmitted to mobile device 101. The related questions may be presented as links, which when activated, an identifier associated with the activated related question or topic is transmitted back to answer engine via interface 401. In response, answer engine 204 is to retrieve the corresponding answer from predefined questions/answers 404 and transmit the same to user 101 accordingly. Predefined questions/answers 404 may be configured by an administrator 407 via configuration interface 406, which may be a Web interface or an API. Interfaces 401 and 406 may be implemented as the same or different interfaces. Similarly, business/dialog rules 206 may be configured via configuration interface 406 and rule engine 405. Note that some or all of the components as shown in FIGS. 2-4 may be implemented in software, hardware, or a combination thereof.

The techniques described above with respect to system 400 of FIG. 4 are referred to as Universal Canvas and Dialog, which is a technology with a unique combination of capabilities used in conjunction with the multi-channel navigator application (e.g., mobile application) and the service center to allow for a seamless communication and conversation between a customer and an associate. These conversations can be performed via mobile-to-mobile or mobile-to-Web sessions. All communications between the customer and the associate are tracked by the service center. The service center is a critical component of the solution brokering all communication, routing, events, messaging, etc., between the customer and the associate. The data collected can be used for triggering processes, skill selection, prioritization, reporting, monitoring and analytics to name a few.

The Canvas is the backdrop for the multi-channel delivery of communications to a customer. The Canvas is a unique piece of software allowing a blend of a variety of channels used to support a customer for nearly any type of business. According to certain embodiments, the Canvas allows direct voice callback upon channel request, direct video callback upon channel request, direct chat upon channel request, direct SMS upon channel request, direct chat with up channel to voice callback upon channel request, direct chat with up channel to video callback upon channel request, direct answer engine self-help, direct answer engine up channel to SMS, chat, voice, video, etc, and associate-push commands.

The Dialog is the series of nested actions within the canvas pulled together allowing for the best user experience while in a support or service session. The dialog is best used with the self-service knowledge engine and a combination of real-time and near real-time channels such as; voice, video, chat, SMS, Twitter®, Facebook®, etc. The Canvas rules engine (e.g., rule engine 405) is a component of the service center allowing the ability to set the appropriate rules for a given client project. Some of the rules that can be set include: 1) number of questions a customer must ask prior to offering an up channel capability (voice, video, chat, SMS, etc.); 2) allowed channels to be used for a client project and offered to customers; 3) allowed channel combinations to be used for a client project and offered to customers; 4) to show wait time messages to customers for a given channel; and 5) allowed push commands to a customer from an associate.

While in a dialog session of a canvas, any combination of functions can be leveraged as long as the proper business restrictions are made for the customers utilizing the services. The following dialog functions are possible (but not limited to) within the Canvas.

| 1 | Welcome message | Provides a welcome message when the customer is placed into the canvas during an interaction session. |
|---|---|---|
| 2 | Initiate immediate answer engine article display | The canvas will display a predetermined question from the answer engine based on the selected Navigation button. |
| 3 | Initiate immediate answer engine article display with prompt and request for chat after "x" questions asked | The canvas will display a predetermined question from the answer engine based on the selected Navigation button. After "x" number of questions asked, the canvas will display a prompt for the customer to receive additional support via a chat |
| 4 | Initiate immediate answer engine article display with prompt and request for voice after "x" questions asked | The canvas will display a predetermined question from the answer engine based on the selected Navigation button. After "x" number of questions asked, the canvas will display a prompt for the customer to receive additional support via a callback |
| 5 | Initiate immediate answer engine article display with prompt and request for video after "x" questions asked | The canvas will display a predetermined question from the answer engine based on the selected Navigation button. After "x" number of questions asked, the canvas will display a prompt for the customer to receive additional support via a video callback |
| 6 | Initiate immediate answer engine article display with prompt and request for sms after "x" questions asked | The canvas will display a predetermined question from the answer engine based on the selected Navigation button. After "x" number of questions asked, the canvas will display a prompt for the customer to receive additional support via an SMS |

| | | |
|---|---|---|
| 7 | Initiate immediate chat | The canvas will display a "chat session initiated" message with a dialog to "end" the chat if the customer wants |
| 8 | Initiate immediate chat with voice prompt and request (up channel, can drop or maintain both channels) | The canvas will display a "chat session initiated" message with a dialog to "end" the chat if desired and a dialog to initiate a voice callback. Both the chat and the voice callback can run simultaneously without ending either |
| 9 | Initiate immediate chat with video prompt and request (up channel, can drop or maintain both channels) | The canvas will display a "chat session initiated" message with a dialog to "end" the chat if desired and a dialog to initiate a video callback. Both the chat and the video callback can run simultaneously without ending either |
| 10 | Initiate immediate chat with answer engine prompt and request (up channel, can drop or maintain both channels) | The canvas will display a predetermined question from the answer engine based on the selected Navigation button as well as a dialog to enter chat if the customer requires |
| 11 | Initiate immediate voice (with callback number request or confirmation if PSTN) | The canvas will display a dialog to confirm the callback number. If the number is correct the customer selects "ok", if the number is not ok the customer selects "different number", enters the new number then clicks "ok". A dialog telling the estimated wait time for their call with a dialog to "end" are displayed if the customer wants to end the call. If the call is setup and completed a "voice session initiated" message will be displayed |
| 12 | Initiate immediate voice with chat prompt and request (can drop or maintain both channels) | The canvas will display a dialog to confirm the callback number. If the number is correct the customer selects "ok", if the number is not ok the customer selects "different number", enters the new number then clicks "ok". A dialog telling the estimated wait time for their call with a dialog to "end" are displayed if the customer wants to end the call. If the call is setup and completed a "voice session initiated" message will be displayed followed by a dialog to request a "chat" session |
| 13 | Initiate immediate voice with video prompt and request (can drop video channel) | The canvas will display a dialog to confirm the callback number. If the number is correct the customer selects "ok", if the number is not ok the customer selects "different number", enters the new number then clicks "ok". A dialog telling the estimated wait time for their call with a dialog to "end" are displayed if the customer wants to end the call. If the call is setup and completed a "voice session initiated"message will be displayed followed by a dialog to request a "video" session |
| 14 | Initiate immediate voice with answer engine prompt and request (can drop or maintain both channels) | The canvas will display a dialog to confirm the callback number. If the number is correct the customer selects "ok", if the number is not ok the customer selects "different number", enters the new number then clicks "ok". A dialog telling the estimated wait time for their call with a dialog to "end" are displayed if the customer wants to end the call. If the call is setup and completed a "voice session initiated" message will be displayed followed by a dialog to request a "answer engine" session |
| 15 | Initiate immediate video | The canvas will display a dialog to confirm the user. A dialog telling the estimated wait time for their call with a dialog to "end" are displayed if the customer wants to end the call. If the video call is setup and completed a "video session initiated" message will be displayed |
| 16 | Initiate immediate video with chat prompt and request (can drop or maintain both channels) | The canvas will display a dialog to confirm the user. A dialog telling the estimated wait time for their call with a dialog to "end" are displayed if the customer wants to end the call. If the video call is setup and completed a "video session initiated" message will be displayed followed by a dialog to request a "video" session |
| 17 | Initiate immediate video with answer engine prompt and request (can drop or maintain both channels) | The canvas will display a dialog to confirm the user. A dialog telling the estimated wait time for their call with a dialog to "end" are displayed if the customer wants to end the call. If the video call is setup and completed a "video session initiated" message will be displayed followed by a dialog to request a "answer engine" session |
| 18 | Initiate immediate sms | The canvas will display a "sms session initiated" message with a dialog to "end" the sms if the customer wants |
| 19 | Initiate immediate sms with voice prompt and request (up channel, can drop or maintain both channels) | The canvas will display a "sms session initiated" message with a dialog to "end" the sms if desired and a dialog to initiate a voice callback. Both the sms and the voice callback can run simultaneously without ending either |

| | | |
|---|---|---|
| 20 | Initiate immediate sms with video prompt and request (up channel, can drop or maintain both channels) | The canvas will display a "sms session initiated" message with a dialog to "end" the sms if desired and a dialog to initiate a video callback. Both the sms and the video callback can run simultaneously without ending either |
| 21 | Initiate immediate chat with answer engine prompt and request (can drop or maintain both channels) | The canvas will display a "chat session initiated" message with a dialog to "end" the chat if the customer wants followed by an answer engine prompt to ask a question via self service. |
| 22 | Initiate prompt and request for answer engine | The canvas will provide a prompt to the customer requesting they ask a question without pushing a default question ans answer pair. |
| 23 | Initiate prompt and request for chat | The canvas will provide a prompt to the customer requesting they enter a Chat conversation. |
| 24 | Initiate prompt and request for sms | The canvas will provide a prompt to the customer requesting they enter an SMS conversation. |
| 25 | Initiate prompt and request for voice | The canvas will provide a prompt to the customer requesting they enter a Voice conversation. |
| 26 | Initiate prompt and request for video | The canvas will provide a prompt to the customer requesting they enter a Video conversation. |
| 27 | Switch video from front to back facing camera | The camera will allow; a) the customer to change from the front to back facing camera or, b) can be prompted by the associate to allow a remote switch of front to back facing camera. |
| 28 | Switch video from back to front facing camera | The camera will allow; a) the customer to change from the back to front facing camera or, b) can be prompted by the associate to allow a remote switch of back to front facing camera. |
| 29 | Full chat dialog, customer to associate and associate to customer conversation | The canvas will allow the customer to scroll forwards and backwards to view the entire chat dialog with an associate. |
| 30 | Full sms dialog, customer to associate and associate to customer conversation | The canvas will allow the customer to scroll forwards and backwards to view the entire SMS dialog with an associate. |
| 31 | Take picture and transfer to associate | The canvas will allow a customer to snap a photo and transfer via the app to the Service Center allowing the associate currently working with the customer to receive and view. |
| 32 | Take audio recording and transfer to associate | The canvas will allow a customer to record some audio and transfer via the app to the Service Center allowing the associate currently working with the customer to receive and listen to. |
| 33 | Associate command push to share web link | An associate can push a web URL in order to display a specific web site with a customer |
| 34 | Associate command push to share document | An associate can push a document to a customer to share specific information needed for support |
| 35 | Associate command push to manually initialize channel (voice, chat, video, other) | An associate can push a message to invoke a channel session, the customer can then acknowledge or decline to invoke the channel |
| 36 | Associate command push to enter "safe" data encrypted mode | An associate can push a message to enter "safe" mode which encrypts all messages for security on behalf of the customer, the customer is prompted to enter a private pin which can be used when they view the session transcript |
| 37 | Associate command push to exit "safe" data encrypted mode | An associate can push a message to "exit" safe mode |
| 38 | Associate command push to share survey for customer entry | An associate can push a message to share a survey that the customer has agreed to respond to |
| 39 | Associate command push to share a questions from the answer engine | An associate can push a question with an associated answer to the customer from the answer engine |
| 40 | Initiate previous closed conversation | Customer has the ability to scroll up and down within the canvas to active/reactivate |

Figure 5:
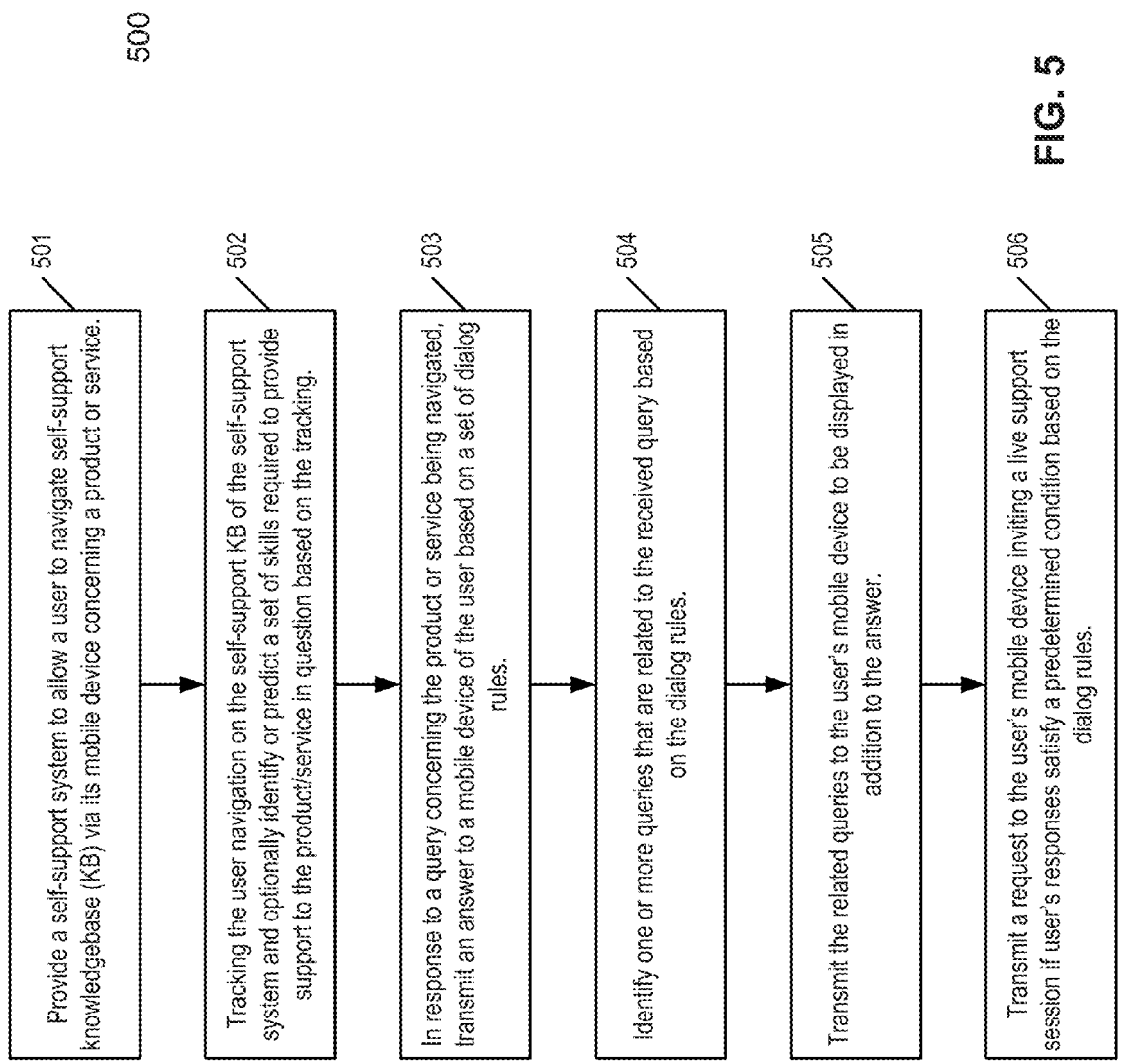
FIG. 5 is a flow diagram illustrating a method performed by a self-support system according to one embodiment of the invention.

FIG. 5 is a flow diagram illustrating a method performed by a self-support system according to one embodiment of the invention. For example, method 500 may be performed by system 400 of FIG. 4. Referring to FIG. 5, at block 501, a self-support system is provided to allow a user to navigate self-support KB of a service center via its mobile device concerning a product or service supported by the service center. At block 502, the user navigation on the self-support system is tracked and optionally a skill set required to provide support the product or service in question is identified based on the tracking. At block 503, in response to a query concerning the product/service received from the mobile device of the user, the query is analyzed and a predefined answer corresponding to the query is identified and transmitted to the user based on a set of dialog/business rules. At block 504, one or more questions related to the query received from the user is identified. Such related questions may be those a user asking a question similar to the query would more likely ask. The related questions are then transmitted to the user's mobile device at block 505. At block 506, a request is transmitted to the user mobile application to invite the user to initiate a live support session if the user's response(s) satisfies a predetermined condition (e.g., a predetermined number of questions has been asked) based on the dialog/business rules.

FIGS. 6A-6F are screenshots illustrating a graphical user interface (GUI) of a mobile application of a mobile device of a user according to certain embodiments of the invention. For example, GUIs as shown in FIGS. 6A-6F may be presented by mobile application 103 of mobile device 101. According to one embodiment, when an application is launched, in this example, in a mobile device, the application connects with the service center for authentication (e.g., based on username/password or unique device ID). Once the application has been successfully authenticated, the application downloads information from the service center that has been previously set up and configured for a particular product of a particular client that is associated with the mobile application. The information may be represented by a route sequence map previously configured, where a route sequence map includes context and/or control elements represents descriptions, demonstrations, solutions, and/or discussions concerning a product or service to allow a user to navigate according to predetermined paths or routes.

Initially, information of context elements of the root level of a route sequence map is received at the client device via a published API. In this example, graphical representations of the context elements are displayed as the most inner or bottom row or ring 601. A graphical representation can be an icon, a thumbnail image, a logo, etc. In this example, ring 604 includes multiple graphical representations such as "Login," "Billing," "Family," "Service," etc. A user can select any of these graphical representations, which may represent one of a navigation context element or an action context element. When the user selects a graphical representation, a message is transmitted from the application via a published API to the service center, where the message includes an identifier of the selected graphical representation. The service center can identify the corresponding context element (referred to herein as a selected context element) based on the identifier. If the selected context element is an action context element, the service center is to perform an action specified in a property of the selected context element.

Figures 6A, 6B:
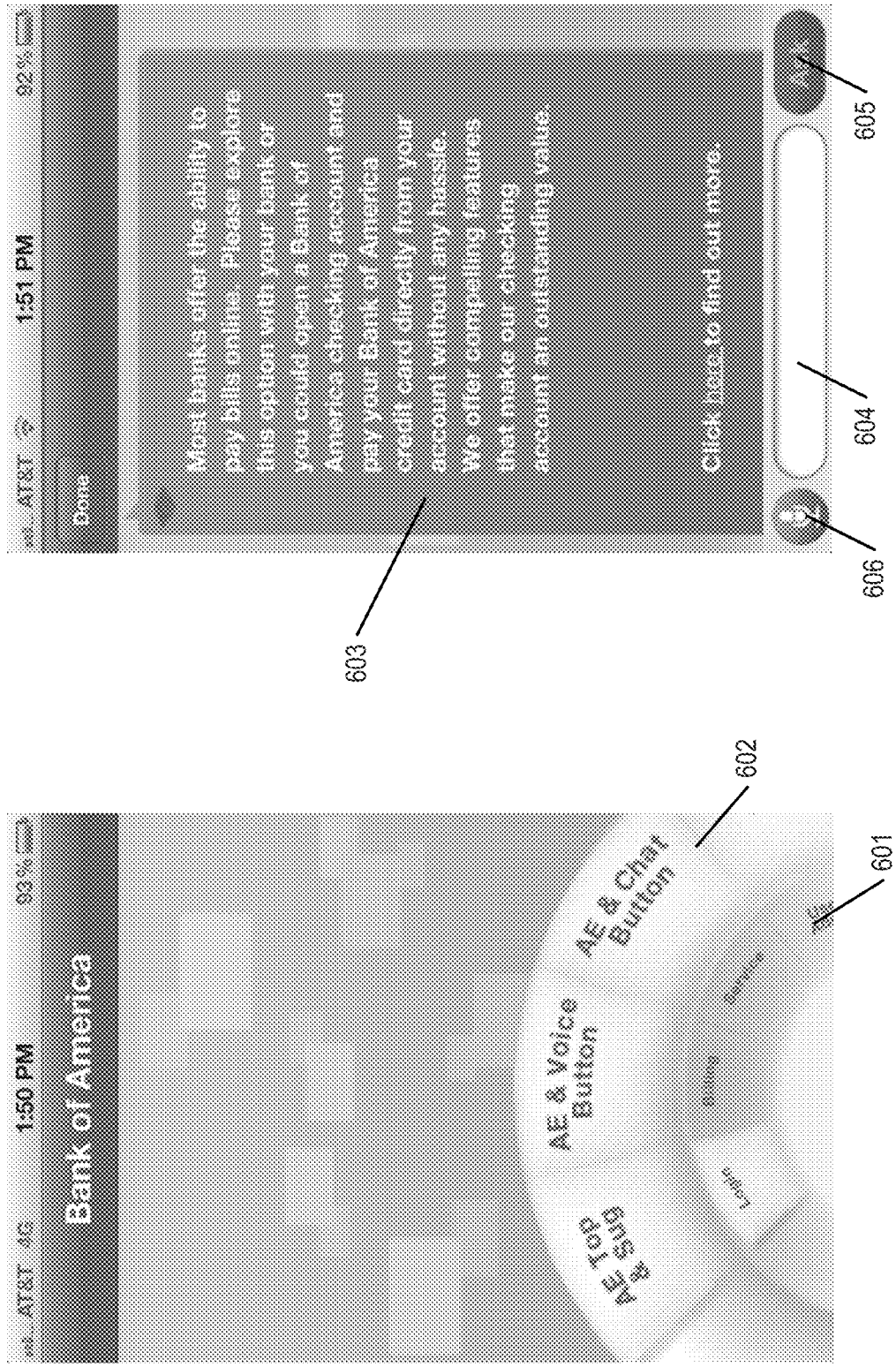
FIGS. 6A-6F are screenshots illustrating a graphical user interface (GUI) of a mobile application of a mobile device of a user according to certain embodiments of the invention.
Figure 6D:
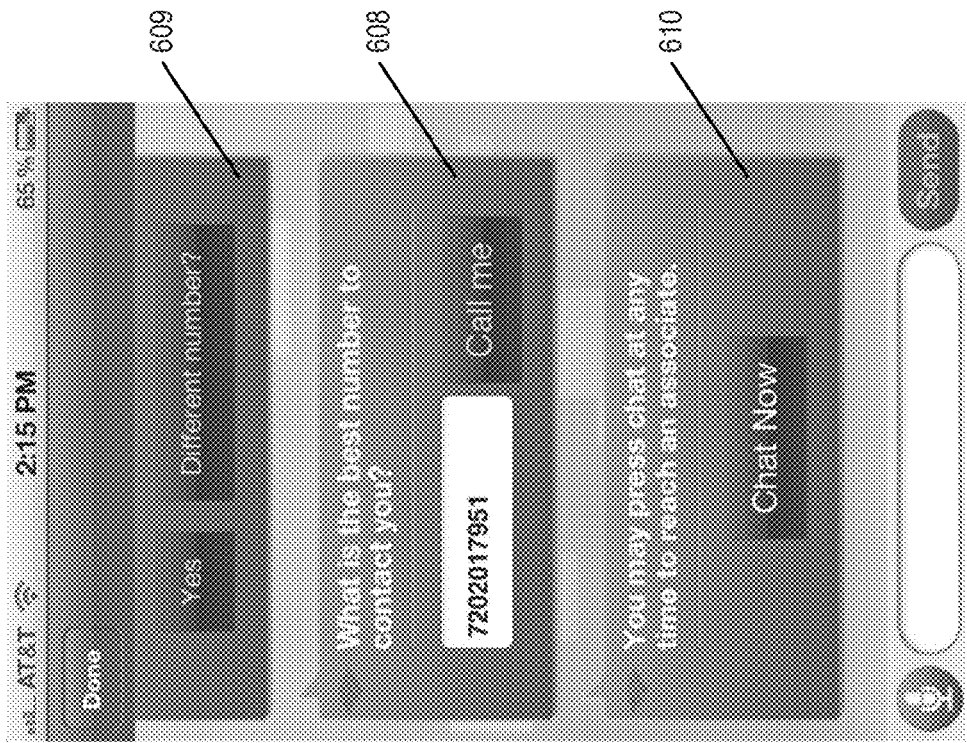

If the selected context element is a navigation context element, the service center identifies one or more child context elements associated with the selected context element. The service center returns data representing child context elements to the application via a published API. In this example, as shown in FIG. 6A, it is assumed that the user selects "Login" graphical representation, which may be displayed in an enlarged form, higher resolution, or a different color or shape, compared to the unselected graphical representations. Once the "Login" graphical representation is selected, an outer or upper ring 602 is displayed, while the selected graphical representation "Login" remains highlighted. The graphical representations of ring 602 can be scrolled, spun, or rotated, for example, by pressing the arrow buttons on either side of the ring 602 or by swiping using a finger on a touch sensitive screen.

In this example, each of the graphical representations "Login," "Billing," "Family," and "Service," corresponds to one of the context elements in the corresponding route sequence map, which when activated, the corresponding context will be retrieved from the service center and displayed. For example, an activation of "Login" leads, according to the corresponding sequence route map, to ring 602 having child elements "AE Top & Sug," "AE & Voice Button," and "AE & Chat Button," etc. When ring 602 is displayed, it becomes a current or active ring, which will be displayed in a larger image (or higher resolution or a different color and/or shape) while the parent ring 601 will be displayed as a previous or inactive ring in a smaller image (or lower resolution or a different color and/or shape).

In this example, it is assumed that the user activates "AE Top & Sug." In response, a preconfigured message associated with "AE Top & Sug" will be retrieved from the answer engine of the service center and displayed as shown in FIG. 6B. Referring to FIG. 6B, message 603 has been previously configured to be associated with a node corresponding to "AE Top & Sug" in the sequence route map, for example, via a rule engine and/or answer engine of the service center. In addition, a search or query field 604 is also displayed to allow the user to ask a question via button 605 or via a voice interactive command via button 606. From field 604, a user can ask any question he/she might have. Once the user submitted a question via field 604, the question is transmitted by the mobile application to the service center and handled by the answer engine as described above.

Figure 6C:
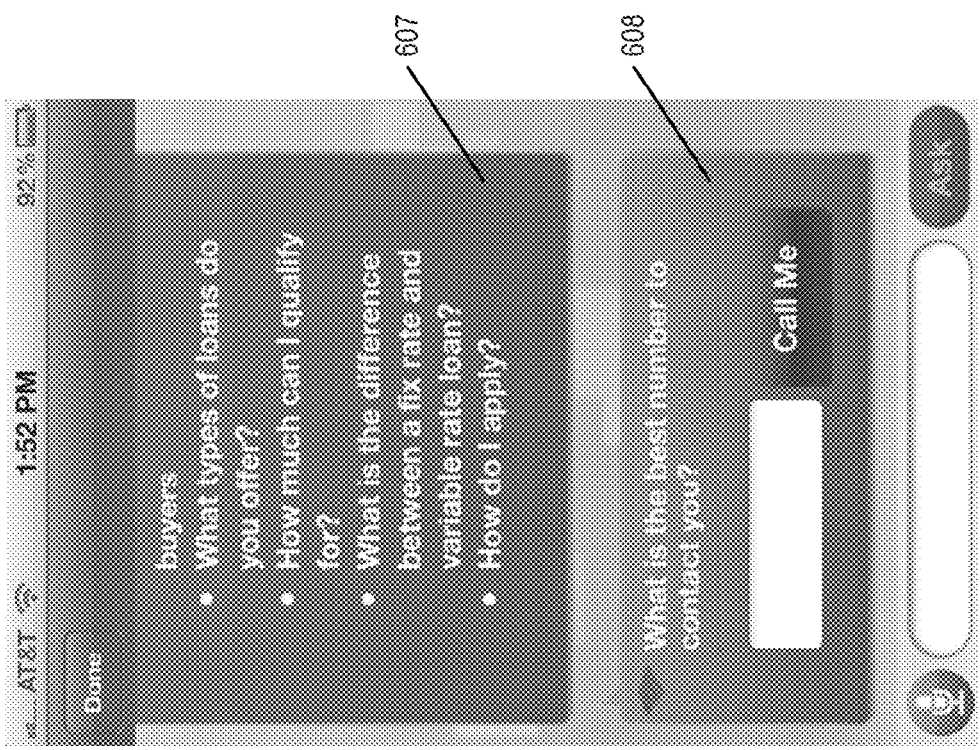

According to one embodiment, the answer engine is to analyze the question submitted from the user and to identify one or more answers based on the analysis. Such an analysis is performed automatically by the answer engine without any human intervention (e.g., no support agents are involved). In addition, optionally, one or more related questions may also be identified. Such related questions are those other users in similar circumstances (e.g., asking the same or similar question) may also ask as follow-up questions. The answers and/or the related questions are then transmitted to the mobile device and displayed by the mobile application as shown in FIG. 6C. Referring to FIG. 6C, questions 607 may answers to a question submitted by the user in a form of narrower questions in an attempt to ascertain the user's intent. Alternatively, questions 607 may be predicted follow-up questions the user may possibly ask based on an analysis of the initial question submitted from the user.

Figure 6F:
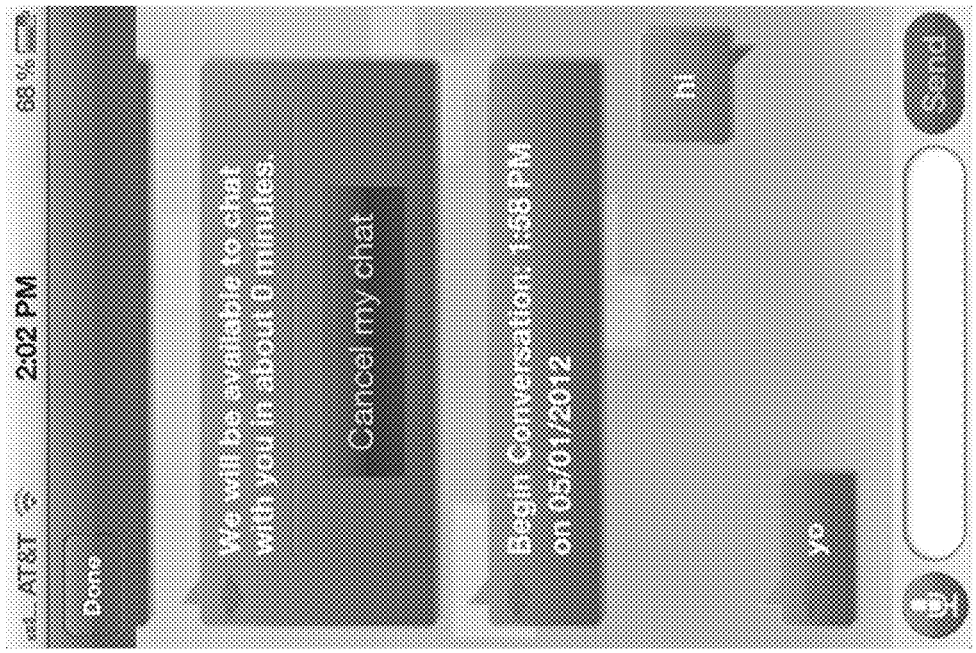
Figure 6E:
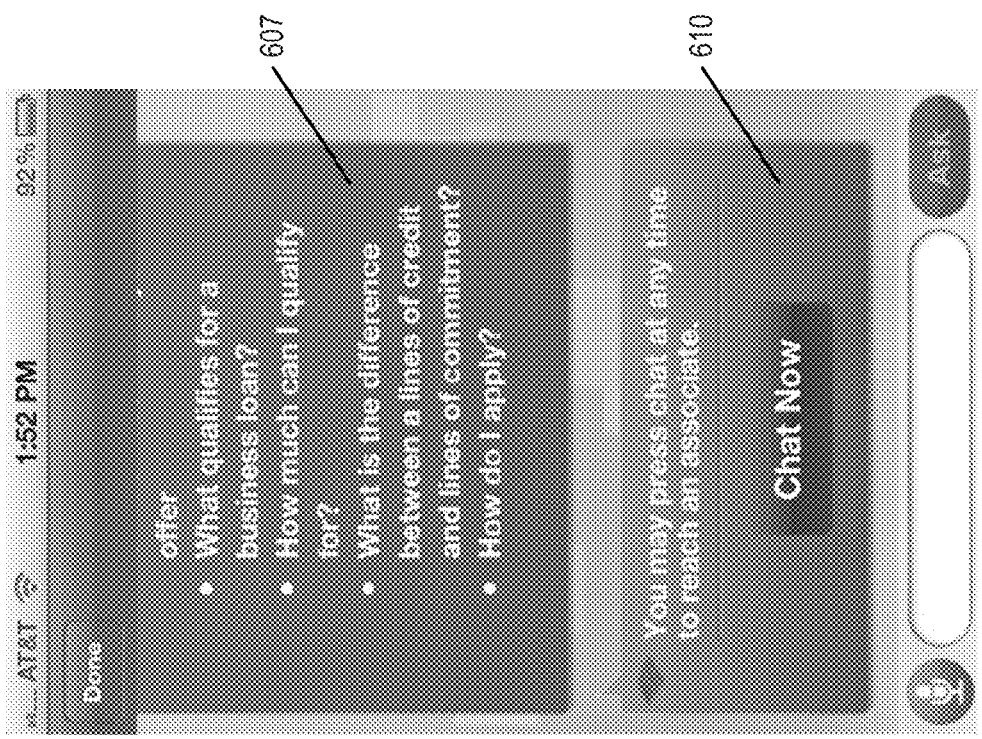

As described above, for each project or product of a client, a set of business or dialog rules is configured and stored in a rule database of the service center. Such rules determine certain actions to be performed under certain conditions. According to one embodiment, if a predetermined condition has been satisfied (e.g., a number of questions asked by the user or a number of user interactions with the presented information exceeds a predetermined threshold), the answer engine of the service center may transmit a message to the mobile application to invite the user to initiate a live support session. As shown in FIG. 6C, assuming that the predetermined condition has been satisfied, a prompt 608 is displayed to invite the user to initiate a live support session with a support agent of the service center. In the embodiment as shown in FIG. 6C, the service center prompts the user for a phone number that a support agent can reach at the point in time (if known in a user profile the support center can send the application the users number, the user would then just confirm). Once the user provides a phone number, the MCRS of the service center will establish a voice session between the user and a qualified support agent that is available to handle the live support session. Note that other types of communications such as chat (as shown in FIGS. 6E and 6F) or video may also be utilized dependent upon the specific user preferences and/or client configurations (as part of business/dialog rules).

According to another embodiment, the mobile application may retrieve a preferred phone number from the service center that the user has previously configured and stored a user account of the user. For example, when the user opens an account in the service center, the user may provide a set of user preferences that may include a preferred phone number that a support agent of the service center can reach the user. In this embodiment, the preferred phone number may be presented to the user as part of the GUI shown in FIG. 6D. In this example, the mobile application can display the preferred phone number of the user in display area 609 and provide an option to allow the user to deny and prefer another phone number. Assuming the user prefers another phone number, the mobile application displays field 608 to allow the user to enter a new phone number to allow a support agent to reach him/her. The newly entered phone number may be cached and stored in the user account in the service center as an alternative phone number. In addition, dependent upon the specific user preferences and/or client configuration, an alternative communication channel 610, in this example a chat session, may be presented to the user. Multiple communication sessions can be conducted simultaneously between the user and the support agent of the service center.

Figure 7B:
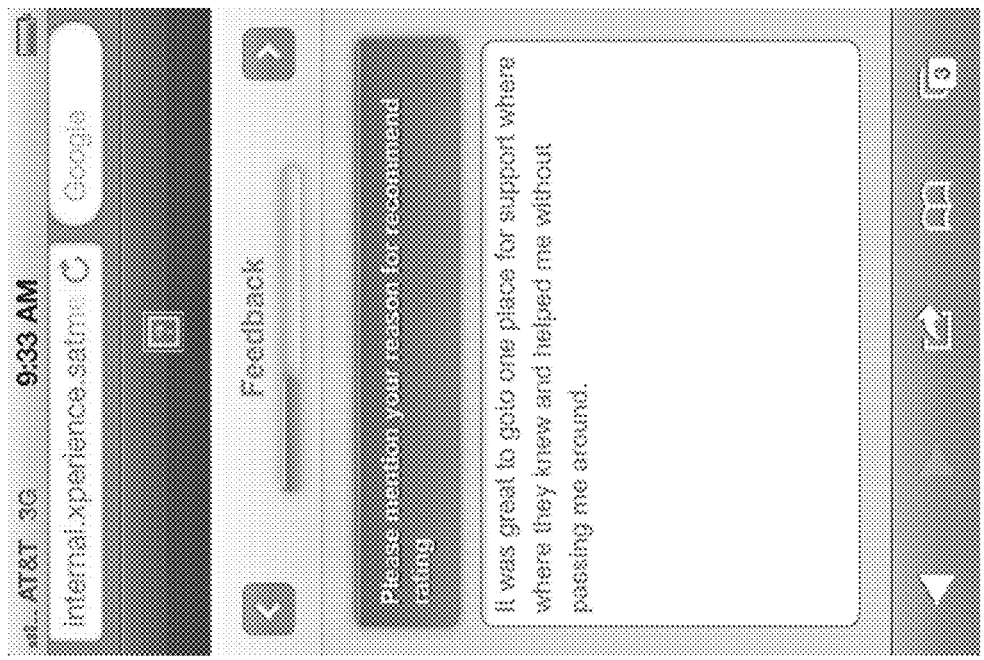
FIGS. 7A and 7B are screenshots illustrating examples of survey GUIs according to some embodiments of the invention.
Figure 7A:
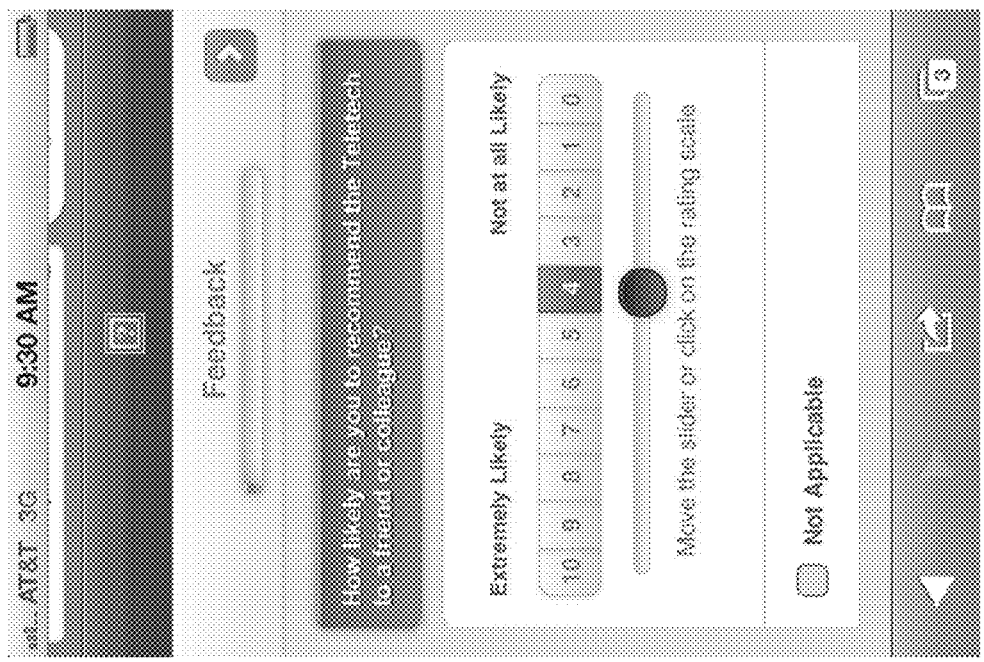

According to a further embodiment, once the live support session has been concluded, a survey is presented to the user to allow the user to enter any comments concerning the concluded live support session. FIGS. 7A and 7B are screenshots illustrating examples of survey GUIs according to some embodiments of the invention. Referring to FIGS. 7A and 7B, a user can rate the support agent who just provided a live support session with the user via the GUI as shown in FIG. 7A and to enter some comments concerning the same via the GUI as shown in FIG. 7B. The user feedback is then transmitted back to a survey module of the service center. The user feedback may be utilized by the subsequent support agent selection processes.

According to one embodiment, a request can be received from a customer based on a specific need in a specific area. Requests can come to an associate by via one or more of voice callback, video callback, chat, SMS, Twitter, Facebook, other channel. Session specific information is received, for example, in a form of support case context, based on the interaction of a customer takes on the self-support KB, prior to requesting additional support from an associate. The case context may include navigation information from the mobile application, customer contact information, questions asked within the self-service knowledge engine, time spent in; navigation, knowledge engine, previous customer interaction history (for all channels), and transcripts of text based communications. The support case context is routed to a selected associate (e.g., support agent). The system includes ability of an associate to reach out to a supervisor or other associates for assistance (more tenured associate SME) via transfer or conference. A customer can access all support center resources, such as, for example, self-service knowledge engine, case notes for interactions, and computer based training/learning.

Reply to customer notifications can be managed based on their application location event sent, including intended meeting at the retail or business establishment and request for in store assistance, etc. An associate can also be anywhere, such as in a retail establishment located in another city, state or country as long as the support center can route into the associate home, local retail facilities or client business via IP/VoIP. Facilities can be set up for a retail establishment so the support center can reach it directly or can enter via a corporation WAN secure entry and ride the customer's network to the applications. This is referred to as associates anywhere and notification features.

According to one embodiment, all or most of the administration processes necessary for the associate anywhere is performed via a combination of provisioning tools in the service center, including organization and client administration, channel and skill administration, answer rules engine, self-help knowledge administration, reporting and real-time statistics, and mobile navigation designers, etc. Such tools may be provided and/or hosted by the service center via a Web interface (e.g., cloud).

According to one embodiment, a variety of connectivity options can be implemented. Direct connectivity over the internet to the service center from an associates home ISP connection, including direct connectivity over a private LAN connection to the service center, direct connectivity over a private WAN connection to the service center, and mobile device can communicate via cellular data network (where available and accessible). For example, a mobile device can communicate via a Wi-Fi network. A customer may need a supported mobile device (IOS/Android/other), a mobile data plan and the service center mobile application, the service center takes care of the rest. With this application a customer is able to log in and authenticate (be identified and made present), have the ability to navigate a set of dynamically generated services supported across a diverse of companies, access self-help technologies, select the preferred channel of communication with the associate via the support center, and converse in a dialog fashion with a remote associate in the mobile canvas over a variety of channels, etc.

In one embodiment, an associate may need a supported mobile device (e.g., iOS, Android, Web OS, other) and the service center mobile application, the service center takes care of the rest. With this application an associate is able to log in and authenticate (be identified and made present), be dynamically mapped to the appropriate support skill, set availability status (not ready-dealing with a user person to person, ready-available to assist a remote user), receive associated customer information upon interaction delivery, and receive customer interaction via the requested service center channel, etc.

According to one embodiment, to establish communications between a customer and an associate, a customer needs to have the corresponding user mobile application loaded onto its mobile device (Smartphone, tablet, etc.) and up and running, which may be provided by the service center or an associated client of the service center who has customized their application to incorporate the service center API access. The customer has to log into, via its mobile application, the service center to be identified and have access to custom navigations. Similarly, an associate needs to have the corresponding agent mobile application loaded (and up and running) onto its mobile device (Smartphone, tablet, etc.) or access capabilities via a computers web browser, which may be set up by the client project administrator for the appropriate skill as an SME to support customers' requests. The associate has to log into the service center via its mobile application to be associated to the project settings established. The associate also needs to configure an available state to take customer requests when not working with a customer face to face in a local retail establishment.

For example, a customer running the mobile app of the service center logs in. Once logged in, the customer navigates the application to get to the specific type of request to initiate. The customer may be prompted for the channel of choice to communicate with an associate (e.g., SME). Once the request and channel have been selected, the mobile application sends the request to the service center. The service center receives the request identifies a number of data elements such as the customer name, personal info, previous contact history, registered products and services, customer status based on back-end analysis for special treatment (if any). The service center is to identify the customer on behalf of the client project for tracking, reporting and analysis proposes, identify the problem type requested by the customer for routing, and identify the channel requested by the customer (voice, video, chat, etc.). The service center uses the above information to locate an available associate (SME) to service the customer, where the agent must be running a mobile app (or web app) and has logged in and available to accept customer requests.

The service center scours a state engine looking for a remote associate regardless of physical location and the service center locates a ready and available associate and routes the customer. The state engine may maintain the statuses of support agents. The selected associate receives from the service center the customer information and interaction via the customer selected channel. The customer and associate are connected via a specific channel and interact till a problem resolution is achieved. Once the interaction is complete, the connection is disconnected. A survey may be presented to the customer and the associate performs and type of wrap up work and gets ready for the next interaction.

According to one embodiment, a customer is able via their retail application (powered by the service center) to notify an associate group, manager, other of their availability (location) whether they are close to, or in the retail establishment. If the customer has the retail application running the application will perform an automated update of their location (Wi-Fi or GPS) allowing the service center to receive and process the notification for a variety of actions.

Customer notifications to the service center can be used in a variety of ways, including notifying the service center that a customer is online and using their mobile application, notifying an associate group, manager, or other that a customer is close to an establishment, notifying an associate group, manager, or other that a customer has entered the retail establishment, and notifying an associate group, manager, or other that a customer currently in a retail or business establishment needs assistance within the retail establishment by requesting via their application. This is different than asking for remote assistance since the customer has a need to ask what only a local associate can support (performed manually).

In one embodiment, an associate locally in the establishment is to locate physical inventory that may be misplaced or not stocked on the shelf as of yet where a remote agent cannot and/or walk out to a customer's car to look at whether a specific speaker will work in their car due to space. The service center may use this notification event to inform the retail establishment of their location in the event that they have a meeting to discuss a service, product, installation or other activity (performed automatically). Customer notification events can also trigger standard and custom processes specific to the business in order to assist a customer. Customer notification responses from the service center can be used in a variety of ways, including a response from an associate, manager, other can be sent back to the customer to signify that they are and/or available, ready for their meeting, running late or some other condition setting the customers' expectations. This is done via the associate's mobile device. They can pull up a list of previously canned responses that they have created or can enter freeform text into a text box and then submit having the support center process and send the notification response to the same customer. They can also perform a digital introduction of another person who will assist the customer in place of the original associate, manager, other in the event they are not at all available.

Figure 8B:
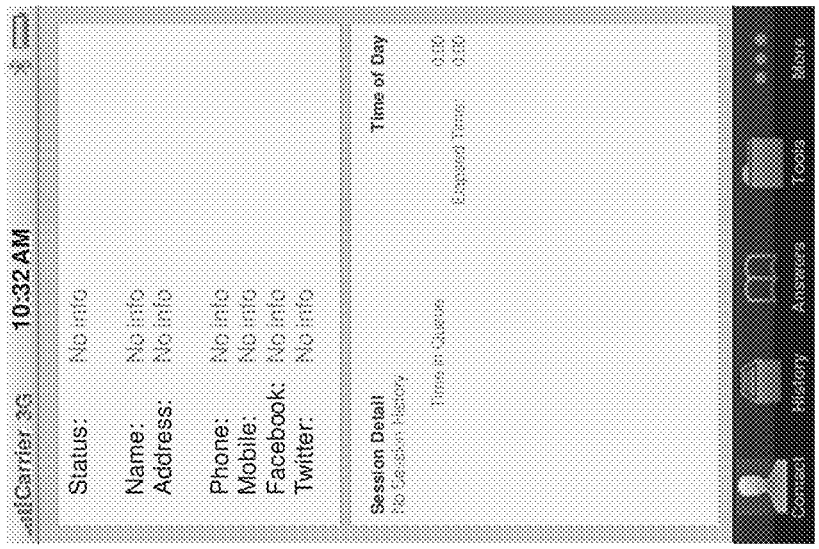
FIGS. 8A-8B are screenshots illustrating a graphical user interface (GUI) of an agent mobile application according to one embodiment of the invention.
Figure 8A:
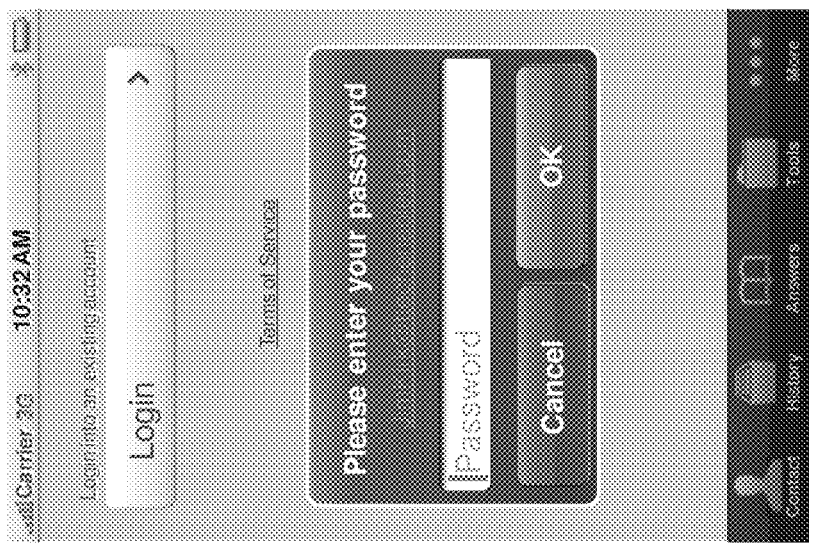

FIGS. 8A and 8B are screenshots illustrating a graphical user interface (GUI) of an agent mobile application according to one embodiment of the invention. The GUI as shown in FIGS. 8A-8B may be presented on a display of a mobile device of a support agent, such as agent mobile device 115 of FIGS. 2-3, where the GUI may be customized to a product, a service, or a project of multiple products/services of a particular client. Alternatively, the GUI as shown may be implemented as a generic or universal mobile application for multiple clients. Referring to FIG. 8A, when a support agent launches an agent mobile application from its mobile device, GUI as shown in FIG. 8A is presented to prompt the agent to log into the service center over a network. In this example, the agent has to provide a username and a password as necessary credentials to authenticate himself or herself to the service center. Alternatively, the agent can also use voice recognition or face recognition authentication method to allow the service center to authenticate the agent. The preference of the required credentials may be agent configurable and stored in an agent database or account of the service center.

Once the agent has logged into the service center, an initial support screen is displayed as shown in FIG. 8B, waiting for a live support session notification. In one embodiment, the agent can indicate via the GUI (not shown) whether the agent is available to accept a live support. For example, an agent located at a retail store may have launched the agent mobile application, but is busy handling a customer at the retail location in person. According to one embodiment, an agent can configure the agent mobile application in a voice mode (as shown in FIGS. 9A-9D) or a non-voice mode such as a chat mode (as shown in FIGS. 10A-10D) indicating that the agent is willing to accept a voice or chat live support session, respectively. Alternatively, the agent can indicate that he/she can accept a live support session via multiple communications channels. To do this the associate must be configured to allow multiple skills from the service center. In doing so the associates mobile application will show "Blended" followed by the channels "voice/chat" (e.g., Blended: voice/chat), in this example, letting them know that they can/will be able to receive a voice or chat. The associate can also, based on the rules set at the service center, take both channels concurrently for the same or different users.

Figures 9A, 9B:
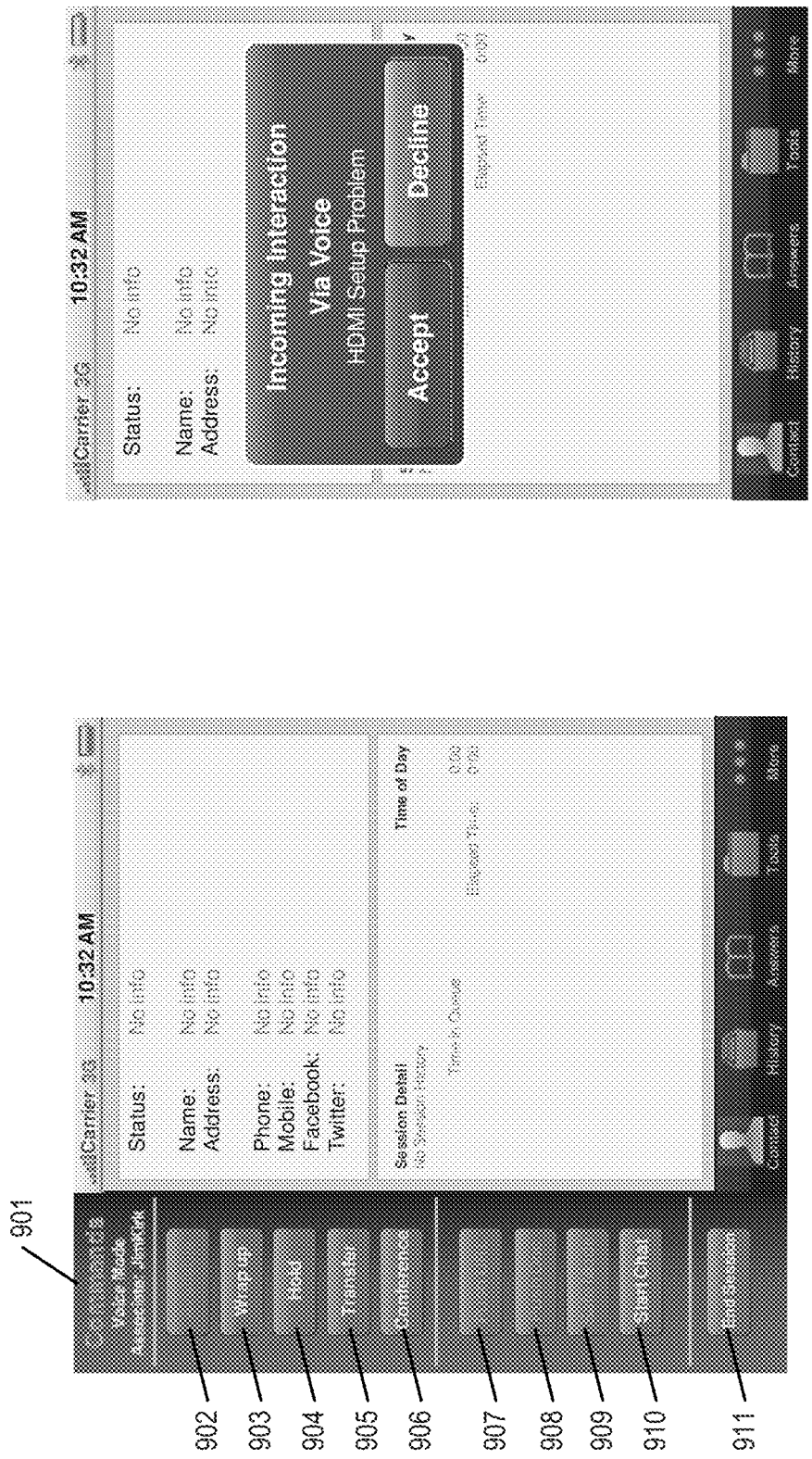
FIGS. 9A-9D are screenshots illustrating a graphical user interface (GUI) of an agent mobile application according to another embodiment of the invention.

FIGS. 9A-9D are screenshots illustrating a GUI of an agent mobile application according to another embodiment of the invention. Referring to FIG. 9A, the GUI as shown in FIG. 9A may be transitioned from the GUI as shown in FIG. 8B, particularly, when an agent clicks or taps from the screen of FIG. 8B. This GUI shows a command menu 901 having a list of command buttons, which can be activated by a tap, click, or a voice interactive command. In this example, the agent is in a voice mode ready to accept a voice live session; however, a video mode may also be applied herein. Menu 901 includes an available button 902 that allows an agent to indicate whether the agent is available to accept a voice live session. A wrap-up button 903 allows an agent to wrap up a current voice call and perform certain post call operations such as entering notes of the voice call. A hold button 904, a transfer button 905, and a conference button 906 allow the agent to put the current voice session on hold, to transfer the current voice session to another agent, and to conduct a conference call with an additional agent, respectively.

Command menu 901 further includes other command buttons to conduct non-voice operations, for example, concurrently with the voice session. In one embodiment, a push-URL button 907 and a push-doc button 908 (but not limited to these functions) allow an agent to share a URL link and a document with the customer, respectively. A safe-mode button 909 allows the agent to exchange information via a secure connection. Since these commands are for non-voice only channels they are shown disabled. In one embodiment, when the agent activates button 909, a prompt is transmitted to the associated user mobile application of a user mobile device associated with a customer to ask the customer to enter a password or a personal identification number (PIN) to encrypt or decrypt the content exchanged during the safe mode. For example, an agent may ask a customer to enter certain sensitive information such as a social security number or a credit card number in a secure way. In such a situation, the customer may transmit and store sensitive information in the service center in an encrypted form that only the password or PIN entered by the customer can recover the content. Note that the support agent does not know the password or PIN entered during the safe mode. If the customer loses the password or PIN, the encrypted content may never be recovered. Alternatively, the password/PIN may be securely stored within the service center and only sent to a customer's preconfigured email upon customer's request. The agent can also initiate or switch to a chat session via a chat button 910 and terminate the current live session via end session button 911.

When the agent is selected by the service center for a live support session as described above, an invitation of a voice session is received from the service center as shown in FIG. 9B. Referring to FIG. 9B, the invitation prompt includes brief information identifying the nature or subject matter of the instant support case, in this example, concerning HDMI setup problem. The agent can either accept or decline the invitation, which when declined the service center may locate another agent who is available to accept the voice session. If the agent accepts the voice session invitation by activating an "accept" button, according one embodiment, a support case context is received from the service center. In one embodiment, the status of the customer is displayed in a status display area 920 and detailed information of the current live session is displayed in a session detail display area 930, as shown in FIG. 9C.

Figures 9C, 9D:
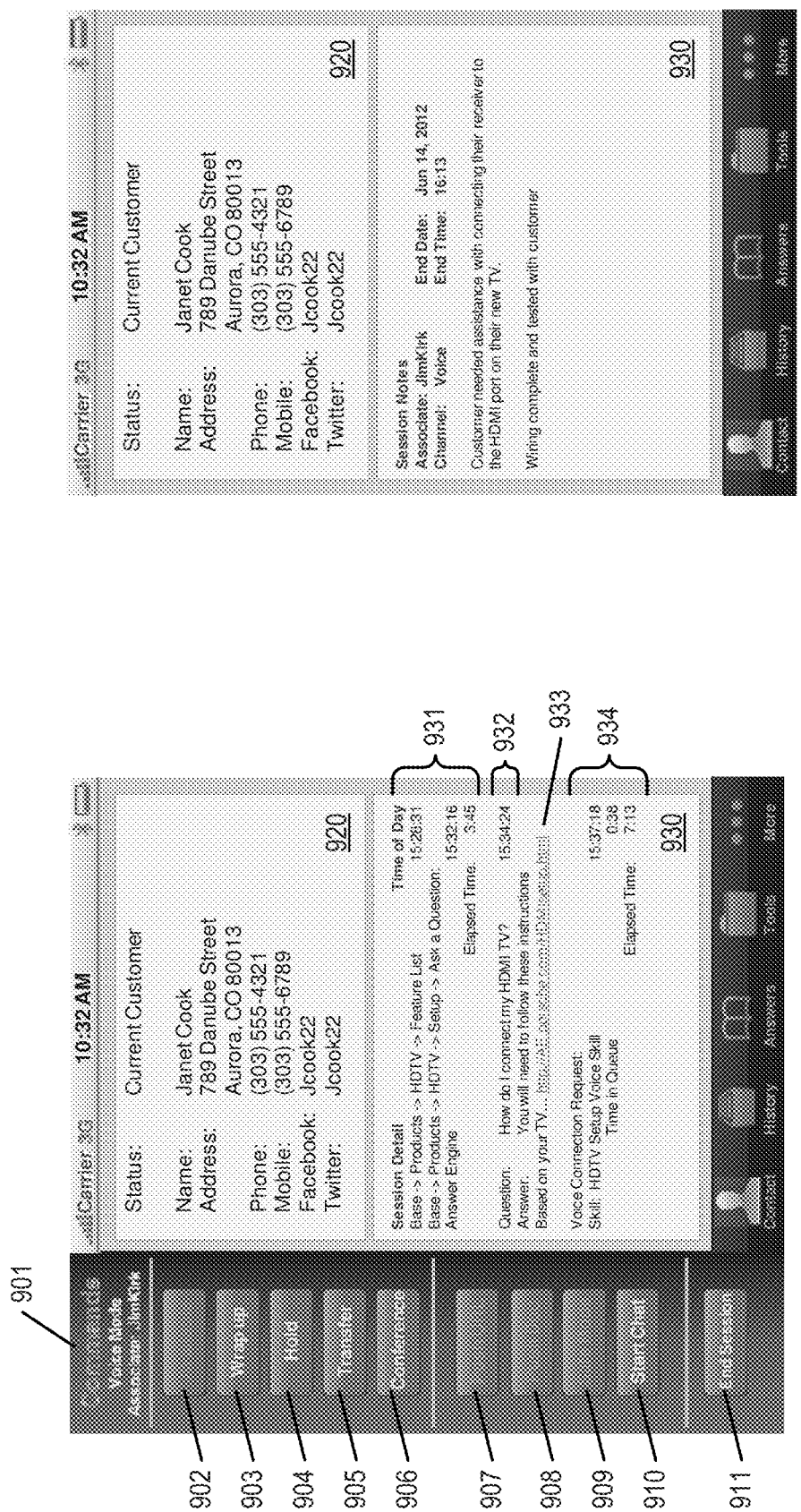

Referring to FIG. 9C, in customer status display area 920, detailed contact information of the customer may be displayed therein, including name, address, phone number(s), email address(es), social networking address(es), etc. Current session detail display area 930 includes all the detailed information concerning the current live support session. In one embodiment, the detailed information includes the subject matter or problem 931 the customer is currently concerned, including the subject matter of the self-support KB that the customer is currently navigating, which is tracked and captured by a self-support system of the service center. The detailed information further indicates the time the customer has spent on the navigation of the self-support KB. In this example, the subject matter is related to HDTV feature list and/or setup information, where each subject matter (e.g., "feature list" and "setup") is displayed with an amount of time the customer has spent on that particular subject matter.

Figure 10B:
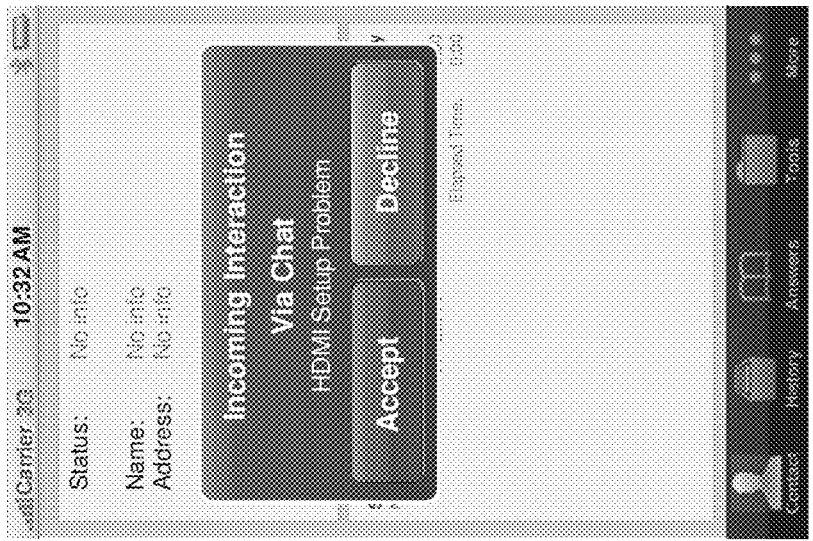
Figure 10A:

According to a further embodiment, the detailed information displayed in display area or panel 930 further includes the question(s) asked by the customer from the self-support KB and the answer(s) automatically by an answer engine of the service center. If the agent shares a URL or document, the accessible link 933 to the shared URL or document is also displayed. The detailed information also includes the detailed information of current voice session 934, including the time initiated and the skill set required to handle the voice call, which is determined by the service center as described above, the time the voice session has been pending in a queue prior to being picked by the agent, and the lapsed time of the current voice session. Other information may also be included. Once the voice session has been concluded, the agent can activate the wrap-up button 903 and enter any notes in panel 930 as shown in FIG. 9D. FIGS. 10A-10D show similar communications in a chat session between a customer and a support agent. Particularly, referring to FIG. 10A, a support agent can enter a chat mode in this example. During a chatting session, the agent can also simultaneously initiate or switch to a voice session by activating "start voice" button 910 as shown in FIG. 10C. Note that the GUIs as shown in FIGS. 8A-8B, 9A-9D, and 10A-10D are described and shown for illustration purposes only; other features, layouts and configurations may also be implemented.

Figure 11:
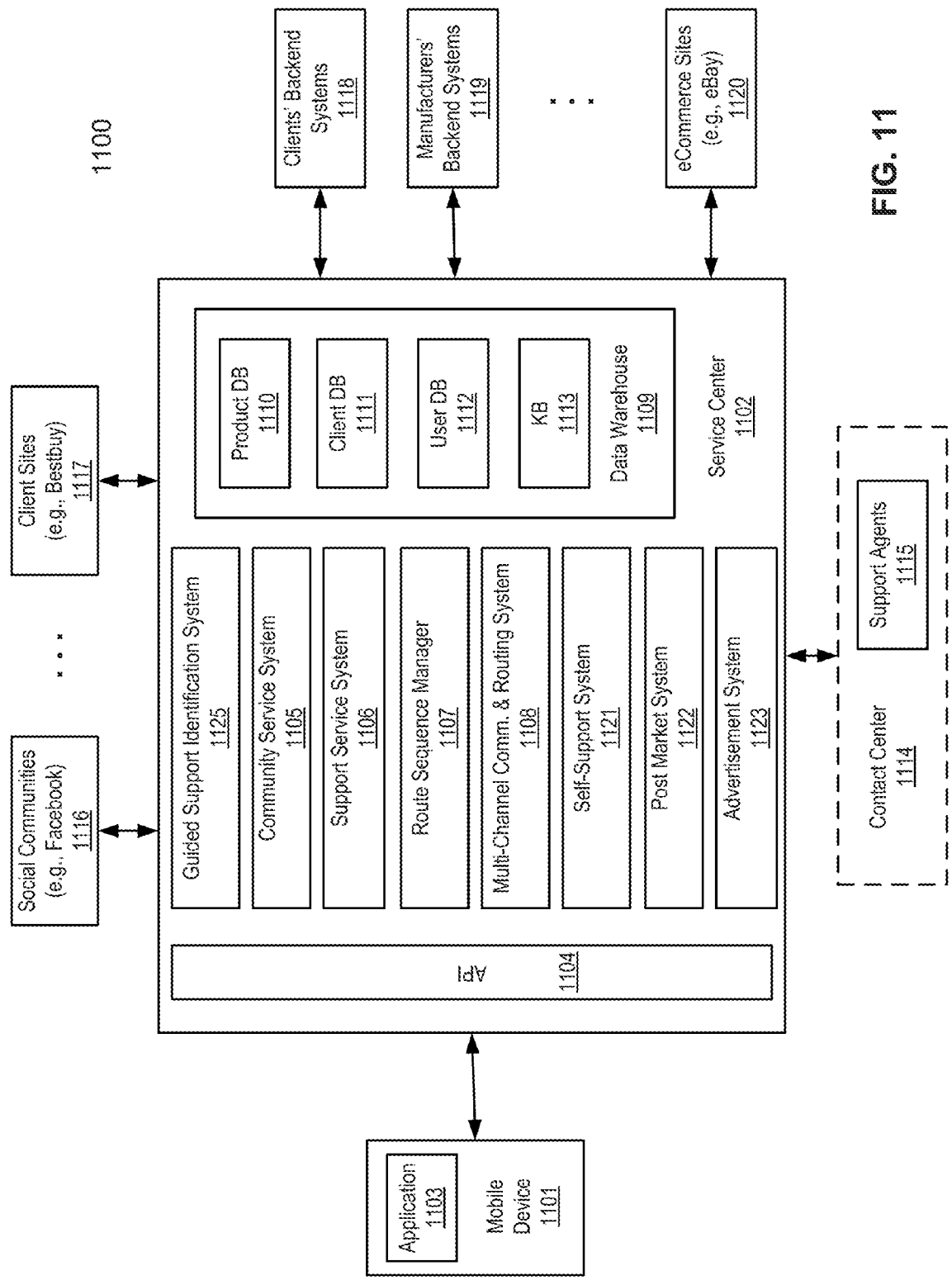
FIG. 11 is a block diagram illustrating a system for providing support services to products according to one embodiment of the invention.

FIG. 11 is a block diagram illustrating a system for providing support services to products according to one embodiment of the invention. System 1100 can be implemented as part of systems as shown in FIGS. 2-3 described above. For example, service center 1102 may be implemented as part of service center 102 as shown in FIGS. 2-3. Referring to FIG. 11, system 1100 includes a mobile device 1101 of a user, customer, or individual communicatively coupled to service center 1102 over a network. The network may be any kind of networks, such as a wide area network (WAN) (e.g., the Internet), a local area network (LAN), or a combination of both. Mobile device 1101 may be any kind of mobile devices including, but is not limited to, a laptop, mobile phone, tablet, media player, personal digital assistant or PDA, etc. Communication connections between devices can be established either by routing through the network or by direct initiation of calls from one end device to another by a mobile application communicating with a server who selects the target. For routed calls the network provides the state of the connection and hence the call state component of agent availability. For direct initiation, some device environments provide for notification of call state and others do not. The Apple Facetime implementation in the iOS operating system, for example, allows video calls to be established by API, but does not provide subsequent information about the call. In that case we deduce whether a call has been successful and when it ends from the behavior of the operating system. A timer is set when the Facetime™ call is invoked by the application and examined when control is returned to the application. From the timer duration we determine whether the call was successful and when it ended. Note that throughout this application a mobile device is utilized as an example of a client device for the purposes of illustration only; other devices such as a desktop or server may also be applied herein.

Service center 1102 may be implemented in a centralized facility or server with data processing hardware. Alternatively, service center 1102 may be implemented in multiple facilities or servers in a distributed manner (e.g., cloud-based service platforms). Service center 1102 provides services to a variety of products or services from a variety of clients or vendors. For example, service center 1102 may be a caller center handling a variety of support call services on products or services for a variety of goods and service providers. A client may be a manufacturer, a distributor, a retailer, a service provider or broker, a purchasing facility (e.g., Amazon™, Expedia™, or ISIS™), or a combination thereof.

In one embodiment, service center 1102 includes one or more service application programming interfaces (APIs) 1104 to communicate, over a network, with other systems such as mobile device 1101, client's site 1117, social communities 1116, contact center 1114 including agents or experts 1115, client backend systems 1118, manufacturer backend systems 1119, eCommerce sites 1120 and other auxiliary systems (e.g., billing system). Service center 1102 can handle service requests from customers of multiple clients. For example, service center 1102 may handle customer service requests for a number of retail sales companies, sales/post sales calls for catalog sales companies, and patient follow-up contacts for health care providers. In such a structure, the service center may receive service requests directly from the customers or through client support management systems.

In one embodiment, service center 1102 further includes community service system 1105, support services system 1106, route sequence manager 1107, and data warehouse 1109. Support services system 1106 is responsible for handling support services requests from the users, including identifying and registering a product, creating an instance case context, selecting and assigning a customer representative (also referred to herein as an agent, specialist, or expert) to provide support services to the users, and managing work flows, etc. An agent may be selected based on a skill set or expertise of the agent in a skill, as well as other factors such as geographic location, of the agent. The term "agent," "specialist," or "expert" refers to a service center personnel or a computerized application, in some cases, that respond to customer requests. An agent may be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a service center personnel and/or a computerized application.

Figure 12:
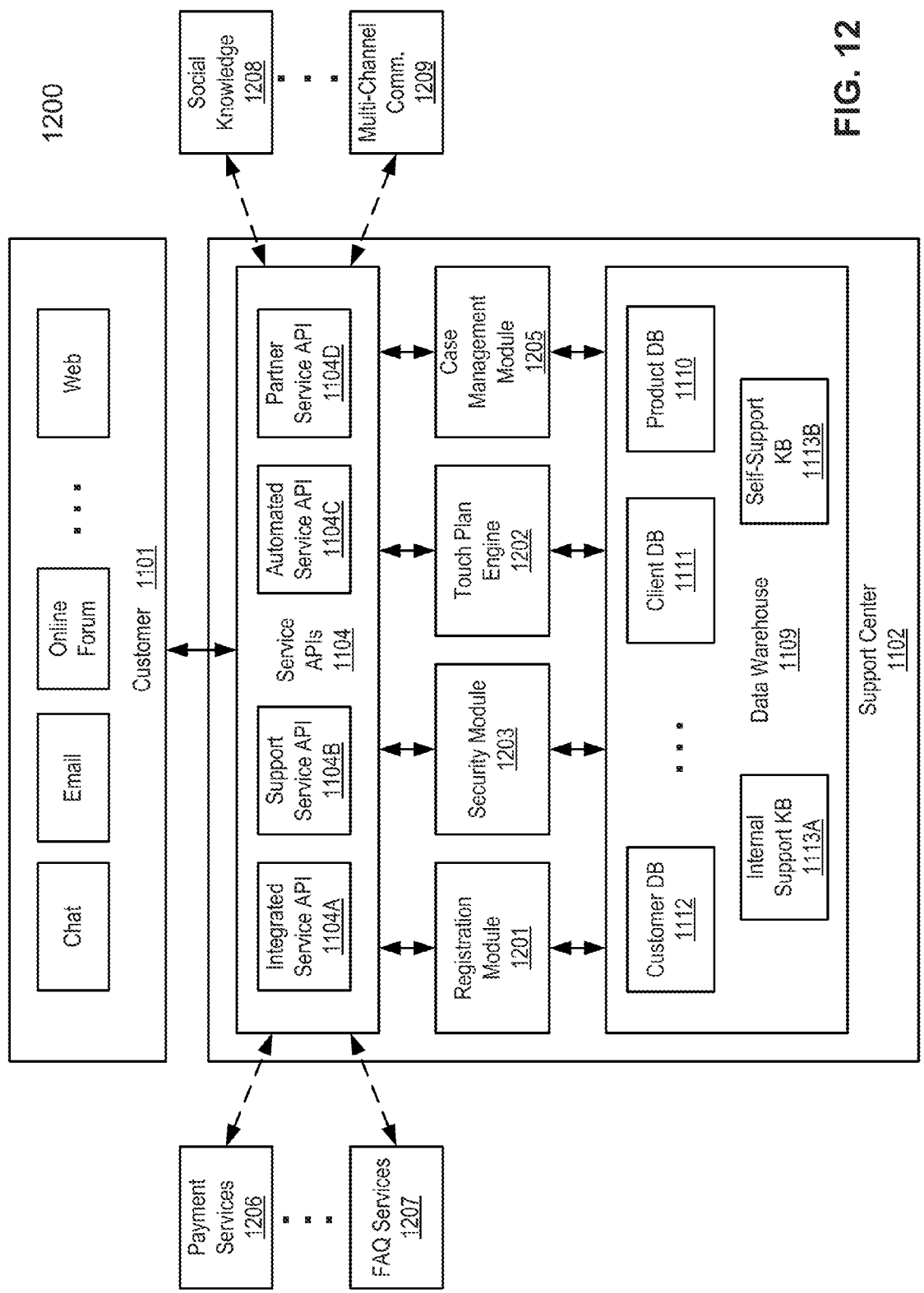
FIG. 12 is a block diagram illustrating an example of a support service system of a service center according to one embodiment of the invention.

FIG. 12 is a block diagram illustrating an example of support service system of a service center according to one embodiment of the invention. For example, system 1200 may be implemented as a part of system 1100 of FIG. 11. Referring to FIG. 12, system 1200 includes service APIs 1104 to allow customer 1101 to reach support center via a variety of communication mediums such as chat, email, online forum, Web, video, voice, etc. Customer 1101 may initiate a contact with support center 1102 via a mobile application (also referred to as a one-touch application) installed on the customer's mobile device as described above. Service APIs 1104 may include a variety of subsets of APIs such as integrated service API 1104A, support service API 1104B, automated service API 1104C, and partner service API 1104D. Some or all of these APIs 1104A-1104D may be implemented as cloud-based service APIs, where the service APIs may be maintained by a third party service provider as a part of software as a server (SaaS) on a subscription basis.

In one embodiment, integrated service API 1104A may be utilized by certain integrated service providers such as payment services 1206, dispatch services, location services, tracking and delivering services, short messaging services (SMS), social networking and blogging services (e.g., Twitter™), and customer relationship management (CRM) services (e.g., Salesforce™), etc. Automated service API 1104C may be utilized by AI Artificial Intelligence services, BOT services automated services (like roBOT) that mimic the actions or activity of a human processes or activities making the user think they are talking to a live person, frequently-asked question (FAQ) services 1207, survey services, eLearning services, etc. Partner service API 1104D may be utilized by certain partner entities of the support center such as social knowledge 1208, multi-channel communication system 1209, and social CRM (e.g., Lithium™) etc.

In one embodiment, support service API 1104B can be utilized by customer 1101 to reach the support center. Support service API 1104B may be utilized, for example, via a one-touch application launched from a mobile device, to register a user, register a product, access knowledgebase (e.g., KBs 1113A-1113B), and obtain a support service from an agent, AI, BOT service, etc. Initially, when a customer downloads and installs a one-touch application on its mobile device, the customer can access support center 1102 via support service API 1104B to create a user account, which may be performed by registration module 1201. Subsequently, the customer may also log into the account via support service API 1104B, which may be authenticated by security module 1203, to register a product and/or to retrieve a list of registered one or more products that have been registered with support center, using certain techniques described above.

When there is a need to contact support center 1102 on a product, the customer can activate the one-touch application from its mobile device or press a one-touch button from a Web site, which will access and log into support center 1102 via support service API 1104B, where the customer and/or the mobile device can be authenticated by security module 1203. In addition, case management module 1205 is configured to create a unique case ID that uniquely identifies the instant support case. The case ID may be created based on a combination of at least some of the product identifiers (e.g., serial number, barcode, quick response (QR) code, high capacity color barcode (HCCB) code, receipt transaction ID), client information (e.g., retailer ID, manufacturer product ID), customer information (e.g., personal information, username, password, mobile device ID), and other information (e.g., time, date).

In one embodiment, touch plan engine 1202 is configured to create a touch plan which is identified and tracked by the case ID. The touch plan may be created according to one or more business rules or templates of the client. The touch plan represents a roadmap, an outline, a tracking record, or case context for the instant support case. The touch plan may also include or reference to other aiding information, such as, product information, product intelligence information, customer history data, client information, and manufacturer information, etc., which may be retrieved and compiled from various informational sources such as customer database 1112, client database 1111, product database 1110, knowledgebase 1113A-1113B, client and/or manufacturer backend systems, etc. The touch plan is then forwarded to an agent that has been assigned to the instant case to allow the agent to have all the necessary information to enable the agent to provide the best customer experience. The agent may be assigned based on a variety of factors, such as, skill set, expertise, demographic location, language, prior customer relationship, etc.

Data warehouse 1109 includes, but is not limited to, self-support KB 1113B, internal support KB 1113A, client database (DB) 1111, product database 1110, and customer database 1112. Internal support KB 1113A may store any support information or communications between an agent and a customer. Self-support KB 1113B contains published information extracted from other informational sources, such as internal support KB 1113A and other systems (e.g., client backend systems and manufacturer backend systems). Self-support KB 1113B allows a customer to browse in an attempt to find a solution for the customer's problem, hopefully without having to contact a live support agent. Client database 1111 may store any client related information, including a client profile for each client supported by support center 1102. For example, client database 1111 may store client's preference of communication channels to be utilized between a customer and an agent. Client database 1111 may also contain membership information of the customers.

Product information store 1110 may store any user manual or technical manual of products. Product detailed information may further include complementary products and services, availability, etc. Such information may be drawn from external systems such as client's backend systems and/or manufacturer's backend systems. Customer DB 1112 may store any customer related information such as personal information (e.g., name, address, phone numbers, sex, age), security credential, device ID of its mobile device, etc. Customer DB 1112 may store any product that has been registered by a customer. Customer DB 1112 may further store information regarding any interaction between a customer and an agent of previous support sessions, such as topics, detailed discussions, time of the discussions, contact mechanisms used, reasons of the support, products or services involved in the discussions, last agent or expert the customer interacted with, etc.

Other databases may also be included and utilized. For example, an agent or expert database may be maintained for the purpose of selecting an appropriate agent or expert in response to a support service from a customer. An agent and expert information database may include a profile for each agent or expert, respectively, that includes individual agent or expert identifier, individual name, address, communication device information, personal information (e.g., age, sex, hobbies, physical condition, spoken languages, ethnicity, geographic area of expertise, etc.), individual skills and/or areas of expertise. The agent/expert database may further include day(s) and time(s) during which and/or areas in which the agent/expert may be contacted to service customer contacts and/or a number of times over a selected period in which the agent/expert may be contacted to service customer contacts (e.g., similar to presence information).

In addition, a service statistics database may also be maintained. A service statistics database may represent any database that stores data related to the operation and management of the support center system 1102. Data such as the number of customers in queue at a certain date and time, the duration of support contact in queue, the rate of contact abandonment, and the use of communication resources are stored in the statistics database. Note that the databases and data stores are shown and described for the purposes of illustration only. These databases and data stores can be implemented or configured in a variety of configurations, which may be implemented locally or remotely over a network. Note that some databases or data stores may be implemented as a single database or store or multiple databases or stores.

In one embodiment, registration module 1201 is responsible for registering a customer and/or a product of a customer, where the customer's personal information or preferences may be stored in a customer profile store as part of customer DB 1112, while the registered product information may be stored in customer DB 1112. For example, when a customer installs a one-touch application on its mobile device, the customer typically performs an initial login to set up a user account, including a username and/or password, as well as customer's preferences (e.g., communication channel preferences). In one embodiment, registration module 1201 can also be used to assist in registering a user for other accounts such as a loyalty account across one or more loyalty programs, a rewards program, etc. This information may be stored in customer DB 1112. In addition, a unique device ID such as a MAC address or IMSI code may be captured and stored in customer DB 1112. As a result, when the customer subsequently launches the one-touch application, the customer can be automatically authenticated by security module 1203 based on this information without requiring the customer to provide the same information again.

According to one embodiment, when a one-touch application is activated or launched from a mobile device by a user, the one-touch application is configured to communicate with service API 1104. Service API 1104 invokes security module 1203 to authenticate the user based on the information (e.g., MAC or IMSI) transmitted from the one-touch application without requiring the user to specifically provide user information.

Once the user has been authenticated, according to one embodiment, service API 1104 transmits a personalized page having a list of one or more products from a customer asset store (not shown) that have been registered to the user. The list of the registered products may be displayed on a display of the mobile device, where each product is associated with one or more communication channels that are available for the user to contact an agent of the support center. In one embodiment, the availability of the communication channels is determined based on the user preference obtained from customer DB 1112 and the client/vendor preference from client database 1111 at that point in time. Such user preference and client/vendor preference may be configured in a user profile and client/vendor profile, respectively, which may be maintained by the support center.

In response to a selection of one or more of the available communication channels received at the service API, according to one embodiment, a unique case identification (ID) is instantly created by case management module 1205 to uniquely represent a current instant of the support case. In addition, a touch plan is created by touch plan engine 1202 and tracked by the unique case ID, where the touch plan represents a roadmap or outline of the corresponding support case activities to be performed throughout the life of the touch plan. The touch plan is updated regarding all activity of the user and is forwarded to an agent assigned to the current case and a communication session is established between the assigned agent and the user via the selected communication channel. Throughout the session the touch plan is updated on all activity between the user, agent and their respective applications.

An agent may be selected based on a variety of considerations, such as a skill set or expertise of the agent, as well as whether the agent has previous experience with the same customer. The touch plan may include one or more references linked with all the information related to the current instant support service, such as related product information, client information, customer information, and support history with the customer, etc., such that the agent can provide the best possible services to the customer. The touch plan may further include suggestion or prediction of products or services that the agent can provide the customer an alternative solution. The suggestion or prediction may be generated by a persuasive engine (not shown) based on the product information and the customer's interactive history, etc. The interaction between the user and the agent is logged by a logging module (not shown) and tracked based on the touch plan and the unique case ID, which may be stored in an interaction history database, for example, for subsequent analysis by an analysis module.

Processing logic associated with the touch plan (e.g., touch plan engine, case management module, or some other logic) also monitors for positive and negative activities from the user, the agent and respective applications. If a negative event is occurring the processing logic can perform adjustments according to the touch plan in knowledge provided, agent scripting spoken to the user and many others in a manner such to turn the interaction positive (e.g., adapt to changing conditions and circumstances). If the activity is positive the processing logic can provide an additional activity in and around product or service upsell, cross sell, upgrades, and product sales, etc. The positive and negative activity monitoring and adjustments are not limited to a user and agent, they can support any form of interaction even long running interactions that exceed the user activity for any period of time.

In some situations, according to one embodiment of the invention, the touch plan may include information that identifies a relationship between two products or services that have been purchased via a client (e.g., purchasing house). When a first product/service changes, the support center may determine that a second product/service may need to change as well based on the touch plan. Accordingly, a proactive service module (not shown) is configured to proactively notify the user regarding the possible change of the second product/service and offers support services for the second product/service, without requiring the user to initiate a support call. A suggestion or offer can be made to the customer by a persuasive engine based on the information obtained from databases 1111-1113 of data warehouse 1109.

According to one embodiment, prior to contacting an agent, a list of support options may be presented to the user, including a link to a publication forum that may contain one or more solutions to a problem associated with the user. Such solutions may be generated by a publication module (not shown) by extracting certain information from knowledge-base from a variety of informational sources, such as, for example, internal support KB 1113A, client/vendor KB (e.g., client database 1111 and client backend system), manufacturer KB (e.g., product database 1110 and manufacturer backend system), online community KB, and/or customer interactive history KB, etc. As a result, a user may find a solution from the publication forum and does not need to contact an agent of the support center, which in turn may lower the cost for the client and/or the customer. This is also referred to as a call avoidance feature. Certain information from data warehouse 1109 may be queried and reported by a reporting module.

Note that components or modules shown in FIG. 12 are described for the purpose of illustration only; more or fewer components or modules may also be implemented. For example, a customer satisfaction system (CSAT) may also be implemented within support center 1102. A CSAT system provides a feedback form to a customer, through a variety of communication channels at the completion of a request or a query made by the customer. The feedback form filled out and provided by customers is stored, reviewed, and analyzed by the CSAT system. All feedback forms stored in the CSAT system are used as a tool to conduct a customer service related survey. The feedback forms are, further used to enhance the service provided by support center 1102.

Referring back to FIG. 11, in one embodiment, community service system 1105 is responsible for communicating with social communities 1116 via an API, for example, to post a message received from a user and to route the responses received from social communities 1116 back to the user. Service center 1102 further includes other components such as a post market service system 1122, which is responsible for handling post market activities associated with the registered products, including selling a registered product on eCommerce sites 1120 and arranging a disposal facility to dispose or recycle the product, etc.

According to one embodiment, in addition to registering a product with the service center, a user can also register, for example, through the application running within a mobile device, one or more social communities and/or one or more eCommerce sites by storing the necessary credentials (e.g., usernames and passwords) of the servers hosting the social communities and eCommerce sites in a database (e.g., user database) of the service center, where the database is associated with a user the mobile device. Subsequently, the user can transmit a sales request to sell or dispose a registered product by specifying one or more of the eCommerce sites.

In response to the sales request, post market service system 1122 of service center 1102 is configured to retrieve the necessary credentials for the specified one or more eCommerce sites and arrange the specified eCommerce sites for selling the product together with the associated credentials to allow the eCommerce sites to authenticate the user for the purpose of selling the product, such that the user does not have to provide the necessary credentials at the point in time of the sales request and the user does not have to provide detailed information of the product to be posted on the eCommerce sites describing the product to be sold. A single sales request received from the mobile device can specify multiple eCommerce sites. The service center can also arrange a disposal facility to dispose (e.g., recycle) a registered product without having a user to specifically contact the disposal facility.

Figure 13:
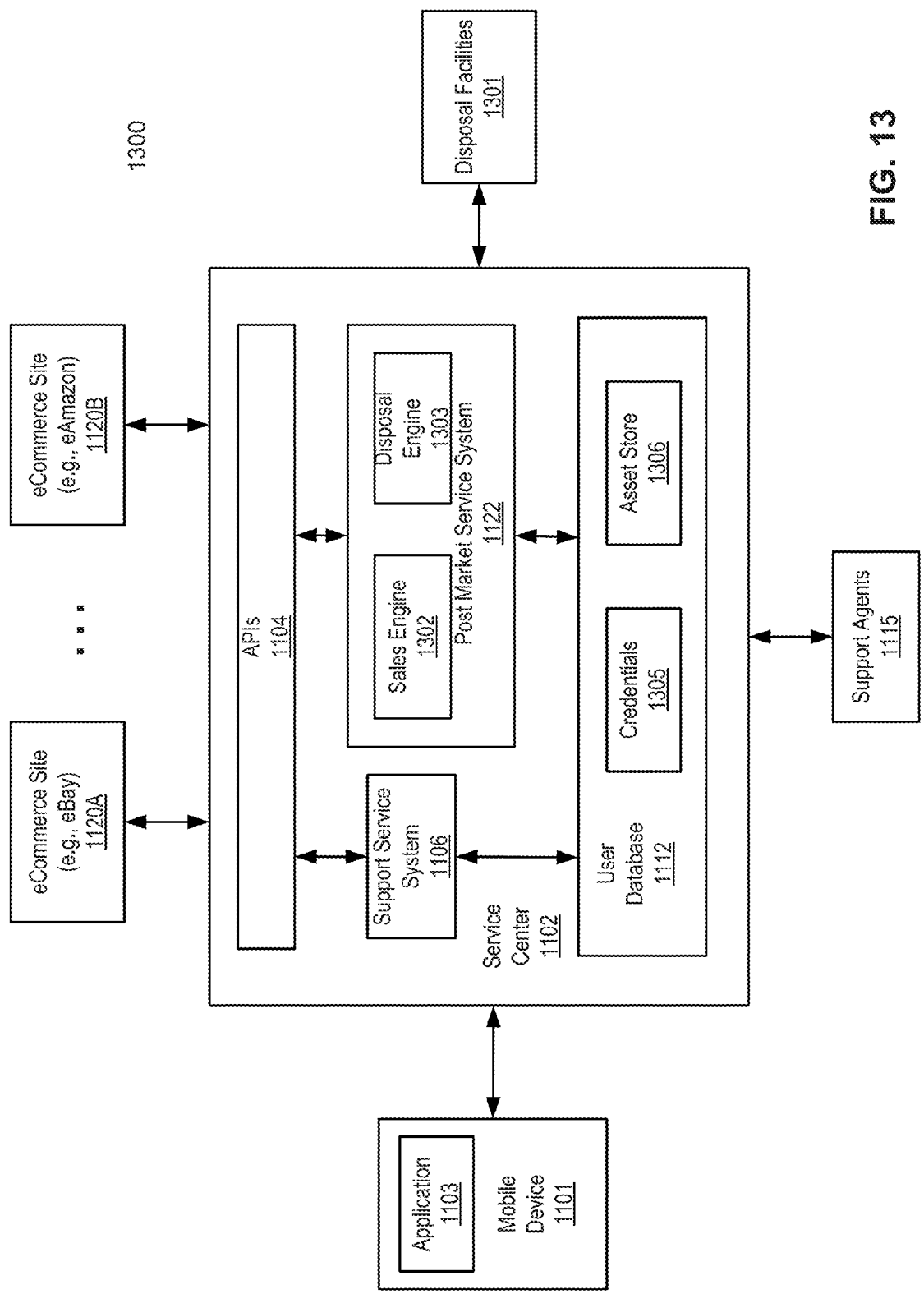
FIG. 13 is a block diagram illustrating an example of a service center according to another embodiment of the invention.

FIG. 13 is a block diagram illustrating an example of a service center according to another embodiment of the invention. For example, system 1300 may be implemented as part of system 1100 of FIG. 11. Referring to FIG. 13, as described above service center 1102 includes support service system 1106 and post market service system 1122. Support service system 1106 is configured to communicate with a user of mobile device via application 1103. Through a service API or APIs, a user can register a product with service center 1102 by scanning a machine-readable code such as a barcode, a universal product code (UPC), or a serial number of the product, for example, using a scanner or camera of mobile device and transmitting the machine-readable code to service center 1102 over a network.

Based on the machine-readable code, a registration module of support service system 1106 is configured to compile any information concerning the product without requiring the user to provide the same detailed information of the product. For example, the registration module is configured to access a variety of informational sources, such as client backend systems and manufacturer backend systems, to obtain the detailed information based on the machine-readable code, without requiring a user to provide the same detailed information.

In addition, according to one embodiment, a user can also register eCommerce sites 1120A-1120B with the service center 1102. For example, a user can provide necessary credentials that are required to access eCommerce sites 1120A-1120B and the credentials are stored in user database 1112 as part of credentials 1305. Examples of credentials 1305 include usernames and/or passwords of the user to access eCommerce sites 1120A-1120B. Credentials 1305 can be subsequently used for accessing eCommerce sites 1120A-1120B without prompting the user for the same.

As described above, support service system 1106 is configured to provide support services to a user regarding a registered product stored in asset store 1306. For example, in response to a request for support services of a registered product received from application 1103 of mobile device 1101, support service system 1106 is configured to establish a communications session between a user of mobile device 1101 and one of agents 1115 using one or more communications channels (e.g., voice, email, chat, video, etc.) that are preferred by the user and are available to the agent. The preference of the communications channels may be previously configured or registered with service center 1102 by the user and such preferences may also be stored in a preference store (note shown) of user database 1112.

According to one embodiment, post market system 1122 includes a sales engine 1302 and disposal engine 1303. Sales engine 1302 is responsible for selling a registered product from asset store 1306 on at least one of eCommerce sites 1120A-1120B. In one embodiment, a user can utilize application 1103 of mobile device to send a request to service center 1102 for selling a registered product. The request may simply identify a registered product with a listing price and one or more identifiers identifying one or more of eCommerce sites 1120A-1120B for selling the product, without having to provide other detailed information such as detailed product information and necessary credentials for accessing the social community sites 1120A-1120B.

In response to the request, sales engine 1302 is configured to retrieve the necessary credentials 1305 required to access eCommerce sites 1120A-1120B and the necessary product information (e.g., description or specification, etc.) from the product database and/or client database. Sales engine 1302 then transmits the product information, listing price, and the associated credentials to the specified eCommerce sites 1120A-1120B via API 1104. API 1104 may include specific APIs for accessing different eCommerce sites using a variety of communications protocols.

The eCommerce sites 1120A-1120B can authenticate the user based on the received credentials without requiring service center 1102 to prompt the user for the same credentials at the time of submitting the sales. Upon having successfully authenticated the user, the sales of the product may be posted on the eCommerce sites 1120A-1120B based on the received product information and the listing price. In one embodiment, a single request from mobile device 101 can be used to post a sales item on multiple eCommerce sites 1120A-1120B without having to have the user to submit the sales item multiple times. Sales engine 1302 is configured to coordinate the sales transactions among eCommerce sites 1120A-1120B, for example, to prevent the same item to be sold on multiple sites, etc. For example, when an item has been sold on a first site, the listing of the same item will be withdrawn from a second site.

In one embodiment, service center 1102 can also perform or invoke another entity to perform market survey concerning current market conditions of a product, for example, based on operating conditions of the product at the point in time, which may be provided by a user. Based on the survey, service center 1102 can provide an estimated market value of a registered product and transmit the estimated value to mobile device 1101 and displayed by application 1103. The estimated market value of the product can help the user to set a selling price.

According to another embodiment, service center 1102 can also promote or suggest other products (e.g., accessories) related to the registered products to the user and provide a purchasing platform to allow a user to purchase the related products. The purchasing functionality may be implemented as part of sales engine 1302 or a separate component. Once a product is purchased via service center 1102, the purchased product is automatically registered within service center 1102 without the user to specifically register the product, for example, based on the product information and/or client information obtained from manufacturer and/or client backend systems.

Note that a manufacturer or retailer often wishes to promote or reward a customer who purchased its product or subscribed its loyalty program. Alternatively, a manufacturer or retailer may also notify a user concerning a recall of user's products. Such a promotion, reward, or notice may be received by service center 102 from a variety of sources such as manufacturers and retailers. Service center 1102 can associate such a promotion or reward with a registered product and transmit such a promotion or reward to mobile device 1101 as a suggestion to the user. As a result, service center 1102 enables the manufacturers or retailers to reach their customers, similar to targeted advertisement. Meanwhile, a user does not have to browse around in order to find out any product upgrades or product recall associated its registered products. The user can simply rely on service center 1102 for such services.

According to another embodiment, disposal engine 1303 is configured to arrange disposal facilities 1301 to dispose a registered product if the user no longer wishes to maintain the product. In this situation, a user does not have to individually find out who can dispose or recycle a particular type of products. Instead, the user can initiate a request from mobile device 1101 requesting disposal of a registered product. In response to the request, disposal engine 1303 is configured to determine a particular one of disposal facilities 1301 that is capable of disposing or recycling the requested product and to transmit the information of the selected one of disposal facilities 1301 to allow the user to contact the selected disposal facility or alternatively, disposal engine 1303 can establish a communications sessions between the user and a customer representative from the selected disposal facility, for example, using a communications channel preferred by the user and available to the customer representative. Thus, service center 1102 is able to provide a single platform capable of providing product registration, support, buying and selling, and disposal, i.e., a full life cycle support of a product.

Referring back to FIG. 11, according to one embodiment, a user can also post a message to one or more of the registered social communities from the application running within the mobile device without having to individually access the social communities. In one embodiment, a user can transmit a request from mobile device 1101 to service center 1102, where the request includes a message to be posted and one or more community identifiers identifying one or more registered social communities. In response, community service system 1105 of service center 1102 is configured to retrieve the associated credentials from the database and to post the message to the specified social communities together with the associated credentials allow the social communities to authenticate the user, without having to prompt the user for the same credentials.

Figure 14:
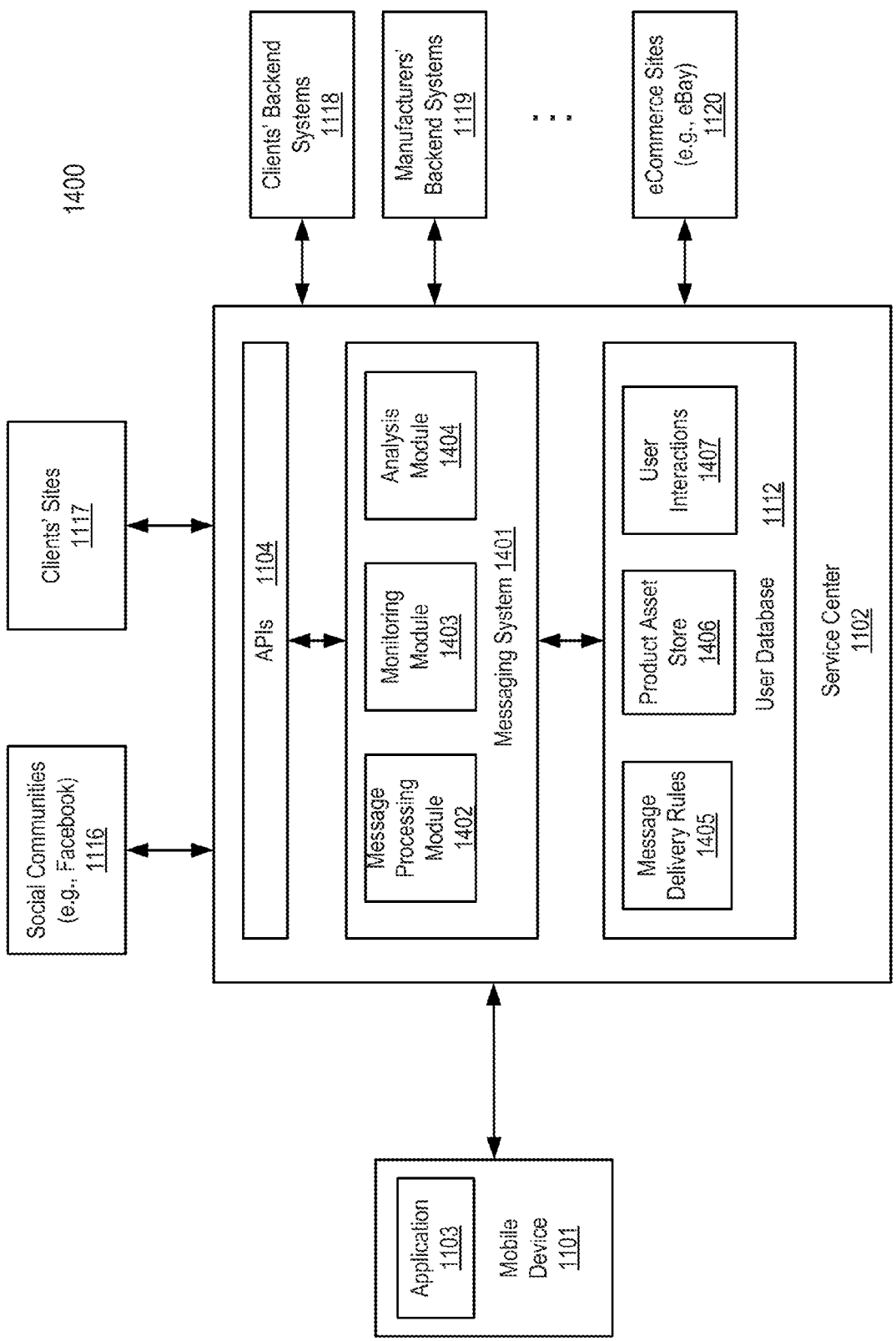
FIG. 14 is a block diagram illustrating a system for processing messages within a service center according to one embodiment of the invention.

FIG. 14 is a block diagram illustrating a system for processing messages within a service center according to one embodiment of the invention. System 1400 may be implemented as part of system 1100 of FIG. 11. Referring to FIG. 14, service center 1102 includes messaging system 1401 to receive messages, via one or more APIs 1104, from a variety of sources, such as social communities 1116, client sites 1117, client backend systems 1118, manufacturer backend systems 1119, and eCommerce sites 1120. The messages may or may not be related to the registered products stored in asset store 1406 of user database 1112 associated with the registered users. For example, a message may be an advertisement received from a retailer or manufacturer, including, but is not limited to, a promotion of a related product or accessory to a registered product, a discount coupon, an upgrade, or a service schedule reminder, etc. Alternatively, a message may be a recall notification concerning a registered product of a user.

In one embodiment, a user can configure a set of one or more delivery rules 1405 specifying whether a particular type of messages or advertisements should be routed to the user. Delivery rules 1405 may also specify whether a message or a particular type of messages associated with a particular registered product should be received by the user. Delivery rules 1405 can also specify whether a message received from a particular source should be forwarded to the user. In one embodiment, certain types of messages are not available to be filtered out. For example, any recall message of any registered product must be routed to users, regardless of the configuration of delivery rules 1405. A message may be routed to a user using one or more communications channels configured by the user as communications preference, which may also be stored in user database 1112.

A message may include an advertisement of products and/or services for a consumer or user delivered via a traditional advertisement service such as Google®, etc. A message may include an offer to a customer provided directly from a manufacturer, loyalty provider, etc., where an offer may be all offers for a product line or only for products registered, or a wish list via the service center. A message may include a social feed received from a variety of social communities. A social feed may be related to user community feedback, comments, suggestions or experience of a particular product or service discussed by their community members or friends.

In one embodiment, in response to a message received one of sources 1116-1120, message processing module 1402 is configured to determine whether the message should be delivered to a user associated with mobile device 1101 based on a set of delivery rules 1405 associated with the user. If delivery rules 1405 permit, the message is routed to mobile device 1101 or one of other devices associated with the user dependent upon the settings of the communications channel preference (not shown). As described above, message may be related to a registered product specified in asset store 1406 of the user. Alternatively, the message may be related to other products or services that are likely interesting to the user, for example, based on user's interactive history, habits, and/or registered products or services, which may be captured and determined over a period of time by monitoring module 1403 and/or analysis module 204 and stored as part of user interactions 1407.

According to one embodiment, a user of mobile device 1101 can set its preference via application 1103 for any messages, advertisements, offers, or feeds that would be presented to mobile device 1101. Application 1103 provides user friendly GUIs to allow the user to specify the message delivery preferences, including manufacturer offers (e.g., product or service offers from a variety of manufacturers such as Dell®, Samsung®, etc.), loyalty offers (e.g., products or services offers from a variety of loyalty or brand providers such as Best Buy®), social feeds (e.g., feeds based on products from social communities such as Facebook® or Twitter®), and other advertisement providers. For each of the message sources, in one embodiment, a user can turn off message delivery for the particular source, turn on the message delivery only for the products registered by the user (e.g., registered products or wish list), or turn on the message delivery for all products provided by the particular source, regardless whether such products have been registered.

Referring back to FIG. 11, in one embodiment, service center 1102 further includes a messaging or advertisement system 1123 responsible for handling any messages received from a variety of partners or parties, such as client sites 1117, client backend systems 1118, manufacturer backend systems 1119, and eCommerce sites 1120. Messages may be related to the registered products of the user, such as, promotions, rewards, and recall messages. Messages may include advertisements from a variety of advertisement providers.

In one embodiment, a user can configure a set of one or more rules to specify whether certain types of messages or advertisements received from vendors or parties (e.g., retailers, manufacturers, social communities, or other advertisement providers), which may or may not be related to a registered product, should be routed to the user. These rules serve as part of message delivery or filtering rules. The service center engages with the related parties to allow the related parties to get in touch with the user by sending certain messages such as product promotions, rewards, and/or recalls, etc. to the user. The service center may send a message to a user via one or more communications channels preferred by the user, which may also be configured as a set of rules and stored in a database associated with the user.

According to another embodiment, an advertisement received from a vendor is delivered by the service center to a mobile device of a user based on a set of delivery rules associated with the user. The advertisement is displayed on a display of the mobile device by an application running therein. In addition, the service center and/or the application are configured to track interactions of the user with respect to the displayed advertisement to determine user behaviors, patterns, or trends in view of the displayed advertisement. An analysis is performed on the user interaction and the result of the analysis may be utilized to configure further advertisement delivery by the service center and/or the vendors.

According to another embodiment, service center 1102 is configured to identify users that have at least one common product registered with the service center and are also members of a social community. The service center is configured to send a message to those users to invite them to connect (e.g., becoming friends or following a friend) with each other via the social community. The social community is hosted by a third party and communicatively coupled to the service center over a network. The service center may also deliver messages or items posted by one of those users to another one of those users on behalf of the social community, without requiring such users to individually or directly accessing the social community. The service center can also deliver messages or items to a particular user posted by other users of the social community, where the messages or items are related to a registered product of that particular user.

According to a further embodiment, an application running on a mobile device provides a user friendly graphical user interface (GUI) to allow a user to configure a set of one or more delivery rules concerning whether certain types of messages or advertisements should be received at the mobile device from a service center. The service center is configured to deliver messages or advertisements on behalf of a message or advertisement provider, which can be a client to the service center, a retailer, a manufacturer, a social community, or other content providers. A user can utilize the GUI to configure, for each of the providers, whether a message associated with a particular registered product of the user or all products in general related to the provider should be received by the mobile device. The settings of the delivery rules are then transmitted from the mobile device to the service center to allow the service center to deliver subsequent messages or advertisements on behalf of the message or advertisement providers accordingly.

Figure 15:
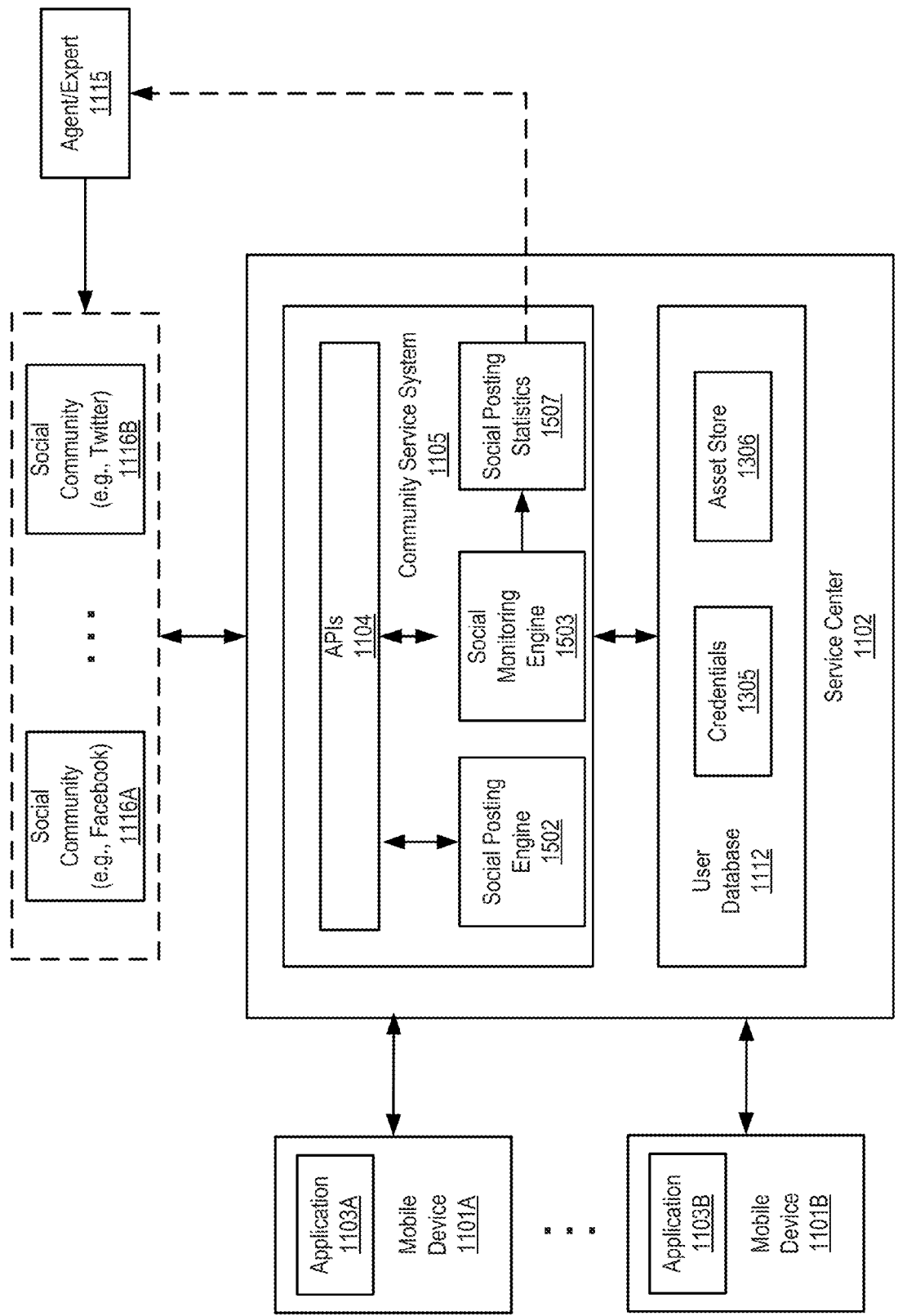
FIG. 15 is a block diagram illustrating a service center having a social community accessing platform according to one embodiment of the invention.

FIG. 15 is a block diagram illustrating a service center having a social community accessing platform according to one embodiment of the invention. Referring to FIG. 15, in one embodiment, community service system 1105 includes, but is not limited to, social posting engine 1502 and social monitoring engine 1503 communicatively coupled to social communities 1116A-1116B via APIs 1104. APIs 1104 may be implemented as a common API or separate APIs for accessing social communities 1116A-1116B, using a variety of communications protocols such as TCP/IP or proprietary protocols. Social posting engine 1502 allows a user to post a message via application 1103 of mobile device 1101 to one or more of social communities 1116A-1116B without having to leave application 103 of mobile device 1101.

According to one embodiment, when a user wishes to post a message to one or more of social communities 1116A-1116B, the user can create a message on a GUI page of application 103 and specify the social community or communities. The request for posting a message is then transmitted from mobile device 1101 to service center 1102 and received by social posting engine 1502. In one embodiment, the request includes information identifying a message to be posted, one or more social communities in which the message is to be posted, and a registered product associated with the posting. Based on the request, social posting engine 1502 is configured to retrieve the necessary credentials from credential store 1305 for accessing the social communities. The credentials for accessing social communities 1116A-1116B may be previously registered with service center 1102 and stored in credential store 1305. Examples of the credentials 1305 may include usernames and passwords.

Based on the registered product, social posting engine 1502 can also identify one or more discussion threads or forums of social communities 1116A-1116B that are associated with the product. Thereafter, social posting engine 1502 transmits via APIs 1104 the message and the necessary credentials to one or more of social communities 1116A-1116B for the purpose of posting the message. If a connection to a social community is unavailable at the point in time, social posting engine 1502 may store the post in a queue (not shown) until the connection becomes available. As a result, a user does not have to provide the necessary credentials to service center 1102 at the time of posting. The user may not have to identify which of the discussion forums or discussion threads in which the message should be posted. All the user needs is to specify which of the social communities and the product associated with the posting.

Similarly, when a response is received from social communities 1116A-1116B in response to the posted message, a social posting engine (not shown) is configured to route the response back to mobile device 1101. Alternatively, the response may be routed to the user according to one or more communications channels preferred by the user, which may be configured previously and stored in user database 1112 (e.g., user profile). Thus, a single message can be posted onto multiple accounts of the same social community. A single message can also be posted onto multiple accounts across multiple social communities. A social community can be hosted or maintained by a third-party social networking provider (e.g., Facebook®, Twitter®), a retailer (e.g., Amazon®, Bestbuy®), or a manufacturer (e.g., Samsung®).

According to one embodiment, community service system 1105 further includes social monitoring engine 1503 configured to monitor message postings to social communities 1116A-1116B via social posting engine 1502 and the responses received from social communities 1116A-1116B. In one embodiment social monitoring engine 1503 is configured to collect data concerning all the social posting activities. The data collection may include, but is not limited to, user IDs and date and time of post, communities the pose is made to, user accounts post is being made to, user account the post is being made from, device the post is being made from (e.g., mobile, tablet, Web), etc. Based on the monitoring, social posting statistics 1507 can be generated. In one embodiment, social posting statistics 1507 includes, but is not limited to, a number of posts by time and day, number of posts by day of week, number of users creating posts, number of products with posts, number of brands or loyalty with posts, and products least posted about, etc.

In one embodiment, an enhanced analysis may be performed on the collected data and statistics to identify trends, activities based on events, including, but not limited to, most social channels used to post, the types of accounts (e.g., user accounts, manufacturers/loyalty accounts or both) of the posts, products associated with the posts, services associated with the posts, the brands associated with the posts, number of the posts by products and services, and times of day and days of week of the posts, etc.

Social monitoring engine 1503 is configured to monitor a social environment gathering data about topics posted in communities 1116A-1116B. In one embodiment, social monitoring engine 1503 is configured to identify posts that have both positive and/or negative sentiments regarding a product or brand. Social monitoring engine 1503 may also identify activities based on either the positive or negative sentiment such as whether the traffic is heavy on the topic, whether a positive sentiment is trending negative, and whether a negative sentiment is trending positive. Social monitoring engine 1503 may also determine other social community sites that are discussing the same or similar topics or trends. Social monitoring engine 1503 may also determine the most active users participating in the community and/or whether the community is working to find a solution or the community needs an assistance to move forward. The sentiment data or social statistics 1507 can be utilized by agent/expert/specialist 1115 to participate in the discussion, for example, by interjecting comments into a negative discussion and attempting to turn it positive, or identifying a solution that the community has found to be positive and posts to other communities that may not have knowledge of the resolution. The solution or comments posted in a discussion forum may also be converted into knowledgebase for future references.

In one embodiment, based on the monitoring, a user having participated in a discussion and posted positive comments about a product may be rewarded by the service center, a retailer, and/or a manufacturer associated with the product. A user having posted a negative comment about a product may be contacted by an agent, expert, or specialist to resolve the issues in an attempt to turn the negative experience into a positive one.

Referring back to FIG. 11, according to one embodiment, service center 1102 further includes a self-support system 1121 to allow a user to access self-support knowledgebase (KB) such as KB 1113 to find a solution to its problem without having to invoke a live support with a support agent. Self-support system 1121 may be implemented as a standalone Web server communicatively coupled to service center 1102 over a network. In one embodiment, self-support system 1121 further includes a learning system to provide a series of courses to allow a user to gain training without having to have a live course on behalf of a client.

Figure 16:
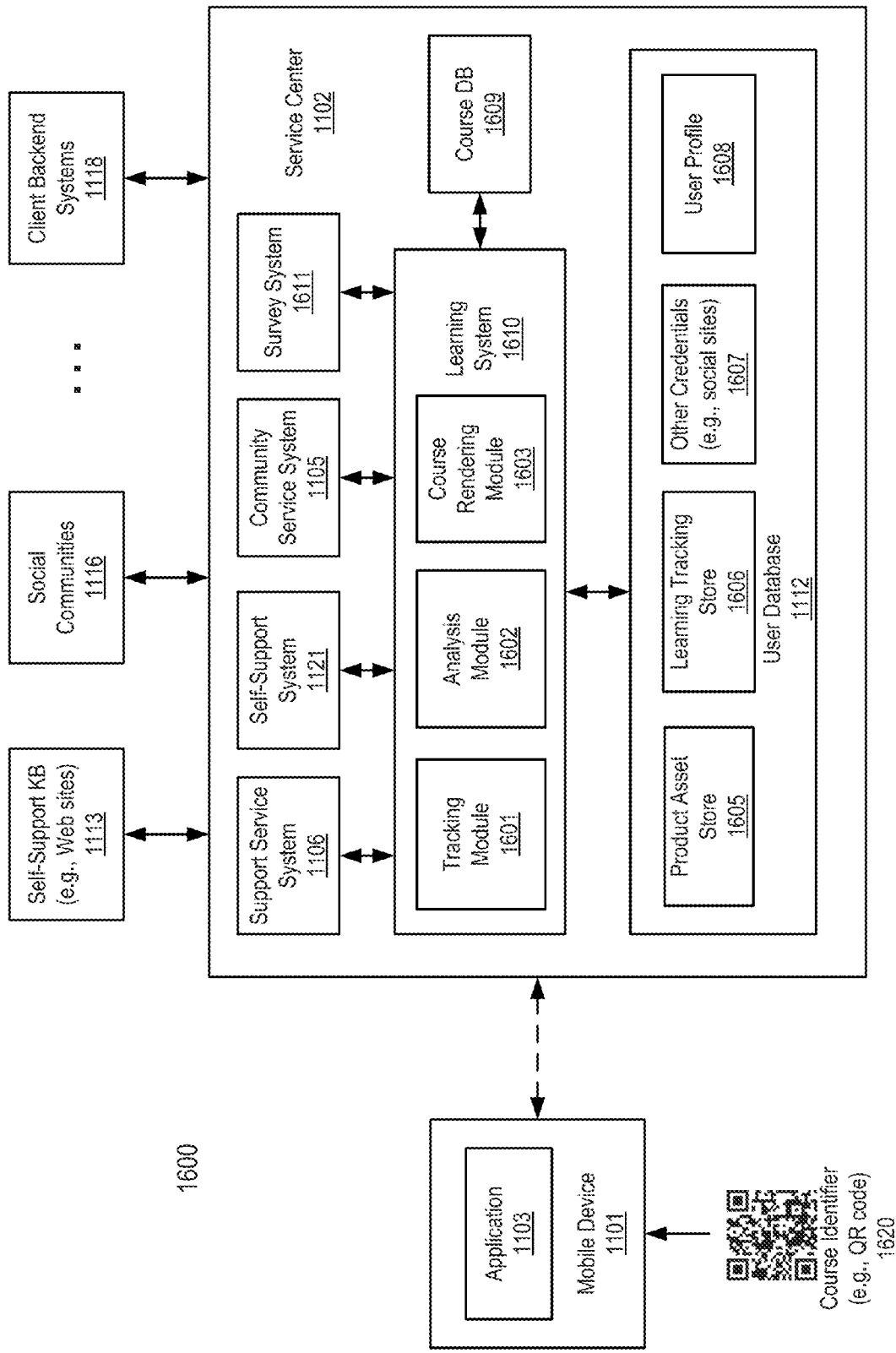
FIG. 16 is a block diagram illustrating a learning system of a service center according to one embodiment of the invention.

FIG. 16 is a block diagram illustrating a learning system of a service center according to one embodiment of the invention. System 1600 may be implemented as part of system 1100 of FIG. 11. Referring to FIG. 16, according to one embodiment, learning system 1610 includes tracking module 1601, analysis module 1602, and course rendering module 1603, which are configured to provide learning or training courses compiled in course database 1609 to a customer such as user of mobile device 1101. The courses are provided to users by learning system 1610 on behalf of a product provider that provides the product described by the learning course.

In one embodiment, in response to a request for accessing an online course, course rendering module 1603 of learning system 1610 identifies, renders, and transmits a course segment to a remote device of a user. The request may include a machine-readable code (e.g., QR code) that is obtained via mobile device 1101 of the user by scanning machine-readable code 1620 disposed on a product using a scanner or camera of mobile device 1101. Machine-readable code 1620 can be a variety of codes such as a QR code, a serial number, a UPC code, a barcode, an image, etc. The course or courses are identified from course database 1609 based on machine-readable code 1620 without having the user to specifically provide detailed information identifying the courses.

For example, the user can use its mobile device to scan a product identification code on the exterior surface of the product and access the courses provided by learning system 1610. Note that the product in question does not have to be a registered product; it could just be a product that may be potentially purchased by the user, as long as the user is a registered member of service center 1102 and/or a product provider of the product in question is a client of service center 102.

Based on machine-readable code 1620 received from mobile device 1101, according to one embodiment, functional capabilities (e.g., display resolution, network bandwidth, processing power, current geographic location of the device, etc.) of mobile device 1101 may be automatically determined by service center 1102, for example, without user intervention. Some of the device information may be collected when mobile device 1101 was registered with service center 1102 by the user. The courses may be rendered (e.g., in a form of a media stream) by course rendering module 1603 in view of the capabilities of the mobile device such that the courses can be properly presented by mobile device 1101. The courses may also be rendered based on user's previous learning actions. For example, based on the machine-readable code, course rendering module 1603 is configured to determine the previous endpoint of a course segment and to render a course segment having a starting point that will "pick up" the previous endpoint, such that the user does not have to repeat the previously viewed content. The user learning history may be monitored and tracked by tracking module 201.

While the user navigates the course segment, according to one embodiment, user interaction with the course is tracked and captured by tracking module 1601 of service center 1102. The user interaction may be monitored and tracked by application 1103 running at mobile device 1101 and periodically transmitted from mobile device 1101 to learning system 1610 of service center 1102 over a network. In one embodiment, analysis module 1602 is configured to perform an analysis on the tracking data and to generate an analysis report. The analysis report may be provided to a product provider to allow the product provider to determine customer satisfaction or other product and marketing purposes (e.g., targeted advertisements). In this situation, a product provider is a client of service center 1102 and the analysis report may be transmitted to the client such as client backend systems 1118. Alternatively, analysis module 1602 may invoke a customer satisfaction (CSAT) system, which may be maintained within service center 1102 or by a remote third party vendor, to compute a customer satisfaction metrics and provide the customer satisfaction metrics to the client.

In one embodiment, based on the analysis, a new or related product is identified and recommended to the user. If the user decides to acquire the recommended product, service center 1102 may allow the user to access an eCommerce site to acquire the recommended product. Service center 1102 is configured to automatically register the product and store the registered product information in product asset store 1605 associated with the user.

In one embodiment, based on the analysis, course rendering module 1603 is configured to customize or generate further courses for the user or for other users who may have similar concerns. The analysis report can also be utilized to generate a new article or modify an existing article of a self-support knowledgebase (e.g., a Web site hosting solutions to common issues such as frequently asked questions or FAQ). The analysis report may also be utilized to update or spin off a discussion thread for further discussion in an online community or social community via community service system 1105.

According to one embodiment, a course is presented in a manner such that a user can get in touch with an agent for live support, a specialist associated with a self-support knowledgebase, and/or a friend of a social community to further engage discussions of topics associated with the course and/or the associated product. In one embodiment, if the user is unsatisfied with a description of a particular course, the user can instantly activate an embedded control (e.g., a button or a link) at a particular place in time to request a further assistance or access additional information related to the course. For example, during or at the end of a learning segment, survey system 1611 may transmit a survey inquiry to mobile device 1101 to prompt the user whether the user is satisfied with the particular learning segment and collect the user response for further analysis. Meanwhile, one or more buttons or links are presented to the user to allow the user to initiate a further action.

For example, while navigating a course according to one embodiment, a user can activate a control or button embedded or associated with the course to request a live support with an agent or specialist. Based on the request received at the service center and the tracking data collected during the course, support service system 1106 is configured to identify and select an agent who is familiar with the description of the course and/or the product in question to get in touch with the user via a communications channel (e.g., voice, chat, email) that is preferred by the user (e.g., based on user preference previously configured and stored as part of a user profile) and is available (e.g., based on a configuration of a client that is associated with the course) to the agent. In addition, support service system 1106 is configured to compile all the necessary information concerning the user (e.g., user preference, user interactive history), the product in question, the learning course currently presented to the user, as well as the tracking data of the learning course collected by tracking module 1601 and the analysis performed by analysis module 1602, generating a support session context. Support service system 1106 then transmits the support session context to the selected agent to be available at the desktop of the agent, such that the agent has all the necessary information during a live support session.

Alternatively, the user can activate a control or button from the course to request accessing a self-support knowledgebase (e.g., Web site) for a particular article that is related to the content of the course. In response to the request, self-support system 1121 is configured to identify one or more articles that are related to content of the learning course segment at the point in time from a self-support knowledgebase hosted by a knowledgebase server such as a Web server. The one or more articles may be identified based on the tracking data of the learning course collected by tracking module 1601 and the analysis performed by analysis module 1602. Self-support system 1121 is configured to transmit one or more links referencing the articles to mobile device 1101 such that the user can access the articles via the links from mobile device 1101. Self-support system 1121 and learning system 1610 may be implemented as a single system. In addition according to one embodiment, from the self-support articles, the user can also initiate a live support session with an agent of service center 1102 via a link or button presented along with the articles. Alternatively, from the self-support articles, the user can access a related discussion forum hosted by an online community via community service system 1105. Furthermore, since the user accesses the community via self-support system 1121, the user interaction with the articles can be pinpointed and tracked by the self-support system and fed back to service center 1102 for further analysis. For example, based on the user interaction with the learning course and self-support articles, self-support system 1121 is configured to generate further self-support articles to be posted in the self-support knowledgebase.

Furthermore, a user can also activate a control or button from the course to request access or participation in a discussion forum of an online community that is related to content of the course. In response to the request, community service system 1105 is configured to identify a discussion thread that is hosted by an online community and related to the content of the course at the point in time. Community service system 1105 transmits information regarding the discussion thread to mobile device 1101. According to one embodiment, community service system 1105 may automatically log into the online community on behalf of the user using the corresponding credentials (e.g., username and password) that have been previously provided to service center 1102 and stored as part of database 1609. As a result, the user does not have to provide the same at the point in time.

Alternatively, according to another embodiment, the user can also share the course segment with its friends in an online community. For example, the user can activate a "share" button on a graphical user interface presenting the course to request sharing the course segment. In response to the request, community service system 1105 is configured to log in and access the online community and to request the sharing of the course by transmitting a link of the course to the online community on behalf of the user. In this way, the user does not have to individually access the online community in which the user has to launch another browser session and provide the necessary credentials in order to log into the online community, which sometimes is inconvenient. Furthermore, since the user accesses the community via community service system 1105, the user interaction with the community can be pinpointed and tracked by the community and provided back to service center 1102 for further analysis as described above.

Referring back to FIG. 11, according to one embodiment, service center 1102 further includes guided support identification system 1125 configured to analyze user interaction or behaviors to predict or determine a support subject matter that a user may potentially need. Such a support subject matter may be determined based on user interaction while a user is navigating a presentation provided by a remote device such as a Web site or an application running at computing device 1101, where the presentation (e.g., application 1103) includes information describing a possible solution to a problem of a product or service, which may be related to or similar to a product or service the user is interested in.

The user interaction may be captured (e.g., by a capturing logic integrated within or accessible by the presentation) at the remote device and transmitted to guided support identification system 1125 over a network while the user is navigating the presentation at remote device 1101. Based on the predicted subject matter (also referred to as a support type), a skill set (also referred to as a skill route) that is required to provide support services of the subject matter is identified. When the user subsequently requests a live support, for example, within the same user session, an agent having the identified skill set is selected to provide support services to the user. The user interaction may be periodically captured and transmitted to the service center during navigation of the presentation. In response, guided support identification system 1125 is configured to automatically update and maintain the subject matter determined based on the latest user interaction prior to the user's request for a live support.

As a result, the guided support identification system is able to get users in need of assistance to a specific skill or expert specialist that is able to support their request or need, even before the user initiates a live support. Once the support subject matter and the required skill set have been identified, a route context (e.g., touch plan) can be generated by support service system 1106, where the routing context includes all the necessary information an agent needs in order to provide the best support services to the user. Such an agent is referred to herein as a recommended agent recommended by the service center. A communications session is then established by multi-channel communications and routing system 1108 and the routing context is routed to the selected agent.

Figure 17:
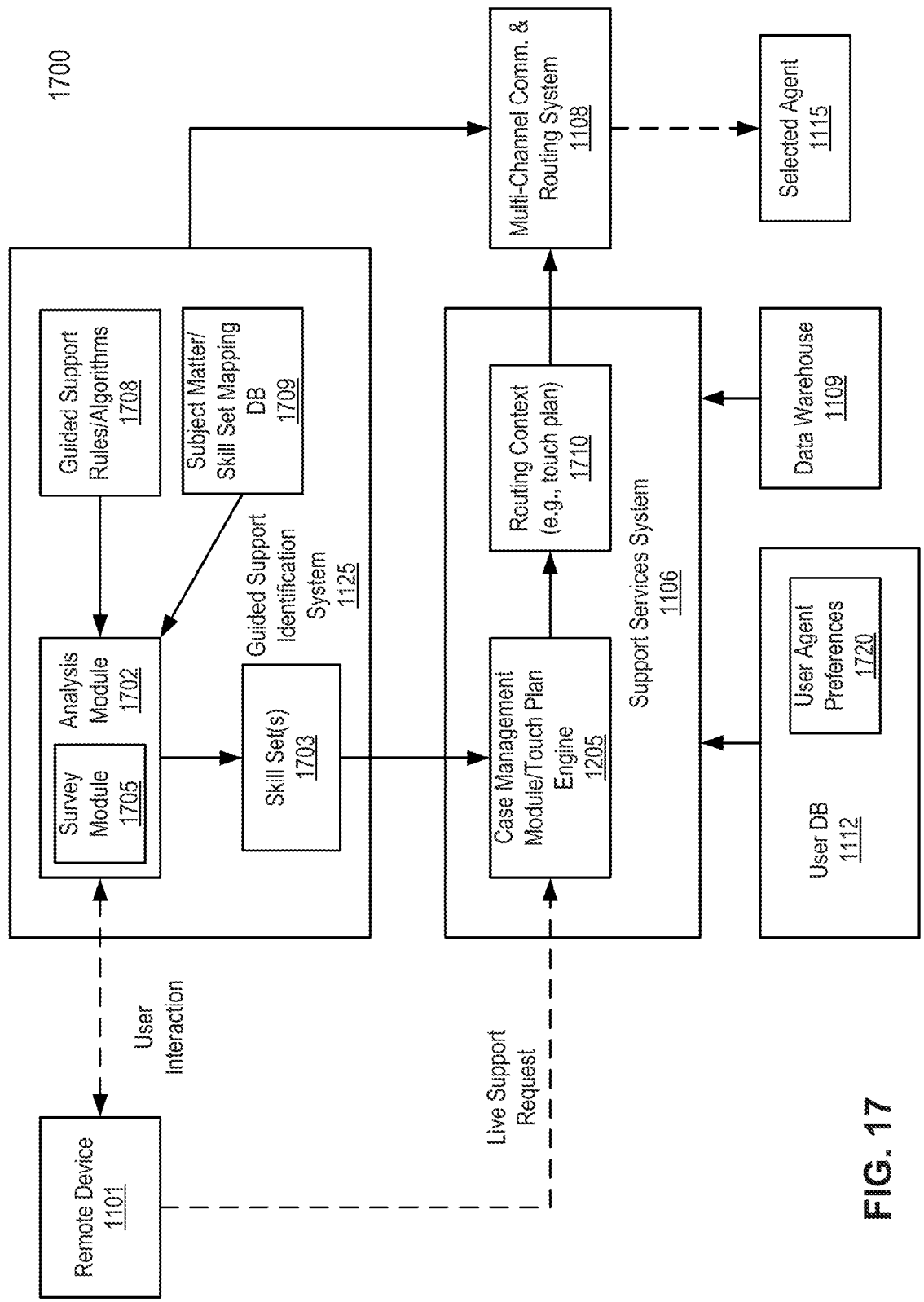
FIG. 17 is a block diagram illustrating an example of a guided support identification system according to one embodiment of the invention.

FIG. 17 is a block diagram illustrating an example of a guided support identification system according to one embodiment of the invention. Referring to FIG. 17, in one embodiment, guided support identification system 1125 includes analysis module 1702 to analyze user interaction with a presentation which may be captured at remote device 1101. Remote device 1101 may be a mobile device having an application running therein or a Web server hosting a Web page. The presentation presented by the application or Web page may include information describing a possible solution to a problem related to a product or service. In response to the user interaction, analysis module 1702 is configured to analyze and determine a support subject matter (e.g., support type) based on guided support rules or algorithms that the user may be interested in.

Guided support rules or algorithms 1708 may be designed and configured specifically tailored to the representation currently navigated by the user at remote device 1101. For example, guided support rules or algorithms 1708 may specify the overall support subject matter for the topic of the presentation. Guided support rules or algorithms 1708 may also include specific support subject matters for different parts, links, or paths within the presentation. When a user interacts with a different section of the presentation, it may yield a different support subject matter. In one embodiment, the captured user interaction may further include an amount of time the user has spent on a specific section of the presentation. Such an amount of time may be utilized as a weight factor in deciding which of the support subject matters will prevail.

Once the support subject matter has been determined, analysis module 1702 is configured to determine one or more skill set 1703 that are required to provide the associated support services based on support subject matter and skill set mapping database or table 1709. The skill set 1703 may be utilized to identify one or more agents to be recommended to the user of remote device 1101 as recommended agents. Subject matter and skill set mapping table 1709 includes information identifying one or more skill sets that are required to provide support services for a particular support subject matter. Subject matter and skill set mapping table 1709 may optionally include information identifying one or more agents or specialists that qualify for each of the skill sets.

In addition, according to one embodiment, user agent preferences 1720 are maintained in user database 1112 associated with a user. That is, each user has its own agent preferences, respectively, for example, dependent upon previous experience of previous support sessions. Agent preferences 1720 include a variety of information concerning the agents known to a particular user, such as, agent identifiers, ratings (e.g., ratings rated by all users in general and/or a specific rating rated by the particular user), and/or other information (e.g., history, products, subject matters, etc.).

When the user initiates a live support from remote device 1101, for example, by activating a support button or control from the presentation after navigating the presentation, a live support request is received by support service system 1106. This could be a situation in which after the user has navigated a certain section of the presentation, the user does not quite understand or is not satisfied with the description. The user may want to have a live session with a specialist to further discuss further details. In one embodiment, the live support button was not available in the presentation initially. Based on the analysis of the user interaction, analysis module 1702 may determine that the user may wish to have a live support session at a certain point in time. As a result, guided support identification system 1125 may cause remote device 1101 to present a live support control to the user, which may be in a form of a displayed button, a voice activated control, or a combination of both, to allow the user to initiate a live support session.

In response to the live support request, in one embodiment, case management module/touch plan engine 1205 is configured to receive a list of one or more recommended agents provided by guided support identification system 1125 and/or one or more preferred agents of the user retrieved from user agent preferences 1720. A list of the recommended agents and preferred agents is transmitted to remote device 1101. The list of the recommended agents and preferred agents is presented via a graphical user interface (GUI) displayed on a display of device 1101 to allow the user to select one of the recommended agents and preferred agents for the live support session. Note that the list of the recommended agents and preferred agents may also be transmitted by case management module/touch plan engine 1205. Case management module/touch plan engine 1205 and/or guided support identification system 1125 may also cause remote device 1101 to provide a list of communications options such as voice, chat, email, video, etc. to allow the user to select one or more of the choices to establish a live session with an agent or specialist. The list of communications options may be previously configured based on user preference and client preference.

In response to a user selection of an agent (e.g., system randomly assigned agent, user-selected preferred or recommended agent) and/or a communications option, according to one embodiment, case management module or touch plan engine 304 is configured to compile and generate routing context (e.g., touch plan) 1710 based on information from data warehouse 1109, including user information, client information, product information, user interaction history, etc. Routing context 1710 is then provided to multi-channel communications and routing system 1108 to be routed to agent 1115, where routing context 1710 is presented to agent 1115 as part of a screen pop at a desktop of the agent, such that when agent 1115 communicates with the user of remote device 1101, agent 1115 has all the necessary information concerning the user and the product in question.

Furthermore, according to one embodiment, at a conclusion of the live support session, survey module 1705 is configured to transmit a survey to remote device 1101 to allow the user to provide a feedback, such as a rating, concerning quality of the selected agent. The feedback is utilized to update the ratings of the selected agent in general, as well as a rating of the agent as a preferred agent associated with the user. Such a rating may affect a subsequent selection of recommended agent candidates and preferred agent candidates.

According to one embodiment, while the user is navigating the presentation at remote device 1101, the user interaction with the presentation is periodically transmitted from remote device and received by analysis module 1702. Based on the user interaction, the support subject matter may be periodically determined and skill set 1703 may be determined or updated, which may override a previous one. The received user interaction may also be stored in a database of the service center as part of user interaction history. Thus, skill set 1703 may be same or different at any moment dependent upon the user interaction at the point in time. Further, skill set 1703 may or may not be utilized dependent upon whether the user ends up requesting a live support during the current user session. Thus, the determined skill set 1703 may only be utilized during a current user session (e.g., same browser session or same instant of an application). When the current user session ends, the determined skill set may be discarded. When a user initiates a new session, the above operations may be repeatedly performed and a new set of skills may be determined dependent upon the user interaction at the point in time.

Figure 18:
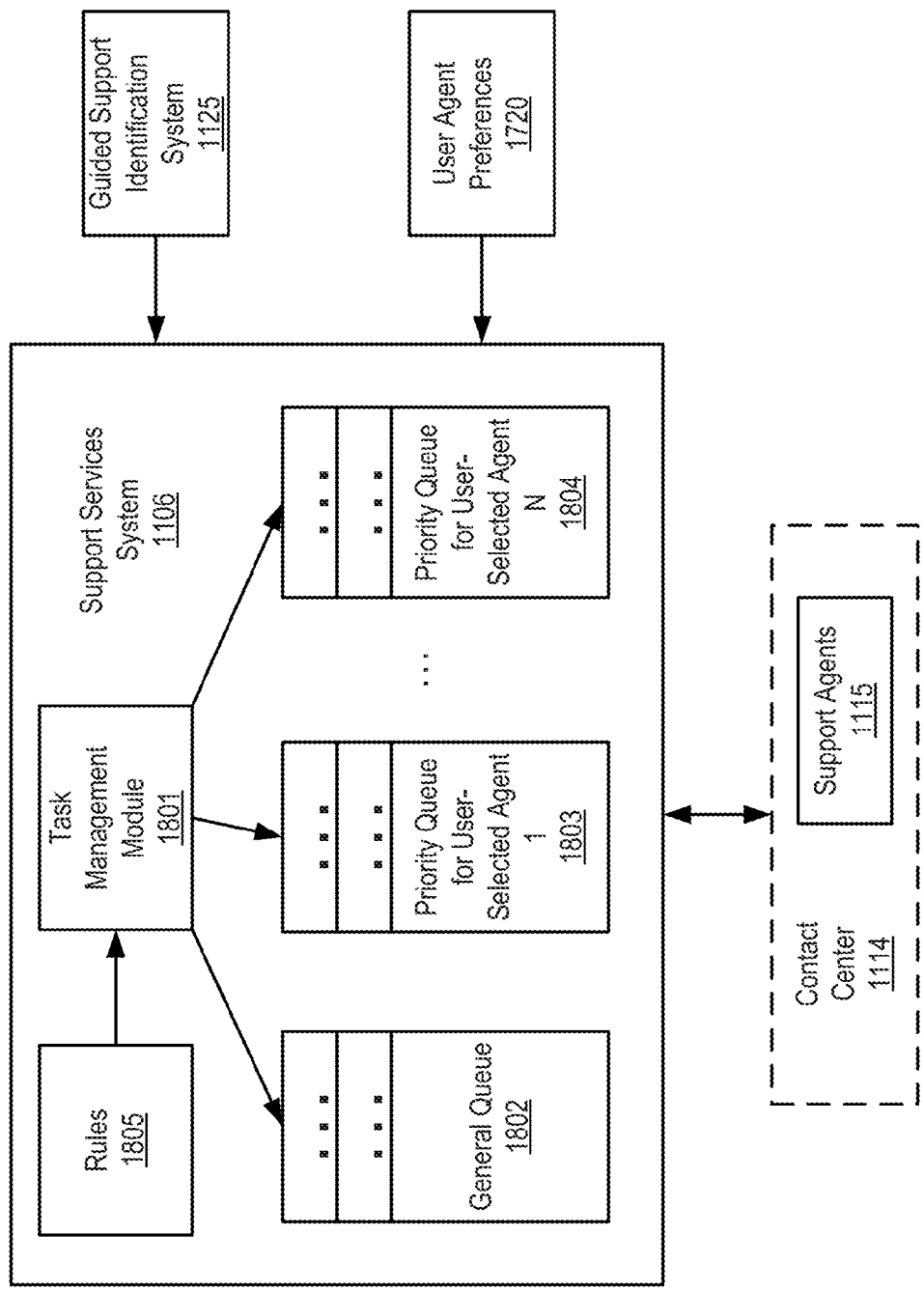
FIG. 18 is a block diagram illustrating a support service system of a service center according to another embodiment of the invention.

FIG. 18 is a block diagram illustrating a support service system of a service center according to another embodiment of the invention. Referring to FIG. 18, support services system 1106 includes task management module 1801 to manage pending support service requests in multiple queues 1802-1804. As described above, an agent selected for a live support session may be selected by a user (e.g., one of recommended agents and preferred agents) or by the system automatically (e.g., a randomly assigned agent). According to one embodiment, general queue 1802 is utilized to store pending support service requests in which a user does not select any of the recommended agents and/or preferred agent. In this situation, the system will put the pending request in general queue 1802 such that the request will be serviced when a next agent becomes available. Note that although the user does not select an agent, an agent assigned to the user may be identified and selected by the system such as the guided support identification system 1125 described above. In such a situation, the task of the selected agent is put in general queue 1802, where the task is handled on a first-come-first-served basis by a next available agent. Note that general queue 1802 may be the one associated with a particular subject matter or support type, or a particular skill set, which may be identified by the guided support identification system.

In addition, according to one embodiment, if the user actively selects an agent, either a preferred agent or a recommended agent, the task will be put into a priority queue, such as queues 1803-1804, which is specifically allocated for the selected agent. In one embodiment, the selected agent typically has to finish the support requests in the corresponding queue (e.g., queues 1803-1804) before taking on the tasks pending in general queue 1802. Alternatively, a selected agent may take on a task in general queue 1802 after serving every predetermined number of tasks in its priority queue. Such priority scheme may be configurable based on a set of rules 1805, which may be configured based on a variety of data, such as subject matters or support types, clients, products, skill sets, etc.

Referring back to FIG. 11, according to one embodiment, route sequence manager 1107 is configured to manage route sequence maps for a variety of users and/or a variety of clients. Route sequence manager 1107 may be implemented as part of self-support system 1121. Route sequence manager 1107 is to allow a user or an administrator to configure a route sequence map to help guiding a user to navigate resources available from a service center, such as, obtaining support services from a support service agent concerning a product or service provided by a client of the service center. A route sequence map is a collection of route sequences pulled together allowing a variety of operations to be performed via a service center and initiated from a single application such as application 1103 of client device 1101. A route sequence map can logically represent a global route context of a user that can lead to a variety of actions performed and/or one or more further route sequences of one or more related subject matters. Once a route sequence map has been configured via route sequence manager 1107 and stored in one of the databases 1110-1113, a user can initiate from application 1103 from device 1101 to navigate the preconfigured resources associated with the route sequence map available from service center 1102, without having to provide detailed information regarding how to access those resources at runtime.

According to one embodiment, route sequence manager 1107 of service center 1102 provides a configuration interface, such as an application programming interface (API) or a Web-based interface (e.g., Web portal) via a variety of communication protocols, which may be implemented as part of API 1104, to allow an end user or an administrator of a corporate client to configure and/or create a route sequence map for the end user or users associated with the corporate client (e.g., employees of a corporation and/or buyers of products associated with a retailer or manufacturer). A route sequence map can be utilized as a road or navigation map allowing a user navigating elements or nodes of the route sequence map to reach certain resources available from service center 1102 without requiring the user to specifically provide detailed information at runtime.

In one embodiment, a route sequence map includes various context elements or nodes arranged in a hierarchical structure. Each context element includes a property having one or more property values or attributes that can be used to specify one or more actions and/or one or more links to one or more other context elements (e.g., child context elements). A user or administrator can configure via a configuration interface of the service center to populate the property values of each context element. A context element can be one of an action context element and a navigation context element. An action context element can be configured such that when activated will cause the service center to perform an action using a method specified by one or more property values of the action context element. For example, an action context element can be configured to cause the service center to contact a particular person (e.g., friend or family member of a user, or a service support agent of the service center) using a particular communication method (e.g., voice, email, text, video, chat). As a result, when a user activates this action context element from an application such as a mobile phone application, service center 1102 can look up the property values of the corresponding action context element and to establish a communication session with a remote user associated with the action context element using a communication method specified by the action context element, without having the local user to provide the detailed information regarding how to reach the remote user at runtime.

A navigation context element can be configured, based on a variety of factors set forth above, that when activated, one or more related context elements can be identified that are related to the activated context element. During the configuration phase, a user can specify what other context elements (e.g., child context elements) are related to the current context element. The related context elements can include an action context element and/or another navigation context element that leads to one or more further context elements (e.g., grandchild context elements). For example, a context element "Finance" can be configured to be associated with one or more child context elements, such as "Chase," "Bank of America," and "Wells Fargo," etc. In this way, a user can group or associate all of the financial institutes under the "Finance" context element and navigate each of the associated child context elements from there, without having to search and provide details for each of those entities. Alternatively, the "Finance" context element can be associated with a child action context element such as a "Call My Financial Advisor" context element that when activated will make a voice call to the specified finance advisor, which may be specified in one or more property values of the "Call My Financial Advisor" context element. As a result, the user does not have to provide detailed information on how to call its financial advisor at run time. The configured route sequence map can then be stored in a database of the service center, such as a user database and/or client database. Such a route sequence map can be retrieved subsequently by route sequence manager 1107 of service center 1102 in response to a request or command received from application 1103 running at remote device 1101 over a network.

According to one embodiment, application (also referred to as a navigation application) 1103 can be provided and installed at a device of a user, such as a mobile phone, laptop, desktop, or a Web-based application. When application 1103 is launched from client device 1101, application 1103 is to access service center 1102 over a network (e.g., Internet) for authenticating a user of the client device, for example, based on username and password of a user associated with client device 1101 and/or a unique device identifier (ID) of client device 1101. Once the user has been successfully authenticated by service center 1102, route sequence manager 1107 of service center 1102 retrieves a route sequence map from a user database and/or client database that has been previously configured and stored and transmits information representing the route sequence map to the client device to be presented at a display of client device 1101 by application 1103.

According to one embodiment, a route sequence map is displayed in multiple rows of graphical representations, each graphical representation corresponding to a context element of the route sequence map. An inner or lower row of the route sequence map represents a parent row to a child row displayed as an outer or upper row of the route sequence map. When a graphical representation of an inner or lower row is selected (e.g., highlighted), an ID of the selected graphical representation is transmitted by application 1103 of client device 1101 to service center 1102 over a network, which may be a local area network (LAN), a wide area network (e.g., Internet), or a combination thereof. Based on the ID, service center 1102 is to identify a selected context element of the route sequence map. If the selected context element is an action context element, service center 1102 is to perform an action that is specified in a property value of the selected context element using a method specified in a property value of the selected context element. If the selected context element is a navigation context element, route sequence manager 1107 of service center 1102 is to identify one or more child context elements associated with the selected context element and transmit the information of the child context elements to the client device. The client device 1101 is to display one or more graphical representations representing the one or more child context elements in an outer or upper row, while the selected graphical representation remains highlighted in the inner or lower row. As a result, the user can easily navigate context elements of the route sequence map via the application, without the hassles of managing the individual elements of the route sequence and their detailed settings.

In one embodiment, service center 1102 further includes a multi-channel communication and routing system (MCRS) 1108 to provide one or more communication channels to any user or client to concurrently access service center 1102. Examples of communication channels include email, chat, texting (e.g., SMS or MMS), voice (e.g., automated IVR, real-time, or VoIP), video, Web (e.g., Web conferencing), and/or online community forum (e.g., Facebook™ or Twitter™), or a combination thereof. Note that MCRS 1108 may be fully or partially integrated with service center 1102 or alternatively, it may be maintained or provided by a third party or partner (e.g., communicatively coupled via service API 1104 over a network). Service center 1102 further includes an automatic caller distribution (ACD) system (not shown) to receive, route, and manage voice calls exchanged via the multi-channel communication system. A customer can obtain support services from service center 1102 via a variety of communication mechanisms. A customer can initiate a support request to contact a live agent such as agents 1115 in a live manner. Alternatively, a customer may browse certain knowledgebase, such as KB 1113 via a Web interface, in an attempt to find a solution to a problem of a product he/she purchased from a manufacturer via a client of service center 1102.

According to one embodiment, application 1103 is installed on mobile device 1101 of a customer or user, where application 1103 can serve as a central service point or entry point to service center 1102 that provides support services to a variety of products or services provided by a variety of vendors. The vendors can be, for example, manufacturers, distributors, retailers, service brokers, purchasing houses, etc. of the products. Vendors may be the clients of service center 1102 or entities having a business relationship with service center 1102. A user (also referred to herein as a customer) can activate application 1103 from the user's mobile device 1101 to reach agents 1115 the service center 1102 or KB data center 1113 via a variety of communication channels or media, such as, for example, email, chat, voice (including automated interactive voice recognition or IVR, voice over Internet protocol or VoIP), video, Web, and/or online community-based forum, etc. Application 1103 can be a thin/thick client application or a Web-based application.

Note that a service center described throughout this application is not limited to a traditional service center or support center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users. As described throughout this application, a service center can be a set of enabling cloud-based service APIs, which enable a variety of consumer product services and support offerings via an intelligent set of technologies providing automated and/or live communications. In one embodiment, services provided by a service center can include, but not limited to: 1) user, product, and loyalty registration and support services; 2) product wish list, reviews, and comparisons; 3) purchasing and accessorizing services; 4) social community support and integration services; 5) intelligent knowledge support services; and 6) integrated sales and product disposition services, etc.

Also note that an agent, an expert, or a customer representative described throughout this application is not limited to a real person. The term of an agent, an expert, or a customer representative can also refer to any processing logic or functional block that is configured or programmed to provide automated services to a customer, for example, via the services APIs of the service center, without a need of a real person involved. Such processing logic and/or functional blocks can be implemented in software, hardware, or a combination thereof.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine-readable medium having computer executable instructions stored therein, which when executed by a server, cause the server to perform a method performed, the method comprising:

providing self-support knowledgebase (KB) to allow a plurality of users to navigate the self-support KB information, the self-support KB including descriptions and illustration for demonstrating usage or solving problems of a plurality of products or services provided by a plurality of goods and service (goods/service) providers, wherein the self-support KB includes one or more predefined answers to the problems;

monitoring user interaction of a first of the plurality of users with the self-support KB information while the first user navigates through the self-support KB information, wherein the first user has previously registered with the server a first product purchased from a first of the plurality of goods/service providers;

in response to a query concerning the first product from a first user device of the first user, automatically examining a set of dialog rules associated with the first goods/service provider in view of the query and the user interaction with the self-support KB tracked by the self-support system;

analyzing the user interaction to determine one or more subject matters navigated in the self-support KB at a point in time by the first user, wherein the user interaction is based on a presentation presented to the first user, the presentation including a plurality of sections associated with different subject matters, wherein the user interaction captures which of the sections the first user has interacted with, and wherein the user interaction includes information indicating at least one of an amount of time spent on at least one of the subject matters navigated, a number of questions have been asked by the first user, and a detailed level of the at least one of the subject matters;

determining an overall subject matter for the presentation, wherein the subject matters navigated associated with different weigh factors based on the user interaction and wherein the overall subject matter is determined based on which of the subject matters navigated prevails based on the weight factors;

identifying at least one of the predefined answers of the self-support KB for the query based on the subject matters navigated at the point in time and the set of dialog rules, wherein the at least one predefined answer is categorized under the subject matters navigated;

transmitting a first predefined response based on the set of dialog rules to the first user device, wherein the first predefined response includes the at least one predefined answers;

identifying a set of one or more related questions that the first user will likely follow up based on the query, the set of dialog rules, and the user interaction with the self-support KB associated with the first goods/service provider, wherein the set of related questions are associated with the subject matter navigated;

transmitting the one or more related questions to the first user device to be presented along with the first predefined response to the query on a display of the first user device;

in response to a signal representing a selection of one of the related questions received from the first user device, transmitting a second predefined response corresponding to the selected related question to the first user device;

in response to a request from the first user device of the first user to request a live support service with one of a plurality of support agents associated with the server, identifying one or more skill sets required to handle the first product currently navigated by the first user via the first user device based on the overall subject matter;

selecting a first of the plurality of support agents having a skill set satisfying the identified skill sets; and establishing, via a multi-channel communications and routing system, a communications session to allow the first user and the first agent to engage live communications discussing the first product.

2. The non-transitory machine-readable medium of claim 1, wherein the method further comprises:

determining in view of the dialog rules whether a predetermined condition has been satisfied based on the user interaction with the self-support KB tracked by the self-support system; and transmitting an invitation to the first user device to invite the first user to initiate the at least one of the voice communications session and the chat communications session for the live support service to discuss the first product, if the predetermined condition has been satisfied.

3. The non-transitory machine-readable medium of claim 2, wherein determining whether a predetermined condition has been satisfied comprises determining whether a number of questions the first user has asked exceeds a predetermined threshold, wherein the invitation is transmitted if the number of questions asked exceeds the predetermined threshold.

4. The non-transitory machine-readable medium of claim 2, wherein determining whether a predetermined condition has been satisfied comprises determining whether at least one of the related questions has been further asked by the first user, wherein the invitation is transmitted if at least one of the related questions has been asked by the first user.

5. The non-transitory machine-readable medium of claim 1, wherein the method further comprises:

retrieving a first telephone number from a user database associated with the first user, wherein the first telephone number has been previously registered with the server by the first user;

transmitting the first telephone number to the first user device of the first user to be displayed on a display of the first user device to prompt the first user whether a support agent of the service center can call the first user back using the first telephone number; and transmitting a first request to the first user device to prompt the first user to specify a second telephone number if the first user wishes the support agent not to use the first telephone number.

6. The non-transitory machine-readable medium of claim 5, wherein the method further comprises transmitting a second request to the first user device to invite the first user to initiate a chat session with the support agent concurrently.

7. The non-transitory machine-readable medium of claim 6, wherein each of the support agents is equipped with a mobile device having a mobile application running therein to communicate with the server over a network.

8. The non-transitory machine-readable medium of claim 7, wherein the method further comprises maintaining agent states of the plurality of support agents, including information indicating whether the support agents are capable of accepting live support service requests, wherein when a support agent logs into the server via its mobile application of its mobile device, a corresponding agent state is updated to indicate that the support agent is capable of accepting a live support request, and wherein the support agent is to indicate via its mobile application whether the support agent is willing to accept a live support request via a voice channel or a non-voice channel.

9. The non-transitory machine-readable medium of claim 8, wherein the method further comprises transmitting a live support request to a second mobile device to prompt a first support agent whether the first support agent is willing to accept the live support request from the first user, wherein the voice and non-voice sessions are established only in response to a response received from the first support agent indicating that the first support agent is available to accept the live support request.

10. The non-transitory machine-readable medium of claim 9, wherein the method further comprises:
generating a support case context, the support case context including contact information of the first user, a subject matter currently navigated by the first user on the self-support KB information, and interactive history of the first user with the server concerning the first product; and
transmitting the support case context to the second mobile device of the first support agent to be displayed on a display of the second mobile device, while the first support agent conducts a live communications session with the first user device of the first user via the second mobile device.

11. The non-transitory machine-readable medium of claim 1, wherein tracking user interaction of the first user on the self-support KB comprises predicting one or more skill set candidates required to solve a problem related to the subject matter, wherein the skill set candidates are identified based on a set of guided support rules mapping subject matters of the self-support KB to a set of predefined skill sets.

12. The non-transitory machine-readable medium of claim 11, wherein identifying a skill set comprises selecting one of the skill set candidates based on a current subject matter the first user interacted on the self-support KB, and wherein the skill set candidates are predicted while the first user navigates the self-support KB and prior to receiving the request for live support from the first user.

13. The non-transitory machine-readable medium of claim 12, wherein the live support request is received in response to an activation by the first user of a link embedded within a presentation page of the self-support KB navigated by the first user via the first mobile device, and wherein the link is displayed as part of content of the presentation page indicating that a live support with a support agent can be initiated to further discuss the content of the presentation page.

14. A computer-implemented method performed by a server, the method comprising:
providing, by a self-service system of a server running at server hardware, self-support knowledgebase (KB) to allow a plurality of users to navigate the self-support KB information, the self-support KB including descriptions and illustration for demonstrating usage or solving problems of a plurality of products or services provided by a plurality of goods and service (goods/service) providers, wherein the self-support KB includes one or more predefined answers to the problems;
monitoring, via the self-service system, user interaction of a first of the plurality of users with the self-support KB information while the first user navigates through the self-support KB information, wherein the first user has previously registered with the server a first product purchased from a first of the plurality of goods/service providers;
in response to a query concerning the first product from a first user device of the first user, automatically examining by the self-service system a set of dialog rules associated with the first goods/service provider in view of the query and the user interaction with the self-support KB tracked by the self-support system;
analyzing the user interaction to determine one or more subject matters navigated in the self-support KB at a point in time by the first user, wherein the user interaction is based on a presentation presented to the first user, the presentation including a plurality of sections associated with different subject matters, wherein the user interaction captures which of the sections the first user has interacted with, and wherein the user interaction includes information indicating at least one of an amount of time spent on at least one of the subject matters navigated, a number of questions have been asked by the first user, and a detailed level of the at least one of the subject matters;
determining an overall subject matter for the presentation, wherein the subject matters navigated associated with different weigh factors based on the user interaction and wherein the overall subject matter is determined based on which of the subject matters navigated prevails based on the weight factors;
identifying at least one of the predefined answers of the self-support KB for the query based on the subject matters navigated at the point in time and the set of dialog rules, wherein the at least one predefined answer is categorized under the subject matters navigated;
transmitting a first predefined response based on the set of dialog rules to the first user device, wherein the first predefined response includes the at least one predefined answers;
identifying, by the self-support system, a set of one or more related questions that the first user will likely follow up based on the query, the set of dialog rules, and the user interaction with the self-support KB associated with the first goods/service provider, wherein the set of related questions are associated with the subject matter navigated;
transmitting the one or more related questions to the first user device to be presented along with the first predefined response to the query on a display of the first user device;
in response to a signal representing a selection of one of the related questions received from the first user device, transmitting a second predefined response corresponding to the selected related question to the first user device;
in response to a request from the first user device of the first user to request a live support service with one of a plurality of support agents associated with the server, identifying one or more skill sets required to handle the first product currently navigated by the first user via the first user device based on the overall subject matter;
selecting, by an agent manager running within the server, a first of the plurality of support agents having a skill set satisfying the identified skill sets; and
establishing, via a multi-channel communications and routing system, a communications session to allow the first user and the first agent to engage live communications discussing the first product.

15. The method of claim 14, further comprising:
determining in view of the dialog rules whether a predetermined condition has been satisfied based on the user interaction with the self-support KB tracked by the self-support system; and
transmitting an invitation to the first user device to invite the first user to initiate the at least one of the voice communications session and the chat communications session for the live support service to discuss the first product, if the predetermined condition has been satisfied.

16. The method of claim 15, wherein determining whether a predetermined condition has been satisfied comprises determining whether a number of questions the first user has asked exceeds a predetermined threshold, wherein the invitation is transmitted if the number of questions asked exceeds the predetermined threshold.

17. The method of claim 15, wherein determining whether a predetermined condition has been satisfied comprises determining whether at least one of the related questions has been further asked by the first user, wherein the invitation is transmitted if at least one of the related questions has been asked by the first user.

18. The method of claim 14, further comprising:
retrieving a first telephone number from a user database associated with the first user, wherein the first telephone number has been previously registered with the server by the first user;
transmitting the first telephone number to the first user device of the first user to be displayed on a display of the first user device to prompt the first user whether a support agent of the service center can call the first user back using the first telephone number; and
transmitting a first request to the first user device to prompt the first user to specify a second telephone number if the first user wishes the support agent not to use the first telephone number.

19. A data processing system operating as a server, comprising:
a processor; and
a memory coupled to the processor to store executable instructions, which when executed by the processor, cause the processor to perform a method, the method including
providing self-support knowledgebase (KB) to allow a plurality of users to navigate the self-support KB information, the self-support KB including descriptions and illustration for demonstrating usage or solving problems of a plurality of products or services provided by a plurality of goods and service (goods/service) providers, wherein the self-support KB includes one or more predefined answers to the problems,
monitoring user interaction of a first of the plurality of users with the self-support KB information while the first user navigates through the self-support KB information, wherein the first user has previously registered with the server a first product purchased from a first of the plurality of goods/service providers,
in response to a query concerning the first product from a first user device of the first user, automatically examining a set of dialog rules associated with the first goods/service provider in view of the query and the user interaction with the self-support KB tracked by the self-support system,
analyzing the user interaction to determine one or more subject matters navigated in the self-support KB at a point in time by the first user, wherein the user interaction is based on a presentation presented to the first user, the presentation including a plurality of sections associated with different subject matters, wherein the user interaction captures which of the sections the first user has interacted with, and wherein the user interaction includes information indicating at least one of an amount of time spent on at least one of the subject matters navigated, a number of questions have been asked by the first user, and a detailed level of the at least one of the subject matters,
determining an overall subject matter for the presentation, wherein the subject matters navigated associated with different weigh factors based on the user interaction and wherein the overall subject matter is determined based on which of the subject matters navigated prevails based on the weight factors,
identifying at least one of the predefined answers of the self-support KB for the query based on the subject matters navigated at the point in time and the set of dialog rules, wherein the at least one predefined answer is categorized under the subject matters navigated,
transmitting a first predefined response based on the set of dialog rules to the first user device, wherein the first predefined response includes the at least one predefined answers,
identifying a set of one or more related questions that the first user will likely follow up based on the query, the set of dialog rules, and the user interaction with the self-support KB associated with the first goods/service provider, wherein the set of related questions are associated with the subject matter navigated,
transmitting the one or more related questions to the first user device to be presented along with the first predefined response to the query on a display of the first user device,
in response to a signal representing a selection of one of the related questions received from the first user device, transmitting a second predefined response corresponding to the selected related question to the first user device,
in response to a request from the first user device of the first user to request a live support service with one of a plurality of support agents associated with the server, identifying one or more skill sets required to handle the first product currently navigated by the first user via the first user device based on the overall subject matter, selecting a first of the plurality of support agents having a skill set satisfying the identified skill sets, and establishing, via a multi-channel communications and routing system, a communications session to allow the first user and the first agent to engage live communications discussing the first product.

20. The system of claim 19, wherein the method further comprises:

determining in view of the dialog rules whether a predetermined condition has been satisfied based on the user interaction with the self-support KB tracked by the self-support system; and transmitting an invitation to the first user device to invite the first user to initiate the at least one of the voice communications session and the chat communications session for the live support service to discuss the first product, if the predetermined condition has been satisfied.

21. The system of claim 20, wherein determining whether a predetermined condition has been satisfied comprises determining whether a number of questions the first user has asked exceeds a predetermined threshold, wherein the invitation is transmitted if the number of questions asked exceeds the predetermined threshold.

22. The system of claim 20, wherein determining whether a predetermined condition has been satisfied comprises determining whether at least one of the related questions has been further asked by the first user, wherein the invitation is transmitted if at least one of the related questions has been asked by the first user.

23. The system of claim 19, wherein the method further comprises:

retrieving a first telephone number from a user database associated with the first user, wherein the first telephone number has been previously registered with the server by the first user;

transmitting the first telephone number to the first user device of the first user to be displayed on a display of the first user device to prompt the first user whether a support agent of the service center can call the first user back using the first telephone number; and transmitting a first request to the first user device to prompt the first user to specify a second telephone number if the first user wishes the support agent not to use the first telephone number.

* * * * *